(12) United States Patent
Davey et al.

(10) Patent No.: US 9,593,753 B2
(45) Date of Patent: Mar. 14, 2017

(54) MAGNETIC GEARS, AND RELATED SYSTEMS AND METHODS

(71) Applicant: NATIONAL OILWELL VARCO, L.P., Houston, TX (US)

(72) Inventors: Kent R. Davey, Edgewater, FL (US); David Cardellini, Spring, TX (US); Cliff A. Swiontek, Brea, CA (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 305 days.

(21) Appl. No.: 14/381,686

(22) PCT Filed: Mar. 1, 2013

(86) PCT No.: PCT/US2013/028538
§ 371 (c)(1),
(2) Date: Aug. 28, 2014

(87) PCT Pub. No.: WO2013/130936
PCT Pub. Date: Sep. 6, 2013

(65) Prior Publication Data
US 2015/0018168 A1    Jan. 15, 2015

Related U.S. Application Data

(60) Provisional application No. 61/606,305, filed on Mar. 2, 2012, provisional application No. 61/653,353, filed on
(Continued)

(51) Int. Cl.
*H02K 49/10* (2006.01)
*F16H 35/00* (2006.01)
*F16H 15/02* (2006.01)

(52) U.S. Cl.
CPC ............. *F16H 35/00* (2013.01); *F16H 15/02* (2013.01); *H02K 49/102* (2013.01); *H02K 49/106* (2013.01); *H02K 2213/09* (2013.01)

(58) Field of Classification Search
CPC ...... H02K 49/00; H02K 49/06; H02K 49/102; H02K 49/106; H02K 51/00; H02K 7/06;
(Continued)

(56) References Cited

U.S. PATENT DOCUMENTS

| 5,723,928 A | 3/1998 | Imai et al. |
| 6,794,781 B2 * | 9/2004 | Razzell ............... H02K 7/11 290/55 |

(Continued)

FOREIGN PATENT DOCUMENTS

| EP | 0018835 A1 | 11/1980 |
| JP | 2005315370 A * | 11/2005 |

(Continued)

OTHER PUBLICATIONS

International Search Report for corresponding International Patent Application No. PCT/US2013/028538, dated May 9, 2013.
(Continued)

*Primary Examiner* — Tran Nguyen
(74) *Attorney, Agent, or Firm* — Jones Robb, PLLC

(57) ABSTRACT

A magnetic gear may comprise a first gear member comprising a plurality of permanent magnets arranged to have a first number of magnetic pole pairs and a second gear member positioned relative to the first gear member. The second gear member may comprise a plurality of individually rotatable magnetized elements each driven and synchronized with one another to selectively generate a second number of magnetic pole pairs that differs from the first number of magnetic pole pairs. The magnetic gear may further comprise a plurality of interpole elements positioned between the first and second gear members. The plurality of interpole elements may be disposed to harmonically couple the magnetic pole pairs of the first gear member with the
(Continued)

magnetic pole pairs of the second gear member for each selectively generated second number of magnetic pole pairs.

19 Claims, 39 Drawing Sheets

Related U.S. Application Data on May 30, 2012, provisional application No. 61/697,097, filed on Sep. 5, 2012.

(58) Field of Classification Search
CPC .. H02K 7/10; H02K 7/11; F16H 35/00; F16H 35/10; F16H 49/00; F16H 15/02; A63H 33/26; F01D 15/10; F02C 3/113
See application file for complete search history.

(56) References Cited

U.S. PATENT DOCUMENTS

| | | | |
|---|---|---|---|
| 8,813,591 B2* | 8/2014 | Edwards | H02K 49/102 310/103 |
| 9,013,081 B2 | 4/2015 | Atallah et al. | |
| 2002/0167236 A1 | 11/2002 | Long | |
| 2003/0132003 A1 | 7/2003 | Arauz et al. | |
| 2004/0108781 A1* | 6/2004 | Razzell | H02K 7/11 310/112 |
| 2005/0104465 A1 | 5/2005 | Darday | |
| 2007/0215343 A1 | 9/2007 | McDonald et al. | |
| 2008/0149445 A1 | 6/2008 | Kern et al. | |
| 2011/0037333 A1 | 2/2011 | Atallah et al. | |
| 2011/0042965 A1* | 2/2011 | Atallah | H02K 49/102 290/1 C |
| 2011/0121673 A1* | 5/2011 | Edwards | H02K 49/00 310/103 |
| 2011/0121674 A1 | 5/2011 | Bright et al. | |
| 2011/0127869 A1 | 6/2011 | Atallah et al. | |
| 2011/0253498 A1 | 10/2011 | Montgomery et al. | |
| 2012/0291575 A1* | 11/2012 | Edwards | H02K 49/102 74/325 |
| 2015/0048705 A1 | 2/2015 | Davey et al. | |

FOREIGN PATENT DOCUMENTS

| | | |
|---|---|---|
| WO | WO 2013/130936 A2 | 9/2013 |
| WO | WO 2013/131008 A1 | 9/2013 |

OTHER PUBLICATIONS

Written Opinion for corresponding International Patent Application No. PCT/US2013/028538, dated May 9, 2013.
Kais Atallah et al., "A New PM Machine Topology for Low-Speed, High-Torque Drives," Proceedings of the 2008 International Conference on Electrical Machines, Paper ID 1455, IEEE, 2008, pp. 1-4.
K. Attallah, et al., "Design, analysis and realisation of a high-performance magnetic gear", IEEE Proc.—Electr. Power Appl., vol. 151, No. 2, Mar. 2004, pp. 135-143.
Linni Jian, et al., "Comparison of Coaxial Magnetic Gears with Different Topologies", IEEE Transactions on Magnetics, vol. 45, No. 10, Oct. 2009, pp. 4526-4529.
Linni Jian and K. T. Chau, "A Coaxial Magnetic Gear with Halbach Permanent-Magnet Arrays", IEEE Transactions on Energy Conversion, vol. 25, No. 2, Jun. 2010, pp. 319-328.
Wenlong Li, et al., "Application of Linear Magnetic Gears for Pseudo-Direct-Drive Oceanic Wave Energy Harvesting", IEEE Transactions on Magnetics, vol. 47, No. 10, Oct. 2011, pp. 2624-2627.
Linni Jian et al., "A Magnetic-Geared Outer-Rotor Permanent-Magnet Brushless Machine for Wind Power Generation", IEEE Transactions on Industry Applications, vol. 45, No. 3, May/Jun. 2009, pp. 954-962.

Frank T. Jørgensen et al., "The Cycloid Permanent Magnetic Gear," IEEE Transactions on Industry Applications, vol. 44, No. 6, Nov./Dec. 2008, pp. 1659-1665.
Nicolas W. Frank and Hamid A. Toliyat, "Gearing Ratios of a Magnetic Gear for Wind Turbines", IEEE Electric Machines and Drives Conference, Apr. 2009, IEEE, pp. 1224-1230.
Linni Jian and K.T. Chau, "A Coaxial Magnetic Gear with Halbach Permanent Magnet Arrays", Manuscript, Apr. 23, 2008, The University of Hong Kong (9 pages).
J. Rens et al., "A novel magnetic harmonic gear", The University of Sheffield, UK, IEEE, 2007, pp. 698-703.
K. Atallah and D. Howe, "A Novel High-Performance Magnetic Gear", IEEE Transactions on Magnetics, vol. 37, No. 4, pp. 2844-2846, Jul. 2001.
Jiabin Wang and Kais Atallah, "Modeling and Control of 'Pseudo' Direct-Drive Brushless Permanent Magnet Machines", IEEE, 2009, pp. 1043-1048.
F. T. Joergensen et al. "The cycloid permanent magnetic gear", Aalborg University, Denmark, IEEE, 2006, pp. 373-378.
Cheng-Chi Huang et al., "Development of a Magnetic Planetary Gearbox", IEEE Transactions on Magnetics, vol. 44, No. 3, Mar. 2008, pp. 403-412.
D. J. Powell et al., "Design and Analysis of a Pseudo Direct-Drive Propulsion Motor", Paper, Magnomatics Limited, UK (2 pages).
Kais Atallah, et al., "A Novel "Pseudo" Direct-Drive Brushless Permanent Magnet Machine", IEEE Transactions on Magnetics, vol. 44, No. 11, Nov. 2008, pp. 4349-4352.
P. O. Rasmussen et al., "Motor Integrated Permanent Magnet Gear with a Wide Torque-Speed Range", IEEE Energy Conversion Congress and Exposition, 2009, pp. 1510-1518.
P. O. Rasmussen et al., "Experimental Evaluation of a Motor Integrated Permanent Magnet Gear", Aalborg University, Denmark, IEEE, 2011, pp. 3982-3989.
Jan Rens et al., "A Novel Magnetic Harmonic Gear", IEEE Transactions on Industry Applications, vol. 46, No. 1, Jan./Feb. 2010, pp. 206-212.
Rawcliffe, G.H., and Garlick, N.L., "Two improved chortled windings for 3:1 pole-changing", The Institution of Electrical Engineers, Paper No. 2443 U, Feb. 1958, pp. 62-66.
P. O. Rasmussen et al., "Development of a High-Performance Magnetic Gear," IEEE Transactions on Industry Applications, vol. 41, No. 3, May/Jun. 2005, pp. 764-770.
S. Mezani et al., "A high-performance axial-field magnetic gear", Journal of Applied Physics 99, 2006.
J.W. Kelly et al., "Control of a continuously operated pole-changing induction machine," IEEE Electric Machines and Drives Conference, vol. 1, 2003, pp. 211-217.
D. Grant, "Design of phase-change 2-speed windings for induction motors, using pole-amplitude modulation techniques," IEEE Proceedings on Power Applications B, vol. 130, No. 1, Jan. 1983, pp. 45-50.
Ge Baoming et al., "Uniform modeling for pole-phase modulation induction motors," IEEE Electric Machines and Systems, 2010, pp. 1401-1406.
Ge Baoming et al., "Winding Design Modeling, and Control for Pole-Phase Modulation Induction Motors", IEEE Transactions on Magnetics, vol. 49, No. 2, Feb. 2013, pp. 898-911.
International Search Report for related International Patent Application No. PCT/US2013/028679, dated May 9, 2013.
Written Opinion for related International Patent Application No. PCT/US2013/028679, dated May 9, 2013.
Structural Beam Bending Equations Calculation Supported on Both Ends Uniform Loading, Engineering Edge, <http://www.engineersedge.com/beam_bending/beam_bending1.htm>, accessed from the Internet on Oct. 29, 2014.
Engineering Section Properties Solid Round Calculator, Engineering Edge, <http://www.engineersedge.com/calculators/section_square_case_11.htm>, accessed from the Internet on Oct. 29, 2014.
Neodymium Iron Boron Magnets, Dexter Magnetic Technologies, <http://www.dextermag.com/material-grades/neodymium-iron-boron-magnets>, accessed from the Internet on Oct. 29, 2014.
Extended European Search Report for corresponding European Application No. 13754518.2, dated Jun. 8, 2016.

(56) References Cited

OTHER PUBLICATIONS

K. Atallah et al., "A high-performance linear magnetic gear", vol. 97, No. 10, May 17, 2005.
Extended European Search Report for Application No. 13754224.7, dated Feb. 2, 2016.

* cited by examiner

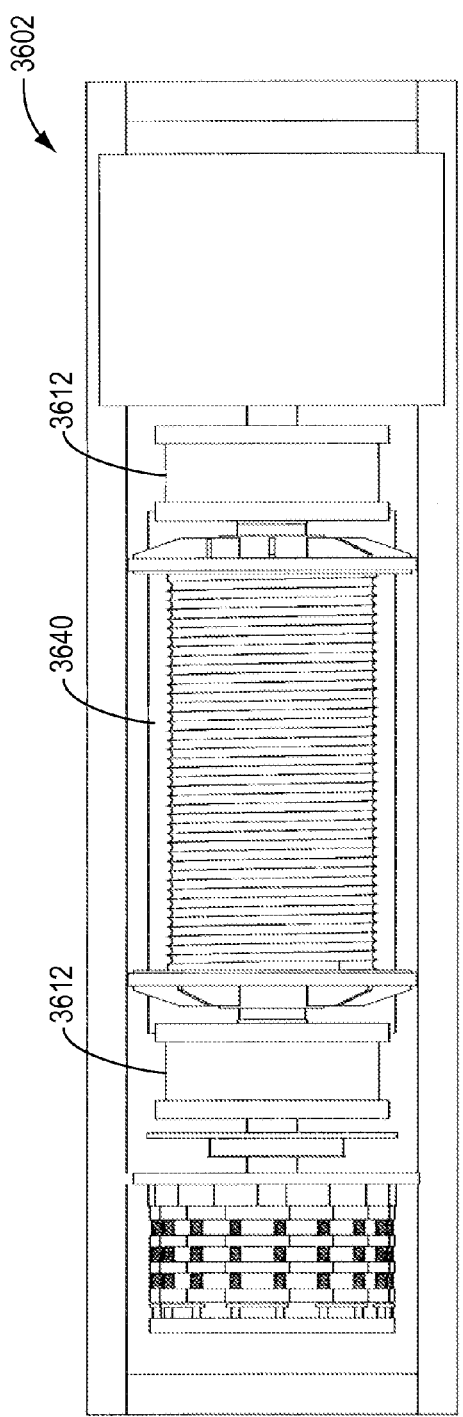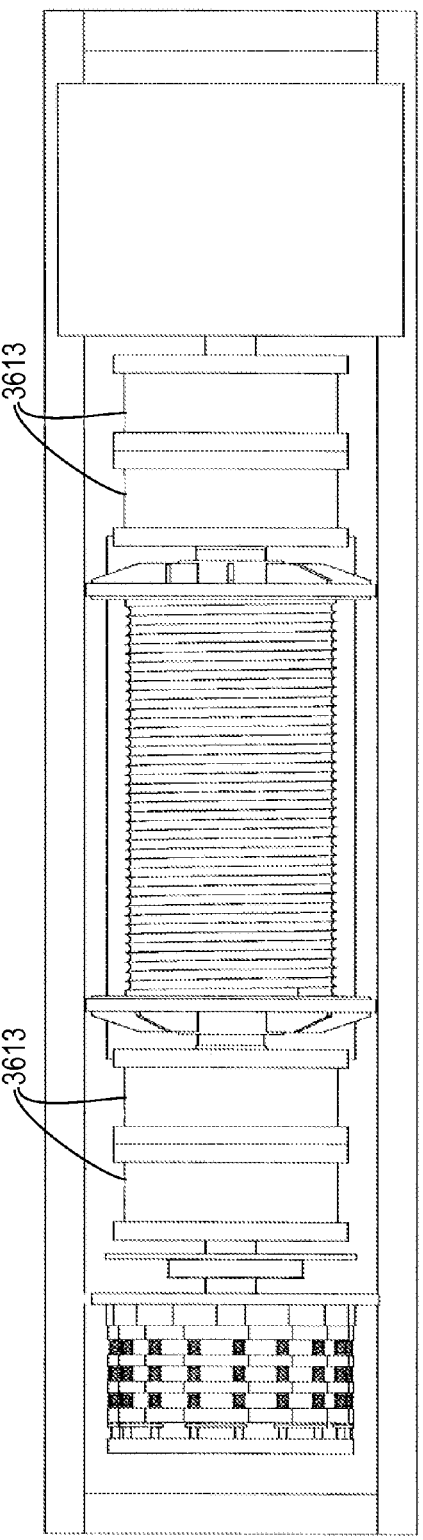
FIG. 36C
FIG. 36D

MAGNETIC GEARS, AND RELATED SYSTEMS AND METHODS

CROSS-REFERENCE TO RELATED APPLICATIONS

This is a national stage application of PCT/US2013/028538, filed internationally on Mar. 1, 2013, which claims priority to U.S. Provisional Patent Application No. 61/606,305, filed Mar. 2, 2012 and entitled "Integrated Motor-Gear Using Spinning Magnets;" U.S. Provisional Patent Application No. 61/697,097, filed Sep. 5, 2012 and entitled "Magnetic Gears with Variable Gear Ratios, and Related Systems and Methods;" and U.S. Provisional Patent Application No. 61/653,353, filed May 30, 2012 and entitled "Oil Field Magnetic Drivers and Method of Using Same," each of which is incorporated by reference herein in its entirety.

TECHNICAL FIELD

The present disclosure relates generally to magnetic gears, and related methods and systems, including for example as components integrated with motors. The present disclosure also relates to the use of such magnetic gears in various rotary driven industrial equipment, such as, for example, top drives, drawworks, and/or mud pumps of oil rigs.

INTRODUCTION

The section headings used herein are for organizational purposes only and are not to be construed as limiting the subject matter described in any way.

Gearboxes and gear arrangements are utilized in a wide range of applications in order to provide speed and torque conversions from a rotating power source to another device. Traditionally gearboxes have been formed from gear rings, or wheels, each being sized and having a number of teeth selected to provide a desired gear ratio, which in turn affects the torque ratio. Such mechanical gearboxes, however, may produce relatively large acoustic noise and vibration. Also, the mechanical components of gearboxes are subject to wear and fatigue (e.g., tooth failure), and require periodic lubrication and maintenance. Moreover, mechanical gear arrangements can have inefficiencies as a result of contact friction losses.

In recent years, magnetic gear arrangements have been developed. Some magnetic gears are planetary in their arrangement and comprise respective concentric gear rings with interpoles positioned between the gear rings. The rings incorporate permanent magnets, and the interpoles act to modulate (shutter) the magnetic flux transferred between the permanent magnets of the gear rings. In this manner, there is no mechanical contact between the gear rings, or the input and output shafts of the gearbox. Thus, utilizing such magnetic gear arrangements may alleviate many of the noise and wear issues associated with gears that rely on intermeshing teeth.

Although magnetic gears have various advantages over traditional mechanical gears, there exists a continued need for improvement. For example, some conventional magnetic gears have a double air gap that can hamper the modulation efficiency. Further, laminated steel interpole elements used in some magnetic gears can be relatively weak structures that are prone to damage. It may therefore be desirable to provide magnetic gear arrangements that provide increased modulation efficiency, and have improved structural durability.

In addition, conventional variable-ratio magnetic gears can have arrangements that are complicated to operate. It may therefore be desirable to provide alternative, more robust variable-ratio magnetic gears and methods of varying a magnetic gear ratio.

It also may be desirable to provide integrated magnetic motor-gear arrangements that aim to improve upon some of the drawbacks of conventional magnetic gears noted above.

SUMMARY

The present disclosure may solve one or more of the above-mentioned problems and/or achieve one or more of the above-mentioned desirable features. Other features and/or advantages may become apparent from the description which follows.

In accordance with an exemplary embodiment of the present disclosure, a magnetic gear may comprise a first gear member comprising a plurality of permanent magnets arranged to have a first number of magnetic pole pairs and second gear member positioned relative to the first gear member. The second gear member may comprise a plurality of individually rotatable magnetized elements each driven and synchronized with one another to selectively generate a second number of magnetic pole pairs that differs from the first number of magnetic pole pairs. The magnetic gear may further comprise a plurality of interpole elements positioned between the first and second gear members. The plurality of interpole elements may be disposed to harmonically couple the magnetic pole pairs of the first gear member with the magnetic pole pairs of the second gear member for each selectively generated second number of magnetic pole pairs.

In accordance with an additional exemplary embodiment of the present disclosure, a method of varying a magnetic gear ratio of a magnetic gear may comprise selectively adjusting a relative rotation angle of a plurality of individually rotatable magnetized elements to generate a number of magnetic pole pairs of a first gear member. The method may further comprise harmonically coupling the magnetic pole pairs of the first gear member with magnetic pole pairs of a second gear member for at least two numbers of magnetic pole pairs of the first gear member from the selectively adjusting.

In accordance with yet other exemplary embodiments, the present disclosure contemplates a system that includes a magnetic gear as described above, a high speed, low torque input shaft operatively coupled to a high speed gear ring of the magnetic gear, and a low speed, high torque output shaft operatively coupled to a low speed gear ring of the magnetic gear. The system may further include rotary equipment associated with an oil drilling rig operatively coupled to be driven by the output shaft.

Additional objects and advantages will be set forth in part in the description which follows, and in part will be obvious from the description, or may be learned by practice of the present teachings. At least some of the objects and advantages of the present disclosure may be realized and attained by means of the elements and combinations particularly pointed out in the appended claims.

It is to be understood that both the foregoing general description and the following detailed description are exemplary and explanatory only and are not restrictive of the invention, as claimed. It should be understood that the invention, in its broadest sense, could be practiced without having one or more features of these exemplary aspects and embodiments.

BRIEF DESCRIPTION OF DRAWINGS

The accompanying drawings, which are incorporated in and constitute a part of this specification, illustrate some exemplary embodiments of the present disclosure and together with the description, serve to explain certain principles. In the drawings.

FIGS. 36A-36D illustrate plan views of drawworks with magnetic drivers in accordance with various exemplary embodiments.

DESCRIPTION OF EXEMPLARY EMBODIMENTS

Figure 1:
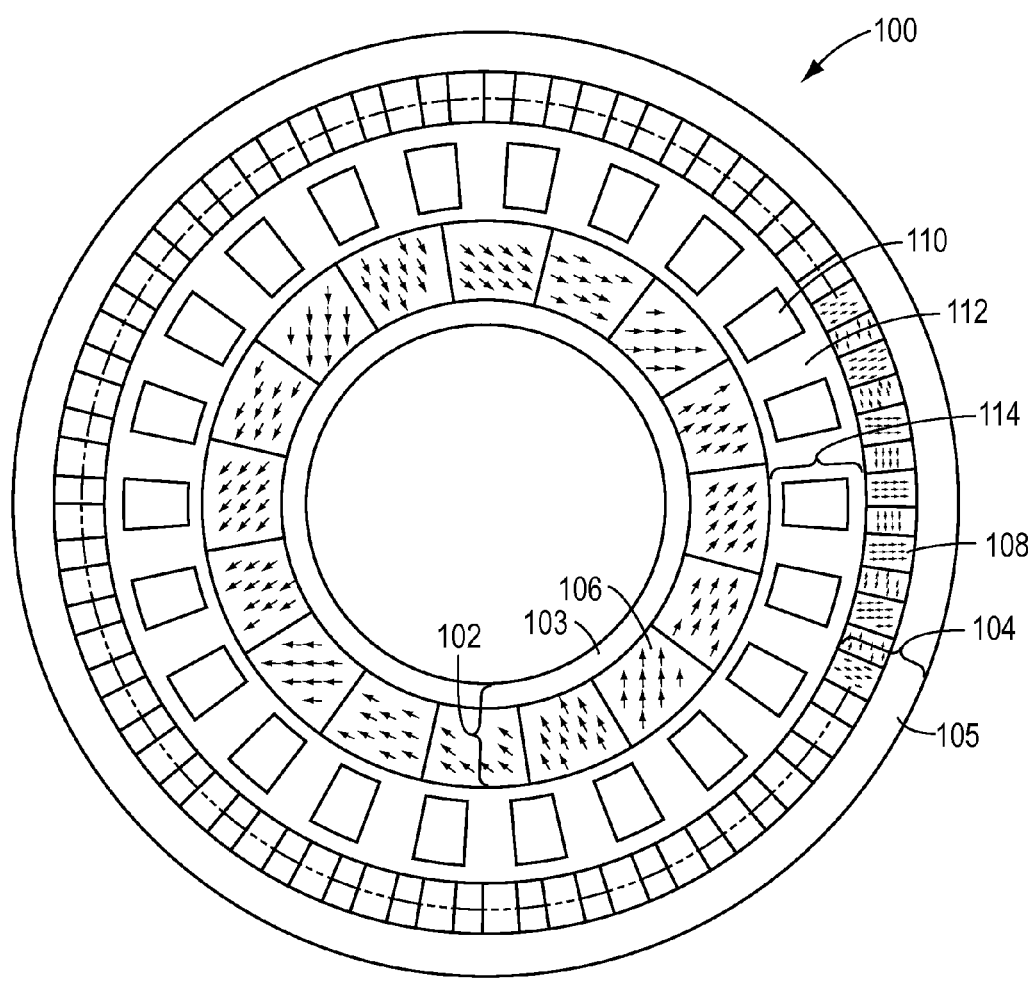
FIG. 1 is a schematic plan view of a magnetic gear of the prior art.

Reference will now be made in detail to various exemplary embodiments of the present disclosure, examples of which are illustrated in the accompanying drawings. Wherever possible, the same reference numbers will be used throughout the drawings to refer to the same or like parts.

Various exemplary embodiments of the present disclosure contemplate magnetic gear arrangements that utilize interpole elements that are themselves a source of magnetomotive force. In this way, the interpole elements not only modulate the magnetic field between the two sets of magnets provided in the gear rings between which the interpole elements are disposed, but also supplement that magnetic field. Interpole elements in accordance with various exemplary embodiments may be structured, arranged, and operated to compensate for the double air gap issues posed by some conventional magnetic gear arrangements, such as some conventional magnetic gear arrangements that include laminated steel pieces as the interpole elements.

In various exemplary embodiments, therefore, the torque density of magnetic gears in accordance with the present disclosure can significantly exceed that of some conventional magnetic gear torque densities.

Further, various exemplary embodiments eliminate the use of laminated steel wedges as interpole elements, which in planetary gears can be relatively weak structures due their not being welded to a stator for support as in conventional laminated stator stacks. Using the permanent magnet spinning cylinder interpole elements, alone or in combination with a steel spindle as will be described, in accordance with various exemplary embodiments can avoid the need to laminate the interpole elements as the flux losses are minimal due to the conductivity of the permanent magnet, as well as the conductivity associated with structural supports (if used) rotating with the cylinders, which may be, for example, steel or stainless steel.

In various exemplary embodiments, the torque density of a magnetic gear that utilizes the principles of the present disclosure can up to more than double the torque density of conventional planetary magnetic gears of comparable dimension, suppress substantially all cogging, and/or significantly reduce hysteresis (e.g., eddy) loss due to the replacement of the laminated steel interpoles with a magnet material that has a reduced (e.g., about $1/7^{th}$) conductivity.

Various exemplary embodiments of the present disclosure contemplate magnetic gears that have variable gear ratios and accordingly can provide more than one working gear ratio and therefore more than one speed/torque output. Various exemplary embodiments of the present disclosure contemplate, for example, providing a magnetic gear comprising at least one gear member, such as, for example, a gear ring, that may be reconfigured so as to change the magnetic field of the gear member, thereby changing the number of magnetic pole pairs on the member. Various additional exemplary embodiments of the present disclosure contemplate providing a magnetic gear comprising interpole elements positioned between at least two gear members, such as, for example, an inner and outer gear ring of the magnetic gear, wherein the interpole elements are grouped so as to harmonically couple the gear members at more than one pole pair count. In this manner, harmonic coupling can occur at more than one gear ratio.

In various exemplary embodiments of the present disclosure, interpole elements can be placed between the gear members of a magnetic gear to act as a shutter or modulator to modulate the magnetic flux transferred between the gear members. In other words, the interpole elements, as a modulator, transform the number of magnetic field undulations experienced on the opposite side of the air gap between the gear members. Thus, interpole elements can provide interpoles, which act as auxiliary poles, to harmonically couple the magnetic pole count (or pole pair count) of one gear member to the magnetic pole count (or pole pair count) of another gear member. In various embodiments of the present disclosure, for example, interpole elements harmonically couple the magnetic pole count (or pole pair count) of an inner gear ring to the magnetic pole count (or pole pair count) of an outer gear ring. In other words, the interpole elements harmonically couple the magnetic fields of the gear rotors and hence the motion of the gear rotors, thereby resulting in a torque transfer between the gear rings.

Various exemplary embodiments of the present disclosure also contemplate integrated magnetic motor-gear drives that utilize some of the operational principles of the magnetic gears described herein, but also include an integrated permanent magnetic motor, for example, as opposed to being coupled to a motor via linkages and the like. Such systems can provide a compact, yet robust magnetic driver, which may be beneficial in operating various industrial rotary equipment, such as in oil rigs, for example. The ability to easily replace and or change the integrated system may facilitate overall maintenance and operation of such rotary equipment.

Use of magnetic gears and integrated magnetic motor-gear drives can provide advantages in a variety of industrial applications due to their non-contacting parts that are less susceptible to wear, which can be exacerbated when subjected to relatively harsh environmental conditions, such as, for example, as may be present in offshore oil rigs. Although various exemplary embodiments described below discuss the use of magnetic gearing systems for use in driving rotary equipment in oil rigs, such applications are exemplary and nonlimiting and the magnetic gear systems described herein can be used in a variety of applications in which conventional mechanical gearing for industrial equipment are used.

Magnetic Gear with Free-Spinning Interpole Elements

FIG. 1 shows a schematic plan view of an exemplary conventional planetary magnetic gear 100. The magnetic gear 100 comprises an inner gear ring 102 and an outer gear ring 104. Each gear ring 102, 104 respectively comprises a steel ring 103, 105 and a plurality of permanent magnets 106, 108. As illustrated in FIG. 1, for example, in various embodiments, the permanent magnets 106, 108 on each gear ring 102, 104 may be arranged in a Halbach array around the gear rings 102, 104 (although such an arrangement is optional). Typically, one gear ring (i.e., an input gear) is mechanically coupled to a drive mechanism (e.g., a motor shaft not shown) and the other gear ring (i.e., an output gear) is coupled to a driven mechanism (a shaft on a piece of equipment or other component, also not shown) as would be understood by those of ordinary skill in the art.

The inner and outer gear rings 102, 104 have different numbers of permanent magnets 106, 108, which in turn provide a different number of magnetic pole pairs to each gear ring 102, 104. As illustrated in FIG. 1, for example, the inner gear ring 102 may have 16 permanent magnets providing 4 poles (or 2 pole pairs) and the outer gear ring 104 may have 80 permanent magnets providing 40 poles (or 20 pole pairs).

Interpole elements in the form of laminated steel pieces 110 (which may be, for example, blocks, wedges, or other such configurations) are positioned between the inner gear ring 102 and the outer gear ring 104. The steel pieces 110 are arranged in a ring 112 to form a middle, stationary gear ring 114 of the magnetic gear 100. The steel pieces 110 modulate the magnetic fields produced by the inner gear ring 102 and the outer gear ring 104 so as to harmonically couple the two field sources. Thus, the magnetic gear 100 illustrated in FIG. 1 may have a 10:1 gear ratio. In other words, the inner gear ring 102, with 2 pole pairs, will make 10 rotations for every 1 rotation of the outer gear ring 104, with 20 pole pairs. This results in the outer gear ring 104 having a reduced speed and increased torque. Those of ordinary skill in the art will appreciate that modifying the number of laminated steel interpole elements can impact the efficiency of coupling the magnetic fields between the inner and outer gear rings 102, 104. For example decreasing the number of interpole elements 110 from 22 to 18 can significantly decrease the torque output capability of the gear.

Various exemplary embodiments of the present disclosure contemplate magnetic gears that not only provide speed/torque conversion as described above with reference to the conventional embodiment of FIG. 1, but also provide torque amplification by increasing the torque output of the magnetic gear relative to a conventional magnetic gear having a similar inner and outer gear ring configuration. The torque density of a magnetic gear may, for example, be substantially improved (e.g., amplified) by introducing an additional magnetomotive force (MMF) source to the gear. Introducing such an additional MMF can provide magnetic flux that produces an additional physical driving force on the gear, which can help compensate for the negative impact of the double air gap among other issues. The torque density of a magnetic gear may be amplified by using interpole elements that are a MMF source and therefore also produce a magnetic field. By way of non-limiting example, free-spinning magnetized elements, such as, for example, free-spinning magnetized cylinders (which may include, for example, permanent magnet cylinders and/or temporarily magnetized cylinders that are allowed to rotate freely about their axes), may be used as interpole elements. Although not wishing to be bound by any particular theory, by using, for example, permanent magnets as interpole elements, and allowing the permanent magnets to individually rotate, or spin, the magnetic field produced by the interpole permanent magnets is able to align with the magnetic fields produced by the other gear members to help rotate the output gear member. In other words, the MMF of the interpole elements in accordance with the present disclosure may be utilized to produce additional output torque. Thus, free-spinning magnetized cylinders, such as those described herein, can be arranged to not only modulate the magnetic flux transferred between the gear members, but also amplify the flux transferred, thereby increasing the torque output of the magnetic gear.

The torque density of magnetic gears may, therefore, be amplified by utilizing interpole elements that are sources of MMF. With reference to the exemplary embodiment of FIGS. 2 and 3, for example, a magnetic gear 200 comprises an inner gear ring 202 and an outer gear ring 204. Each gear ring 202, 204 respectively can comprise a steel ring 203, 205 and a plurality of permanent magnets 206, 208. As illustrated perhaps best in FIG. 3, in various exemplary embodiments, the permanent magnets 206, 208 may be arranged in a Halbach array around the gear rings 202, 204.

Figure 2:
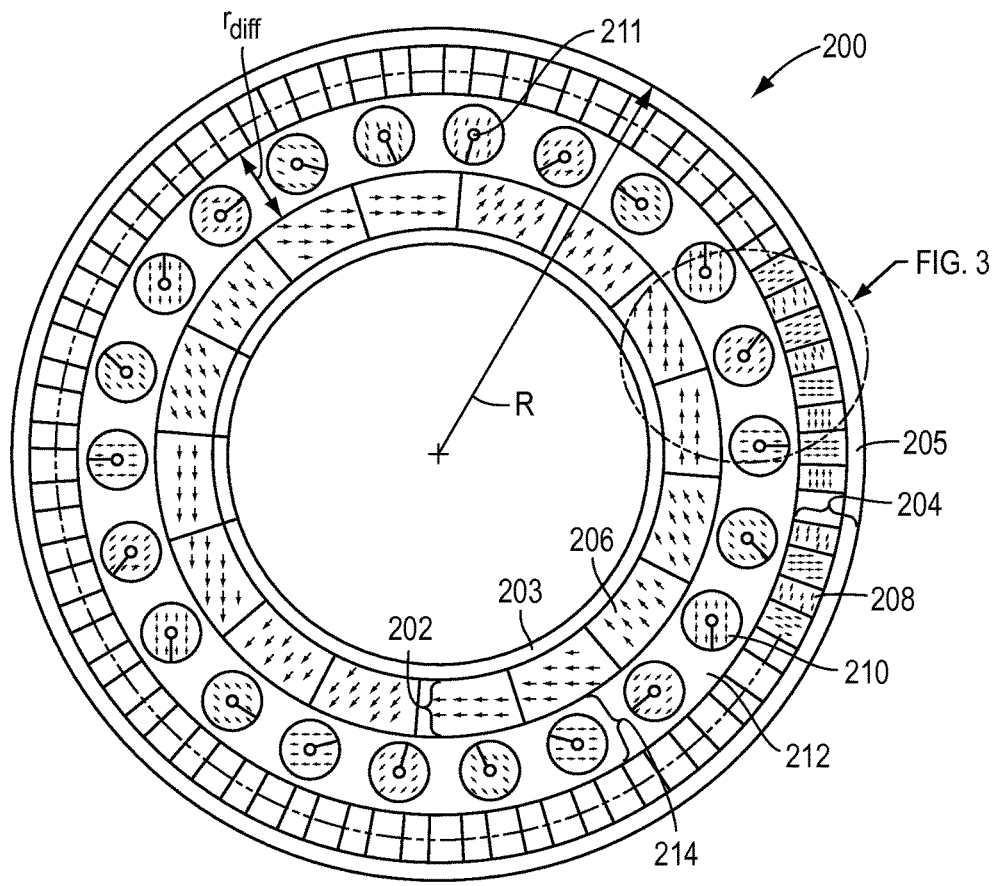
FIG. 2 is a schematic plan view of an exemplary embodiment of a magnetic gear in accordance with the present disclosure.

The inner and outer gear rings 202, 204 have differing numbers of permanent magnets 206, 208, which in turn provide the gear rings 202, 204 with differing numbers of magnetic pole pairs. As illustrated in FIG. 2, for example, the inner gear ring 202 may have 16 permanent magnets providing 4 poles (or 2 pole pairs) with a field repeating every 180 degrees of rotation. The outer gear ring 104 may have 80 permanent magnets providing 40 poles (or 20 pole pairs) with a field repeating every 18 degrees of rotation. For ease of illustration, magnetic field direction arrows are shown for only some of the permanent magnets 208, and those of ordinary skill in the art would understand that the field directions change and repeat as noted.

Figure 3:
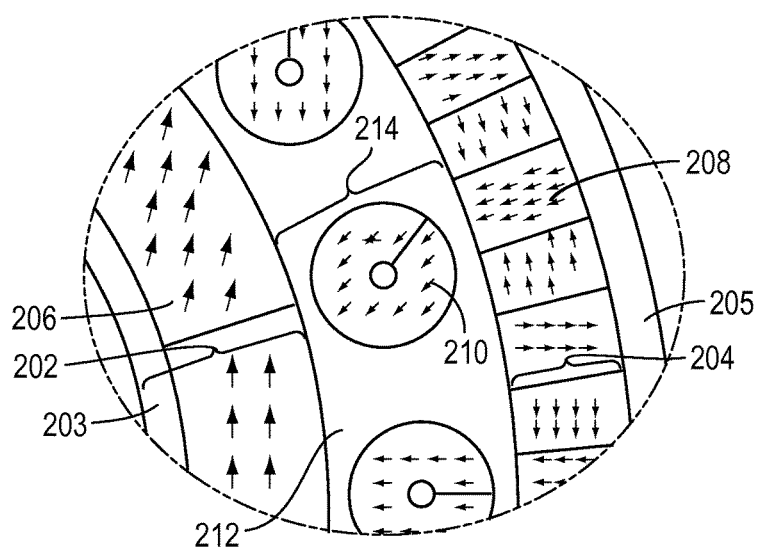
FIG. 3. is an enlarged view of a section of the magnetic gear of FIG. 2.

Free-spinning magnetized cylinders 210 can be provided as interpole elements positioned between the inner gear ring 202 and the outer gear ring 204 (FIGS. 2 and 3 depicting an instantaneous position of the various moving elements of the gear 200). The cylinders 210 may, for example, be arranged in a nylon or other low-conductivity jacket 212 to form a middle gear ring 214 of the magnetic gear 200. In the exemplary embodiment of FIG. 2, there are 22 cylinders 210 and they will complete a 360 degree rotation for every 180 degree rotation of the inner gear ring 202.

As described above, the cylinders 210 modulate the magnetic fields produced by the inner gear ring 202 and the outer gear ring 204 so as to harmonically couple the two field sources. Thus, the magnetic gear 200 illustrated in FIGS. 2 and 3 also has a 10:1 gear ratio (i.e., the ratio of the number of pole pairs on the outer gear ring 204 to the number of pole pairs on the inner gear ring 202). Thus, as would be understood by those of ordinary skill in the art, in the gear arrangement of the exemplary embodiment of FIGS. 2 and 3, when the inner gear ring 202 is driven, for example, by a driving mechanism, at a high speed, the outer gear ring 204 will rotate in an opposite direction at a slow speed and high torque (e.g., about $\frac{1}{10}^{th}$ the rotation speed of the inner gear ring 202 and up to about 10 times the torque). In an exemplary embodiment, the free-spinning cylinders 210 can rotate with a tip speed (i.e., a speed measured at the end of the cylinder) that is double that of the high speed inner gear ring 202.

The cylinders 210 are mounted to freely spin about their axes. This enables the cylinders 210 to orient themselves in a manner to intensify the magnetic flux transferred between the gear rings 202, 204. In various embodiments, for example, the ends of each cylinder 210 may be supported by either a bearing (not shown) or a bushing (not shown) to allow the cylinders 210 to rotate freely about their own axis. Since the cylinders 210 may rotate freely about their own axis, they may orient naturally to the net local magnetic field from the inner MMF source (i.e., permanent magnets 206), the outer MMF source (i.e., permanent magnets 208), and the neighboring cylinders 210 (which are typically the weakest of the MMF sources). The net effect is an enhanced torque to bring the inner and outer gear rings 202, 204 into alignment with one another.

In various exemplary embodiments, the middle ring 214 of cylinders 210 can be the torque output member and allowed to rotate around the inner ring 202 in the same direction as the inner ring 202, while the outer gear ring 204 is stationary. That is, the cylinders 210 can freely spin around their own axes and the ring of cylinders 210 as a whole also can rotate together about the inner ring 202. In the arrangement of FIG. 2, the middle gear ring 214 will rotate $\frac{1}{11}^{th}$ of one rotation of the inner ring 202. In one exemplary embodiment wherein the middle ring 214 is the torque output member, the cylinder bearings/bushings may be mounted, for example, within a low conductivity sleeve tube (not shown), such as, for example, a Delrin® or nylon sleeve, and the output torque may be delivered from this sleeve tube to the external drive.

If $p_s$ is the number of pole pairs on the outer gear ring and $n_c$ the number of magnet cylinders, then the gear ratio for outer ring, $g_{outer}$ movement is $$g_{outer} = \frac{p_s}{(p_s - n_c)}. \quad (1)$$

If the middle ring is allowed to rotate, the gear ratio, $g_{mid}$, will be $$g_{mid} = \frac{n_c}{(n_c - p_s)}. \quad (2)$$

The number of cylinders is not independent of the number of pole pairs on the inner rotor $p_r$ since the number of cylinders is constrained to be one of two options:

$$n_c = p_s + p_r. \quad (3)$$

A significant drop in torque occurs when (3) above is violated due to the harmonic interaction of the rotor magnetic field when modulated through the cylinders, which is similar to the drop in output torque when described above for a conventional magnetic gear that uses 18 interpole elements as opposed to 22.

As is set forth below in further detail, in performing modeling computations, in accordance with the computational modeling technique described below, of a magnetic gear as depicted in FIG. 2, with a 6.5" outer radius R and a 4" extension (i.e., depth into the page), the gear torque density was calculated as 179.77 N-m/l (Newton-meters/liter) As also described below in more detail, in a prototype that was built and tested (see EXAMPLE below), even though the cylinders are under-utilized in their available pull-out torque, the torque density was measured at about 107 N-m/l. The torque density is anticipated to increase, for example to 144 N-m/l, if a small ¼" (0.635 cm) diameter stainless steel spindle that supports the cylinders is replaced with a steel spindle. It is further expected to increase to 205 N-m/l when the ½" (1.27 cm) cylinder is replaced with a full magnet cylinder.

Various design considerations and their anticipated impact on the operation of a magnetic gear such as that depicted in FIGS. 2 and 3 will now be described.

Differential Radius

When the differential radius, $r_{diff}$ depicted in FIG. 2, between the inner and outer gear rings 202, 204 is too small, the cylindrical interpole magnets may be under-utilized. On the other hand, too large of differential radius $r_{diff}$ can negatively impact the coupling between the outer and inner magnetic fields. In other words, the air space in the gap may be too large to permit the interpole elements to provide a substantial boost to the overall torque. It may be desirable therefore to increase the inner diameter of the outer gear ring 204 while maintaining the inner and outer diameters of the inner gear ring 202 the same so that the diameter of the cylinders more closely matches the pole pitch of the outer gear ring 204. The pole pitch of the outer gear ring is the distance along the air gap (space between the outer diameter of the inner gear ring 202 and the inner diameter of the outer gear ring 204) for which the magnetic field repeats. This can enhance the performance and increase the torque density of the gear.

Interpole Element Configurations

As described above, the torque density of magnetic gears, in both conventional configurations and in accordance with exemplary embodiments, can be relatively high compared with their mechanical counterparts. When a gear is scaled up to an industrial size, the stress on components, including the magnetic materials, can be large. As mentioned above, the conventional magnetic gear of FIG. 1 uses laminated steel interpole elements, which are structurally relatively weak components and thus susceptible to failure and/or damage. In contrast, the magnetic spinning cylinder interpole elements of various exemplary embodiments, such as described in FIG. 2, for example, can exhibit relatively high strength. For example, in an exemplary embodiment, the interpole elements may be solid cylinders made of a magnetic material, including but not limited to for example, neodymium iron boron (NdFeB) or samarium cobalt. Alternatively, the interpole elements may be hollow cylinders that are supported along their axis by a spindle made of a high strength material, such as for example, a steel or steel alloy rod or wire. In the exemplary embodiment of FIG. 2, such a spindle is labeled 211. In various exemplary embodiments, the spindles may have a diameter ranging from about ¼" to about ½" for cylinders that have an outer diameter ranging from ½" to about 1".

Designs to Minimize Eddy Current Losses

There are two types of eddy currents that would be anticipated in the magnetic gear arrangement of the exemplary embodiment of FIG. 2. One eddy current flows axially through a magnetized cylinder and returns through another cylinder (hereafter "cylinder-to-cylinder"), and the other another remains in the axial cross-section of a given cylinder.

Although not wishing to be bound by any particular theory, the eddy currents that are contained within the respective axial cross-sections of the central ring of cylindrical magnets, the outer ring of magnets, and the outer back plate, is not believed to have a significant negative impact on the performance of the gear, and any such losses are expected to be acceptable. However, the cylinder-to-cylinder eddy currents can be detrimental to gear performance and it is desirable to minimize it. To avoid such eddy currents therefore, it is contemplated to arrange the cylinders and/or provide additional mechanisms that electrically insulate neighboring cylinders to interrupt the electric circuit which goes through neighboring cylinders. In one example, the magnetized cylinders can be fitted with bearings that are embedded in non-conductive support plates, such as for example, support plates made of a durable, high-strength material with relatively low conductivity, which can include but is not limited to, for example, Delrin@, Nylon, or plexiglass. Other mechanisms also may be employed to protect against the cylinder-to-cylinder eddy currents, including but not limited to, using non-conductive bearings for the cylinders, such as, for example, ceramic bearings, or coating or otherwise placing the cylinders in a sleeve of electrically insulative material.

Computational Modeling Technique to Evaluate Design Considerations

It may be desirable to compute and analyze torque performance of magnetic gears designed in accordance with the present teachings, for example, prior to building a prototype or industrial scale gear. In this manner, various design parameters can be selected and studied to determine the impact on the gear.

For a magnetic gear with rotating cylinders in which the cylinders are freely rotatable, rather than driven for example, the torque changes with the rotational position of the cylinder. The cylinders tend to seek a rotational position that corresponds to minimal torque. The present disclosure contemplates a technique that can be used to model and compute the magnetization of the cylinders in the magnetic gear and the overall torque performance of the gear.

Figure 4:
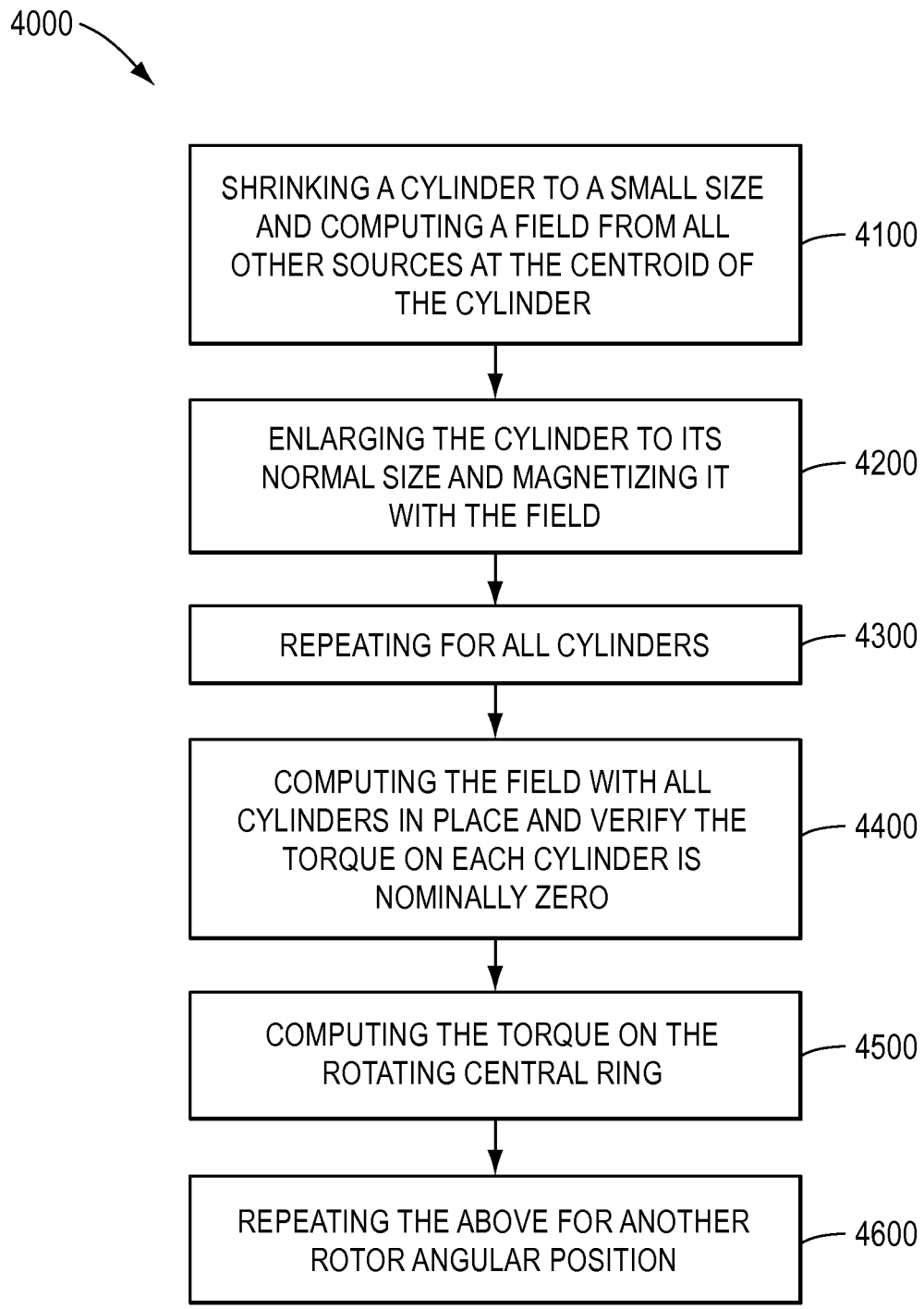
FIG. 4 is an exemplary technique for computational modeling to determine torque output of various magnetic gears in accordance with the present disclosure.

The technique is based on pre-magnetization and an exemplary workflow of the technique is outlined in FIG. 4. The cylinders are treated as made of unmagnetized magnetic material (e.g., $N_dF_eB$). The technique proceeds by shrinking each cylinder interpole sequentially to a small diameter (e.g., about 10% or less of their normal diameter) and computing the magnetic field from all other sources at the centroid of the respective reduced size cylinder (see box 4100 in FIG. 4). After this computation, at box 4200, the cylinder is enlarged to full size and is assumed to be magnetized according to the field direction as determined by the field analysis of 4100. At 4300, the steps of 4100 and 4200 are repeated for each cylinder. Next, at 4400, the resulting modeled system is analyzed with all of the cylinders in place at normal size and magnetized as determined in steps 4100-4300 and then the torque on each cylinder is computed using a finite element field solver (e.g., Oersted from INTEGRATED Engineering Software) and verified to be nominally zero. At 4500, the torque on the rotating middle gear ring of cylinders can be computed, which represents the expected torque output of that middle ring. The torque on the rotating central ring of cylinders represents the pull out torque that can be expected during rotation. The foregoing steps yield the magnetization direction of the cylinders at one rotor position. Accordingly, at 4600 the actions of 4100-4500 are repeated at multiple angular positions. The result from the method of FIG. 4 is a torque performance curve. This torque performance curve may be used to compare the performances of various gear designs and, thus, expedite the selection of a design that may be suitable for a particular application. Not all actions in the methods are needed or performed in that order, and as set forth below, depending on the circumstances some additional numerical analysis techniques may be employed.

Figure 5:
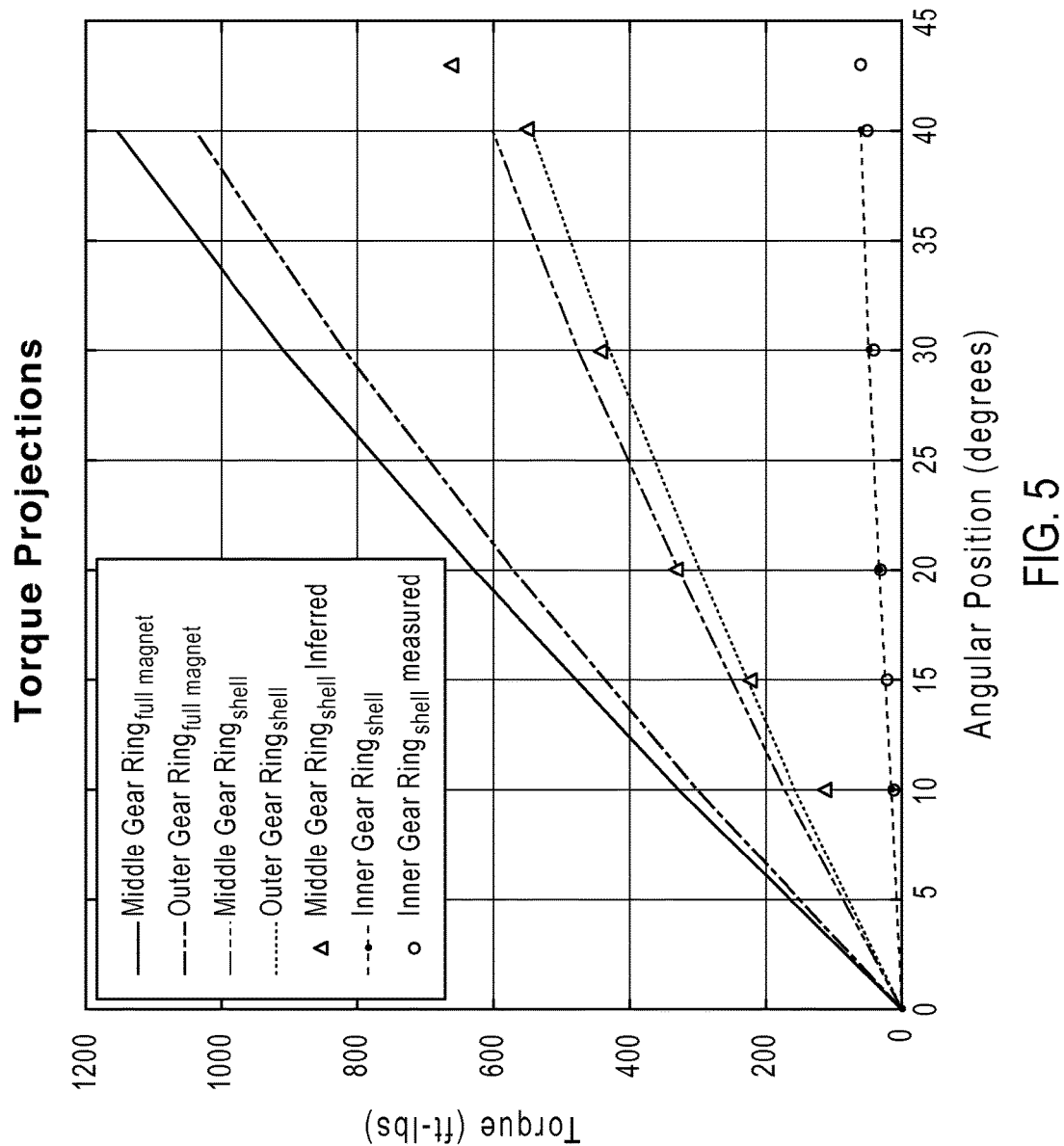
FIG. 5 shows various computed and measured torque output curves for modeled and prototype magnetic gear assemblies.

FIG. 5 illustrates some resulting torque performance curves obtained from performing an analysis in accordance with FIG. 4. In FIG. 5, the abscissa represents angular position in degrees as the rotor is rotated clockwise past the stator from its starting position, and the ordinate represents the output torque. Further details regarding the various data shown in FIG. 5 is provided below.

In performing the modeling technique of FIG. 4, two variations were considered and are illustrated in FIG. 5. The figure shows projected torque versus position for a 11" diameter gear that is 4" in extension. Two variations are considered and plotted for comparison in FIG. 5. One is to use solid ½" $N_dF_eB$ magnet cylinders (referenced as "full magnet" in FIG. 5) and the second is to use ½" diameter cylindrical shells with a ¼" center hole to accommodate a stainless rod (referenced as "shell" in FIG. 5). As illustrated in FIG. 5, the solid cylinders were computed as achieving about 93% more torque than the shell configuration. It is anticipated that an additional 35% torque enhancement may be realized by substituting the stainless spindle through the magnet with a hardened magnetizable spindle such as 4130 or 4340 magnetizable steel. Commensurate with such a substitution there may be a small amount of cogging.

Figure 9:
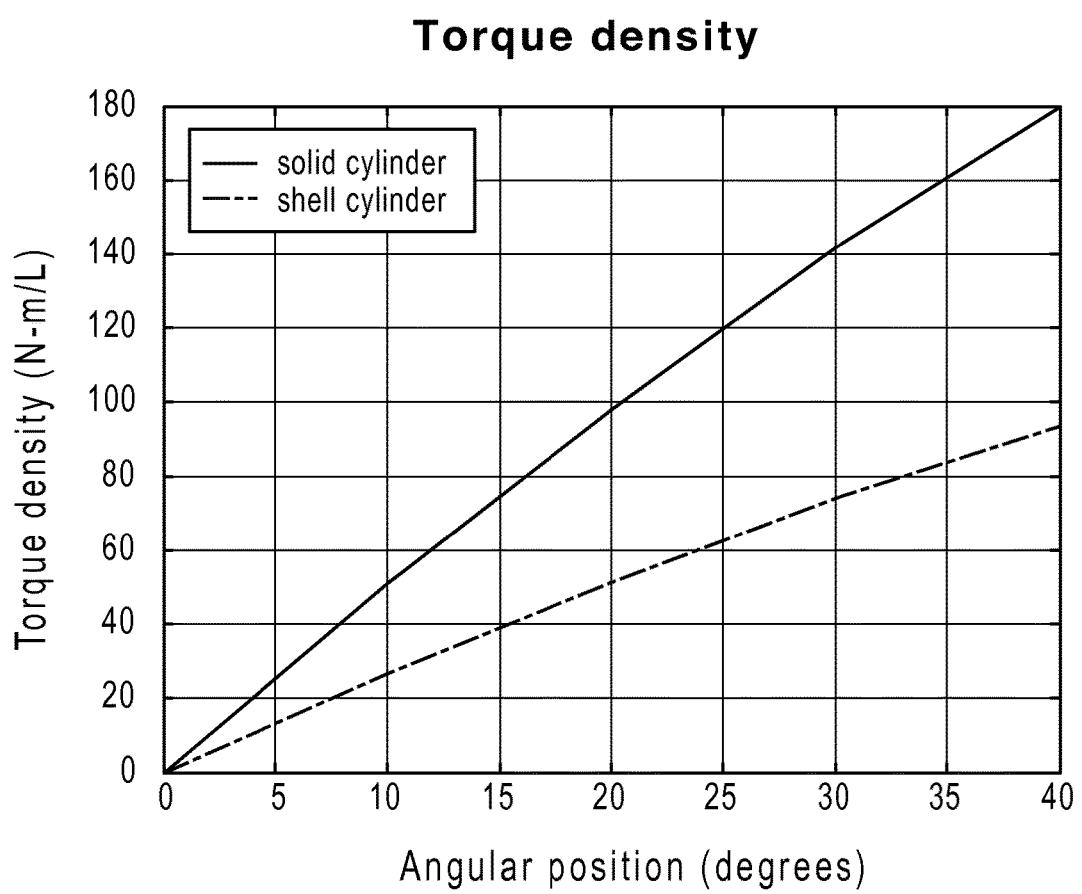
FIG. 9 shows computed torque density curves for both the shell cylinder and solid cylinder prototypes obtained by finite element simulation.

As will be explained in further detail below, FIG. 9 illustrates the modeled torque density corresponding to the two variations analyzed in FIG. 5, i.e., interpole elements having solid cylinders and interpole elements having shell cylinders with stainless steel spindles. The modeled torque density results in FIG. 9 confirm the results of FIG. 5.

As noted above, in some circumstances, it may be desirable to employ additional numerical analysis techniques in conjunction with the technique in the exemplary workflow of FIG. 4. For example, in cases where the magnetic gear, including the outer gear ring stator has a larger inner diameter and/or otherwise the field from neighboring cylinder interpole elements is expected to be significant, Newton Raphson relaxation scheme can be employed to reach convergence. After the initial analysis, all cylinders except the first cylinder can be loaded with the magnetization as determined from the superposition of the rotor and stator fields, as described above in FIG. 4. The field at the center of the first cylinder can then be determined from the rotor, the stator, and all remaining cylinders. The first cylinder can then be replaced with this magnetization and the process repeated for each of the remaining cylinders. The process is analogous to solving a diagonally dominant array using Gauss-Seidel scheme. The diagonal dominance results from the predominant influence of the rotor and stator on the cylinder's field, and these remain unchanged throughout the analysis.

Three indicators of convergence can be considered in this procedure. A first is to register the magnetization angle change per iteration pass. A second is to compute the torque ratio index (low speed output torque on the outer gear ring magnets/high speed torque on the inner gear ring magnets). This number should approach an integer representing the gear ratio. A third indicator is to compute the torque on the individual cylinders. An ideal convergence would register zero torque on the cylinders. However, a number representing below about 0.3% of the total torque is considered sufficient to give an adequate representation of performance.

Figure 6:
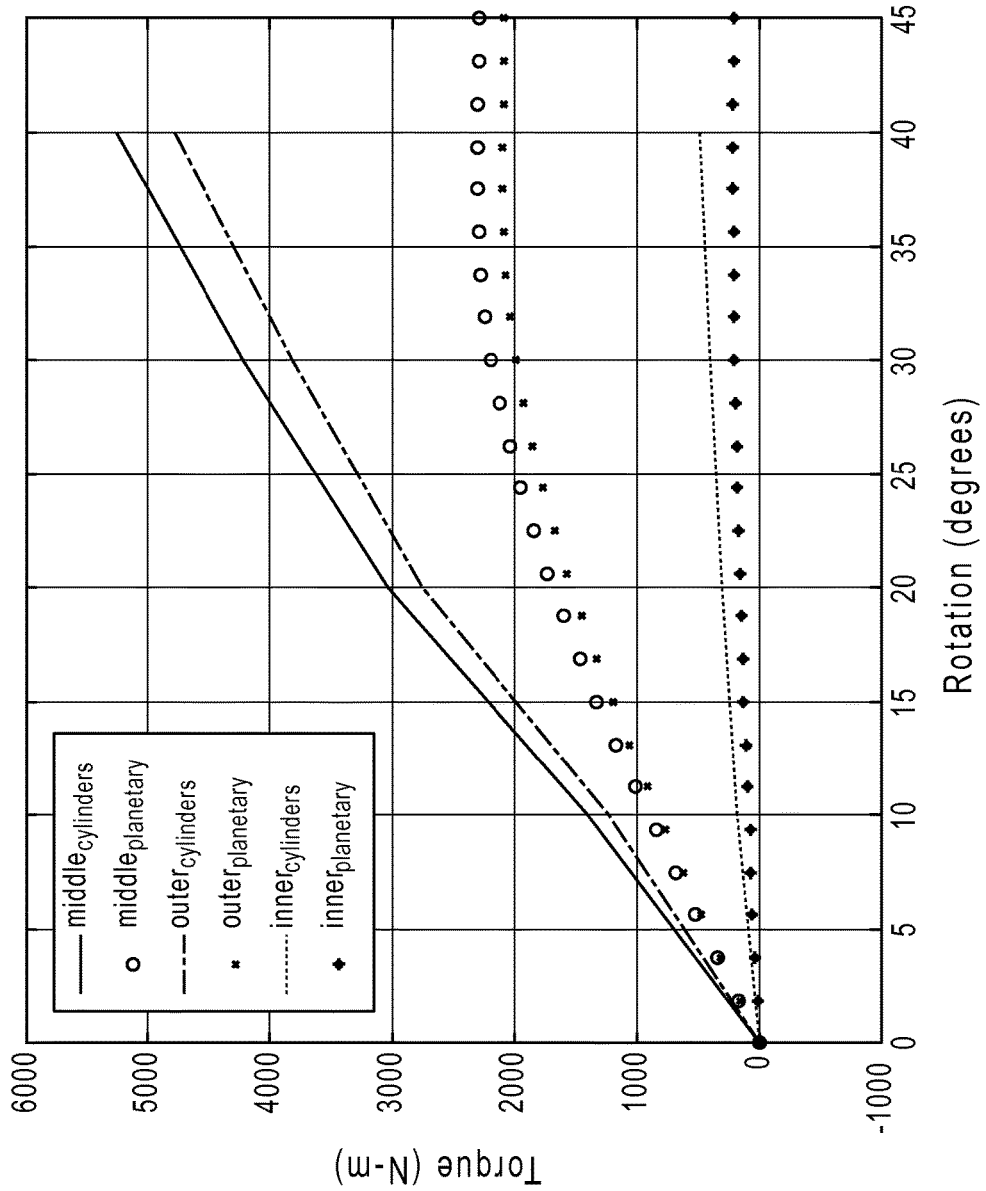
FIG. 6 shows computed torque curves for a conventional planetary magnetic gear using laminated steel wedge interpole elements and for a magnetic gear in accordance with the present disclosure that includes spinning magnetic cylinder interpole elements.

FIG. 6 shows comparative computational results using the modeling techniques described above for a conventional magnetic gear that uses 22 laminated M-19 steel interpole elements in the middle gear ring (labeled "planetary" in FIG. 6) and the same configured magnetic gear except where the interpole elements of the middle gear ring are freely spinning cylinders in lieu of the laminated stainless steel interpole elements (labeled cylinders in FIG. 6). The computed torque for the inner, middle, and outer gear rings are illustrated. The gear with spinning cylinders has about a 220% improvement on pull out torque, again with the output torque being the middle gear rings. In the results of FIG. 6, the outer diameter of the outer stationary gear ring is 14.4" and 6" in extension. The inner diameter of the stator is 12.22". The radius of the central cylinder ring is 5.45" with each cylinder having a diameter of 1.6". The outer diameter of the rotating inner gear ring is 9.6" and the inner magnets are 1" thick. The laminated steel pieces are 1.6" thick, equal to the thickness of the cylinders.

Exemplary Magnetic Gear Design and Prototype Test Results

Figure 7A:
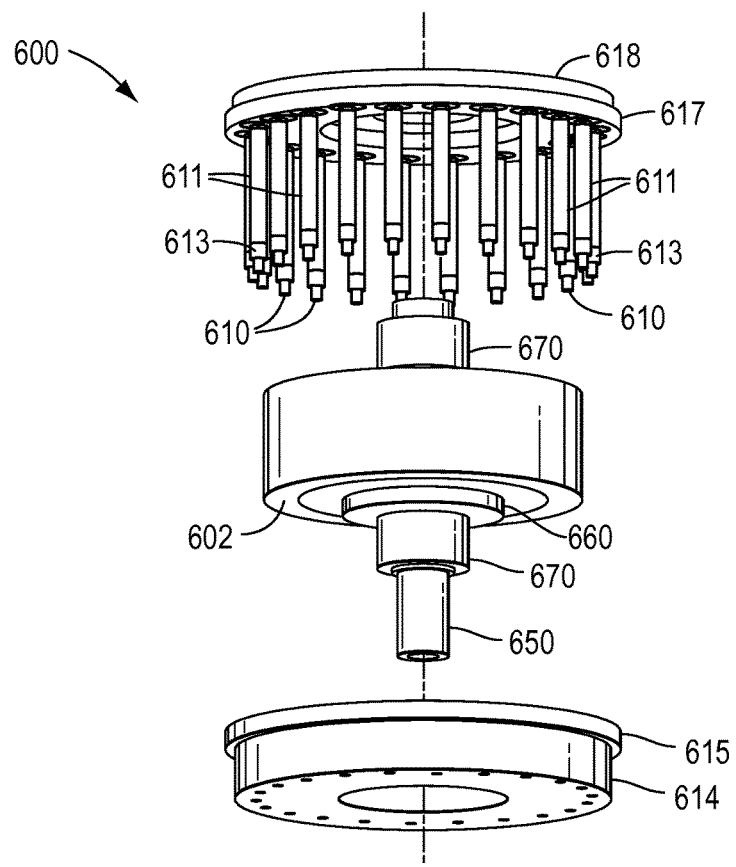
FIG. 7A is a perspective exploded view of magnetic gear components in accordance with an exemplary embodiment.
Figure 7B:
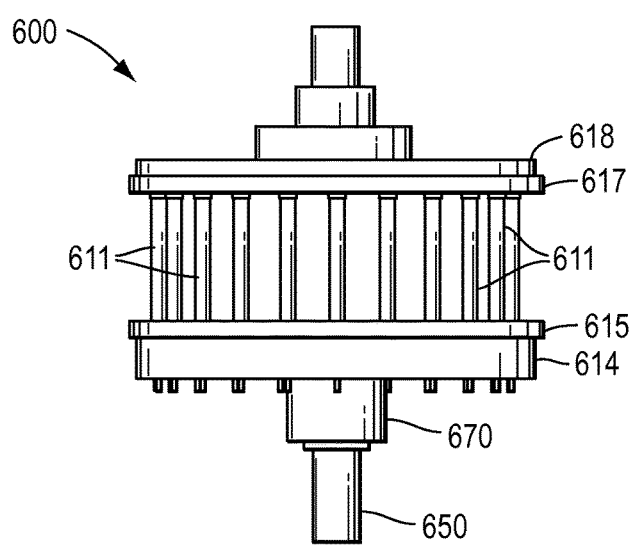
FIG. 7B is an assembled view of the components of FIG. 7A.
Figure 7C:
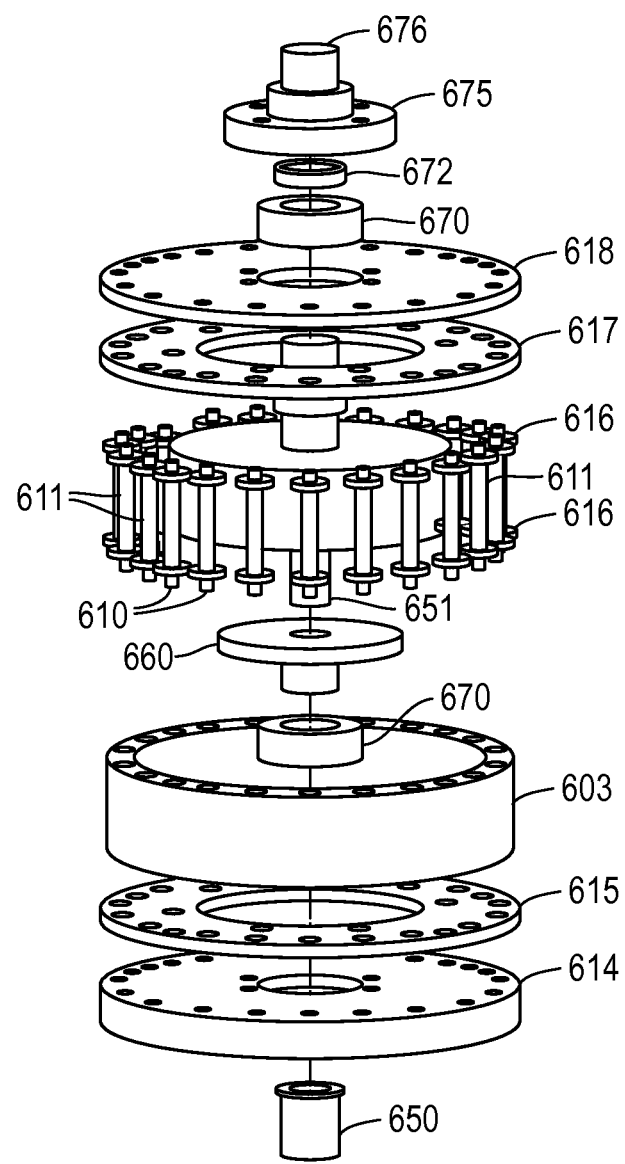
FIG. 7C is another perspective exploded view of magnetic gear components in accordance with an exemplary embodiment.
Figure 8:
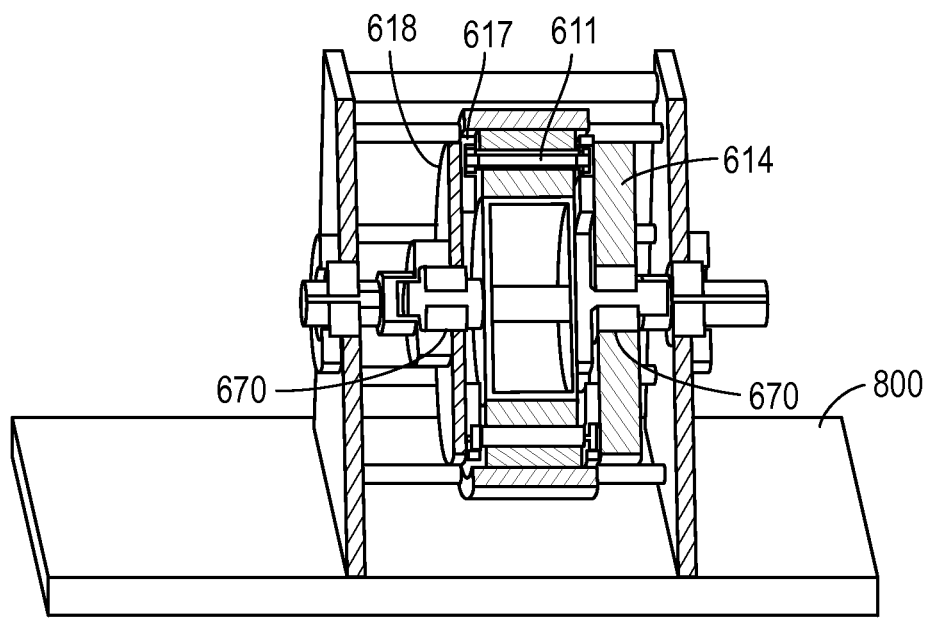
FIG. 8 is an magnetic gear assembly and support frame, with the magnetic gear shown in cutaway.

FIGS. 7-8 show various views of an exemplary embodiment of components of a magnetic gear with freely spinning interpole elements in accordance with the present disclosure. FIGS. 7A and 7B illustrate perspective exploded view and assembled view, respectively, of the inner and middle rotating gear rings; FIG. 7C illustrates an exploded view of the inner, middle, and outer gear rings; and FIG. 8 illustrates the assembled gear of FIG. 7 in cutaway and mounted in an exemplary support frame.

With reference to FIGS. 7A and 7B, an exemplary assembly 600 for the inner and middle rotating gear rings is illustrated. The inner permanent magnet gear ring 602 may be driven by a central drive shaft 651 using a high speed sleeve 650 at one end. The shaft 651 is coupled to the rotor via the sleeve 650 and a flange 660, with bearing collars 670 in turn coupling the inner gear ring 602 to high speed end plate 614 and low speed end plate 618. In various exemplary embodiments, the end plates 614, 618 may be made of aluminum or other similar non-magnetic metal. The shaft 651 through the low speed end plate 618, bearing collar 670, and a sleeve 672 to hold bearing 670 is in turn coupled to a low speed output flange 675 that connects to a low speed output shaft 676.

As described above, freely spinning magnetic cylinders 610, that optionally may be either solid or supported axially on spindles as described above, can be supported at their respective ends by electrically insulative plates 615, 617, which may be, for example made of Delrin®, nylon, or other suitable durable plastic. As shown best in FIGS. 7A and 7C perhaps, in an exemplary embodiment, the spinning cylinders 610 are positioned within an electrically insulative outer sleeve 611, e.g., a sleeve made of Delrin®, Nylon, or other electrically insulative, high strength material, in a manner that permits the cylinders 610 to spin freely within the sleeves 611. Flanges 613 may be provided at the ends of the sleeves 611 and the flanges 613 can be received by the bearing collars 616 fitted in the plates 615, 617. With this configuration, cylinder-to-cylinder eddy currents are substantially prevented. Conventional steel roller bearings can be employed if the bearing housing is insulated on one side by a thin electrically insulating sleeve such as, for example, Delrin or nylon.

The assembled rotor is shown in FIG. 7B and the complete magnetic gear mounted in a support frame 800 with a sectional view of the gear is shown in FIG. 8.

Optionally, as depicted in FIG. 7C and mentioned above, a cylindrical, insulative jacket 603 may be used to hold the interpole cylinder elements and thus be part of the middle gear ring.

EXAMPLE

An assembled prototype used a configuration similar to that depicted in FIGS. 7-8, with shell magnet cylinders epoxied to stainless steel spindles. The tips of these stainless spindles fit into the bearings which reside in the electrically insulative end plates, as described above in FIGS. 7-8. For the torque results measured in FIG. 5 (labeled as "measured" in that figure), a socket wrench was coupled to the input (high speed) shaft and a torque wrench was coupled to the output (low speed) shaft. A ratchet drive and appropriate channel lug were used to lock down rotation on the low speed shaft. The torque wrench was set to a number of values from 10 ft-lbs (13.56 Nm) up to 70 ft-lbs (94.9 Nm) and the rotation required to reach that torque was measured for each setting. The maximum pullout torque was determined as being indicated by magnetic pole slippage, which occurred just above 70 ft-lbs (95 Nm). The high torque data annotated as "inferred" in FIG. 5, was scaled from the measured low torque data by the gear ratio 1:11. The scaling was confirmed only at a low torque value (120 ft-lbs, 163 Nm), still within the range of the torque wrench.

The assembled and tested prototype had no detectable cogging or vibration as determined by rotating the assembled structure by hand. It displayed an 11:1 rotation speed and torque ratio. The torque and pull out torque were measured and appear as the circles on FIG. 5 for the hollow cylinder shell interpole arrangement with a stainless steel spindle. A high torque drill was used to rotate the high speed side with no discernible heating.

Variable Ratio Magnetic Gears

Figure 23:
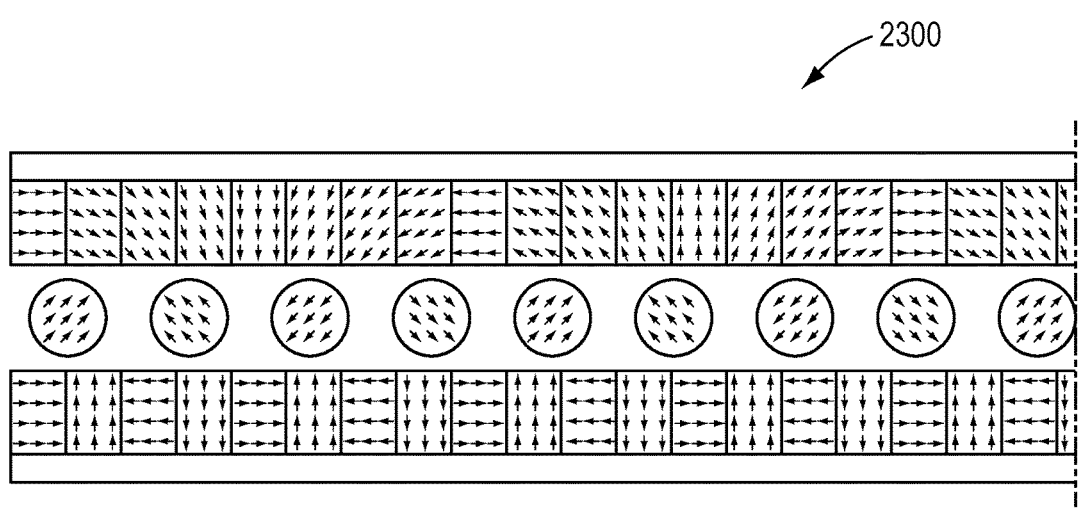
FIG. 23 is a schematic plan view of yet another exemplary embodiment of a magnetic gear in accordance with the present disclosure.

Although the magnetic gears in the exemplary embodiments described above provide speed/torque conversion, they are limited to one gear ratio (e.g., a 10:1 gear ratio for some of the exemplary configurations described), and therefore only have one speed, and consequently one torque output. In accordance with aspects of the present disclosure, magnetic gears may be configured to have a variable gear ratio, and therefore change speeds and torque outputs. Those of ordinary skill in the art will understand that the magnetic gears shown and described above are exemplary only, and are intended to demonstrate exemplary types of magnetic gears with which the principles of the present disclosure may be used. Accordingly, the techniques and methods disclosed in the present disclosure may be applied to any type and/or configuration of magnetic gear (whether having variable or one gear ratio) as understood by those of ordinary skill in the art, including, but not limited to, rotary magnetic gears and linear magnetic gears (see FIG. 23).

Changing Magnetic Pole Count

In accordance with aspects of the present disclosure, a magnetic gear ratio change may be achieved by changing both the magnetic pole count on at least one of the gear members and the coupling coefficient of the interpole elements. Conventional variable-ratio magnetic gears, for example, generally change the coupling coefficient of the interpole elements by either thermally driving the interpole elements past their curie point, or by introducing electromagnets into the interpole region to allow active excitation of the interpole elements. Such configurations of interpole elements, however, generally lead to gear arrangements that are relatively complex and/or complicated to operate. Exemplary embodiments in accordance with the present disclosure can provide more robust variable-ratio magnetic gears, in which the magnetic gear ratio may be changed, for example, without thermally heating the interpole elements and without actively exciting the interpole elements.

Figure 10:
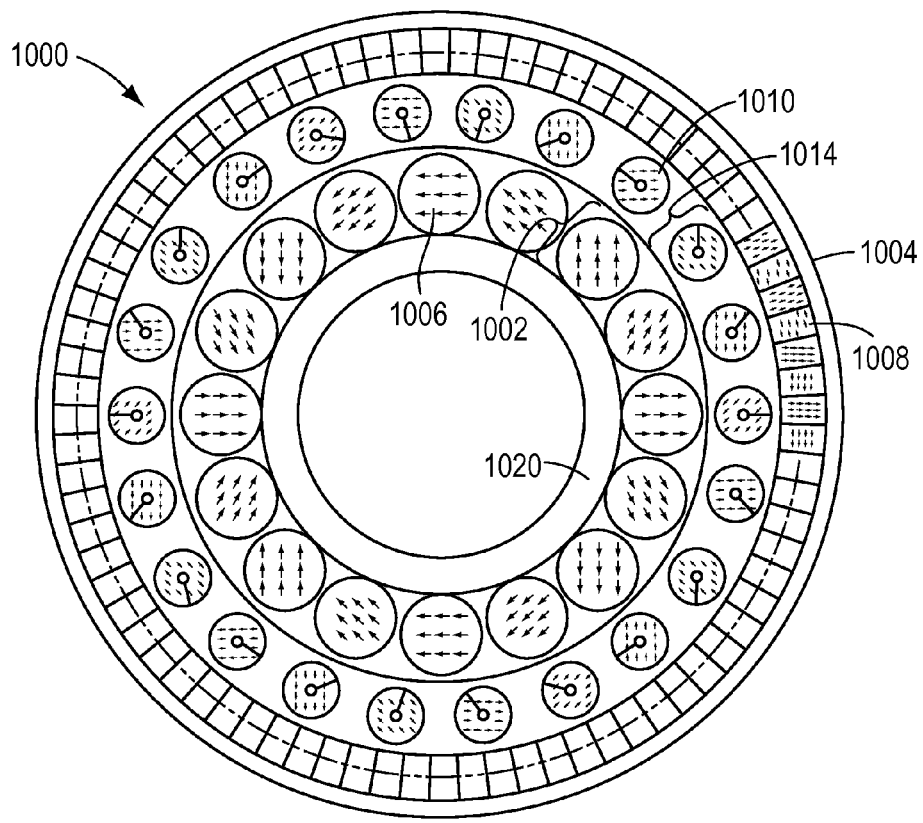
FIG. 10 is a schematic plan view of another exemplary embodiment of a magnetic gear in accordance with the present disclosure.

In various exemplary embodiments of the present disclosure, the number of magnetic pole pairs (pole count) on an inner gear ring of a magnetic gear may, for example, be changed by rotating each permanent magnet on the inner gear ring with respect to its neighboring permanent magnet. Accordingly, various embodiments of the present disclosure contemplate replacing the inner gear ring 102 of the magnetic gear 100 illustrated in FIG. 1 and the inner gear ring 202 of the magnetic gear 200 illustrated in FIG. 2 with a gear ring comprising individually rotatable magnetized cylinders. As illustrated in FIG. 10, for example, the inner gear 1002 of the magnetic gear 1000 comprises a plurality of individually rotatable magnetized cylinders 1006 (which may include, for example, permanent magnet cylinders and/or temporarily magnetized cylinders) that also rotate together around the axis of the gear. Thus, in accordance with various exemplary embodiments of the present disclosure, a rotary magnetic gear 1000 has an inner gear ring 1002 of magnetized cylinders 1006 and an outer gear ring 1004 of permanent magnets 1008. Free-spinning magnetized cylinders 1010, such as, for example, free-spinning permanent magnets, are provided as interpole elements positioned between the inner gear ring 1002 and the outer gear ring 1004. As shown in FIG. 10, the cylinders 1010 can be mounted in a middle gear ring 1014 and can have the various configurations as described above with respect to the exemplary embodiments of FIGS. 2, 3, and 6-8.

Figure 11:
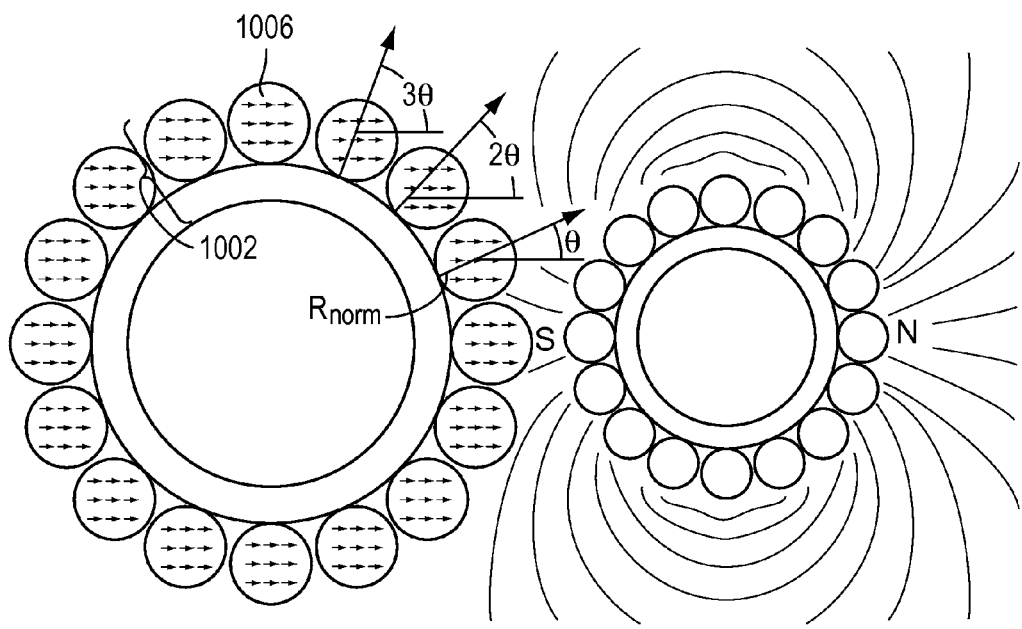
FIG. 11 is a schematic plan view of an exemplary configuration of an inner gear ring of the magnetic gear of FIG. 10 and corresponding magnetization field plot for the inner gear ring.

While not wishing to be bound by any particular theory, it is believed that a slight adjustment of the relative angular position of the magnetized cylinders 1006 of the inner gear ring 1002 may change the effective number of magnetic poles acting on the middle gear ring 1014 and the outer gear ring 1004 of the magnetic gear 1000. As shown with respect to FIGS. 11-14, for example, the number of magnetic poles (and magnetic pole pairs) on the inner gear ring 1002 may be changed by adjusting the relative angular position of each magnetized cylinder 1006 by an angle θ off of a radial normal $R_{Norm}$ more than a neighboring magnetized cylinder 1006 (i.e., by adjusting the relative rotation of each cylinder 1006 by θ, 2θ, 3θ, etc. as shown for, example, in FIG. 11A). In other words, each magnetized cylinder 1006 is rotated by a relative rotation angle θ with respect to an adjacent magnetized cylinder 1006. Given this starting orientation, the cylinders 1006 are then configured to spin synchronously as explained below. As shown in FIG. 11, for example, when each magnetized cylinder 1006 is adjusted 22.5 degrees off $R_{Norm}$ more than a preceding neighboring magnetized cylinder 1006 in the clockwise direction, the resulting magnetic field pattern of the gear ring 1002 is that of a two pole device (having 1 north (N) pole and 1 south (S) pole), as shown.

Figure 12:
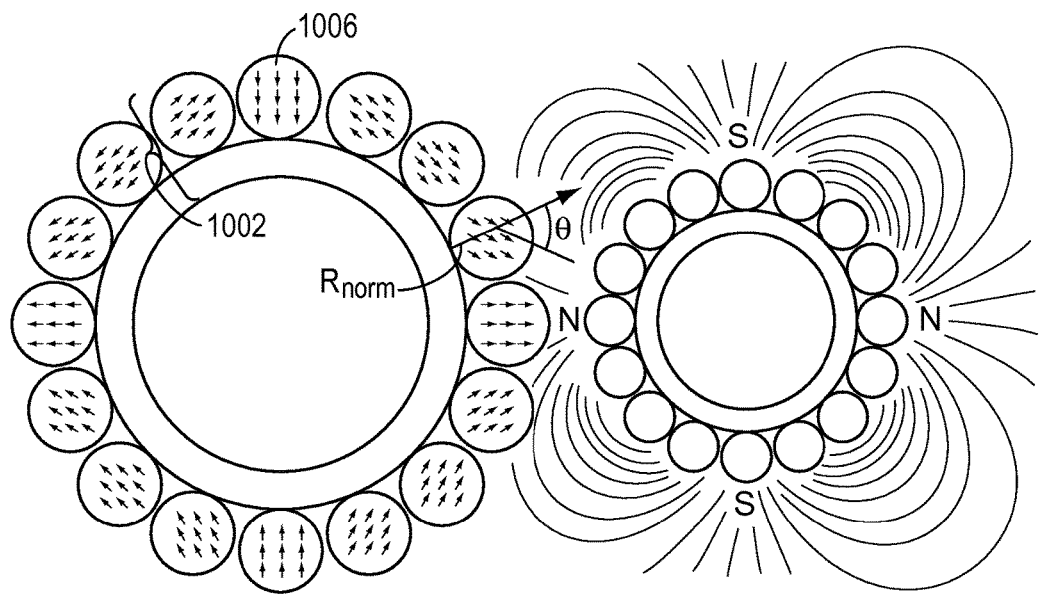
FIG. 12 is a schematic plan view of another exemplary configuration of the inner gear ring of the magnetic gear of FIG. 10 and corresponding magnetization field plot for the inner gear ring.
Figure 13:
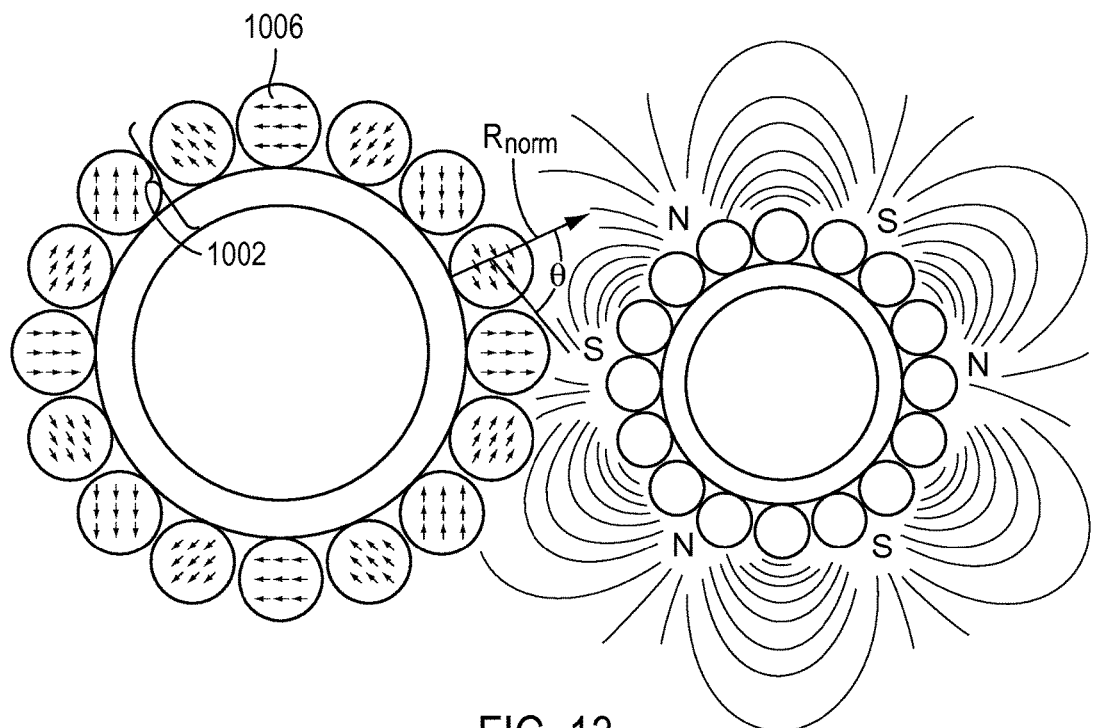
FIG. 13 is a schematic plan view of a yet another exemplary configuration of the inner gear ring of the magnetic gear of FIG. 10 and corresponding magnetization field plot for the inner gear ring.
Figure 14:
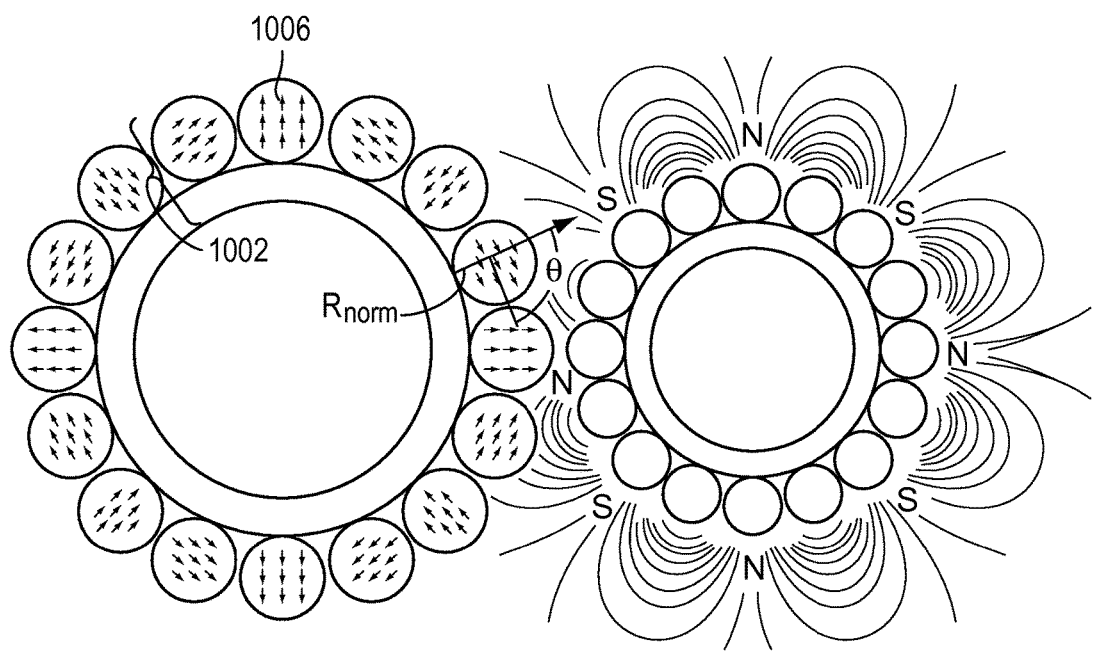
FIG. 14 is a schematic plan view of another exemplary configuration of the inner gear ring of the magnetic gear of FIG. 10 and corresponding magnetization field plot for the inner gear ring.

As shown in FIG. 12, when the relative rotation angle θ of the magnetized cylinders 1006 is doubled to 45 degrees, the resulting magnetic field pattern of the gear ring 1002 is that of a four pole device, as illustrated. In the same manner, when the relative rotation angle θ of the magnetized cylinders 1006 is adjusted to 67.5 degrees as in FIG. 13, the resulting magnetic field pattern of the gear ring 1002 is that of a six pole device. And when the relative rotation angle θ of the magnetized cylinders 1006 is adjusted to 90 degrees as illustrated in FIG. 14, the resulting magnetic field pattern of the gear ring 1002 is that of an eight pole device as shown. The slight relative rotational adjustment of the magnetized cylinders 1006 of the inner gear ring 1002 may, therefore, be used to change the gear ratio of the magnetic gear 1000 in a very simple and efficient manner (e.g., even during dynamic operation of the magnetic gear 1000).

Preserving the relative position of the magnetized cylinders 1006 can ensure that the inner gear ring 1002 continues to behave as a rotating dipole field (i.e., continues to generate the desired magnetic field), even though the ring 1002 of magnetized cylinders does not rotate as a whole ring around the axis of the magnetic gear 1000. In other words, in various embodiments of the present disclosure, the cylinders 1006 are configured to spin individually, but synchronously, about their own axis. Thus, in various exemplary embodiments, it is contemplated that each cylinder 1006 is individually driven by a driving mechanism, such as a motor (not shown). For example, a controllable motor drive that monitors angular shaft position as a feedback variable at every speed can be used to drive the inner gear ring cylinders. Such driving motors may, for example, be controlled by a master control processor (not shown) to synchronize the speed and position of each cylinder in order to control, for example, the rotation and orientation of the magnetized cylinders relative to each other. Thus, the relative rotation angle of each magnetized cylinder may be adjusted (and the pole count on the inner gear ring changed accordingly), for example, via the master control processor even during dynamic operation of the magnetic gear. In various additional embodiments, the cylinders 1006 can be driven by a single external motor drive (not shown) or by individual motors or plural motors that spin groups of cylinders 1006. In such a configuration, for example, the relative position of each cylinder 1006 may be assigned once by something akin to a timing chain. Thus, those of ordinary skill in the art would understand that various methods and/or techniques may be utilized to both adjust and preserve the relative position of the magnetic cylinders of the inner gear ring.

To control the timing of rotation and thus the relative angular positions of the cylinders 1006, for example, with reference to FIG. 10, an inner rotor 1020 may engage with and control the speed of rotation of the cylinders 1006. For example, the cylinders 1006 of the inner gear ring 1002 can be placed tangent to a central rotor or drive ring 1020 such that rotation of the drive ring 1020 controls the tangential speed of the cylinders 1006. In various exemplary embodiments, it may be desirable to serrate, roughen, or coat the outer surface of the drive 1020 appropriately to discourage slippage between the surfaces of the drive 1020 and the cylinders 1006 during rotation. Without slippage, the relative positions/orientations of each cylinder 1006 is fixed to the drive 1020, so as the relative positions/orientations of cylinders 1006 to each other.

In another exemplary embodiment, a timing chain or belt that forces the rotation position of each cylinder to be maintained can be used and coupled to the drive motor, as those having ordinary skill in the art would be familiar with. The cylinders can be rotated individually with their own motors or corporately or in groups through a linkage to the timing belt. In yet another exemplary embodiment, each of the cylinders 1006 can be directly driven with individual controllable motors (or with groups of such motors controlling groups of cylinders) that monitor angular shaft position as a feedback variable at every speed. A master controller can be used to control the rotation and orientation of each cylinder relative to each other.

Those of ordinary skill in the art would understand that the embodiments illustrated in FIGS. 10-14 are exemplary only and that the magnetized cylinders of an inner gear ring having a configuration like those of FIGS. 10-14 may be adjusted at various angles in order to achieve a desired gear ratio change. Those of ordinary skill in the art would also understand that the magnetic gear 1000 is illustrated for exemplary purposes only and that magnetic gears in accordance with the present disclosure may have various sizes, numbers, shapes and/or configurations of permanent magnets in the inner, middle, and outer gear rings without departing from the scope of the present disclosure and claims. Accordingly, although not shown, those of ordinary skill in the art would understand that in the same manner the inner gear ring 102 of the magnetic gear 100 in FIG. 1 can be replaced by a gear ring comprising a plurality of magnetized cylinders, such as, for example, a plurality of permanent magnet cylinders, in order to change the pole count on the inner gear ring 102 of the magnetic gear 100 illustrated in FIG. 1. Based on the teachings of the present disclosure, it is therefore within the ability of one skilled in the art to determine a gear design to achieve a desired gear ratio and gear ratio change, and the present disclosure is not intended to be limited to the exemplary embodiments shown and described herein.

Changing Coupling Coefficient of Interpole Elements

As above, altering the pole count on at least one of the gear members (e.g., the inner gear ring) constitutes one step to making an effective gear change. Various exemplary embodiments of the present disclosure also contemplate changing the coupling coefficient of the interpole elements to affect a magnetic flux transfer between the gear members at more than one pole pair count. Thus, when the pole count is altered, such as, for example, on the inner gear ring 1002 of the magnetic gear 1000 illustrated in FIG. 10, the interpole elements may affect a magnetic flux transfer between the gear members 1002 and 1004 at both the original pole count and the altered pole count.

In various exemplary embodiments of the present disclosure, the coupling coefficient of the interpole elements may, for example, be changed by grouping, or clustering, the interpole elements. In various additional embodiments, the coupling coefficient of the interpole elements may be changed by varying both the size and angular position of the interpole elements. Accordingly, various embodiments of the present disclosure contemplate varying the size and angular position of the interpole elements 110 of the magnetic gear 100 illustrated in FIG. 1 (see, e.g., FIGS. 15, 17, and 19); and various additional embodiments contemplate varying the size and angular position of the interpole elements 210 of the magnetic gear 200 illustrated in FIG. 2 (see, e.g., FIGS. 21 and 22).

While not wishing to be bound by any particular theory, it is believed that by varying the size and position of the interpole elements, the coupling coefficient of the interpole elements can be changed so as to modulate the magnetic flux transferred between the gear members at more than one pole pair combination. In other words, the magnetic flux modification can occur at more than one gear ratio. As shown with respect to FIGS. 15, 17, 19 (in which the inner gear rings are not shown), for example, the coupling coefficient of interpole elements, in the form of magnetizable blocks or wedges, such as, for example, laminated steel blocks or wedges 1510, 1710, and 1910 in respective middle gear rings 1514, 1714, and 1914, may be changed by both changing the size of the interpole elements and by clustering the interpole elements into respective groups 1520, 1720, and 1920.

Figure 15:
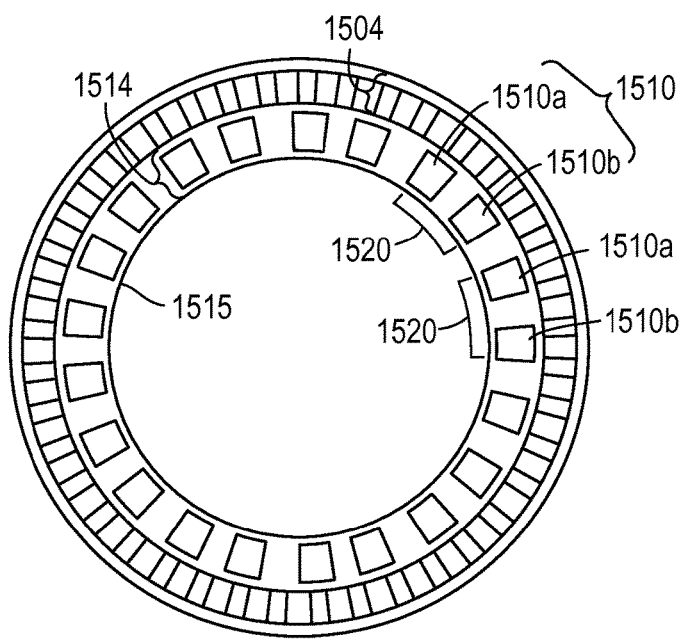
FIG. 15 is a schematic plan view of an exemplary embodiment of a middle gear ring of a magnetic gear in accordance with the present disclosure.

As shown in FIG. 15, in various embodiments of the present disclosure, for example, the wedges 1510 are clustered into groups 1520 of two wedges 1510a and 1510b, wherein each wedge 1510a is slightly thinner than each wedge 1510b (e.g., each wedge 1510b has a slightly larger angular span than each wedge 1510a). Thus, the 21 wedges illustrated in FIG. 15 are grouped into pairs, wherein each pair is spaced approximately 34.3 degrees from its neighboring pair. In other words, as would be understood by those of ordinary skill in the art, the azimuthal wedge span of the wedges in each group is alternated between 360/22/2 degrees and 360/21/2 degrees.

Figure 16A:
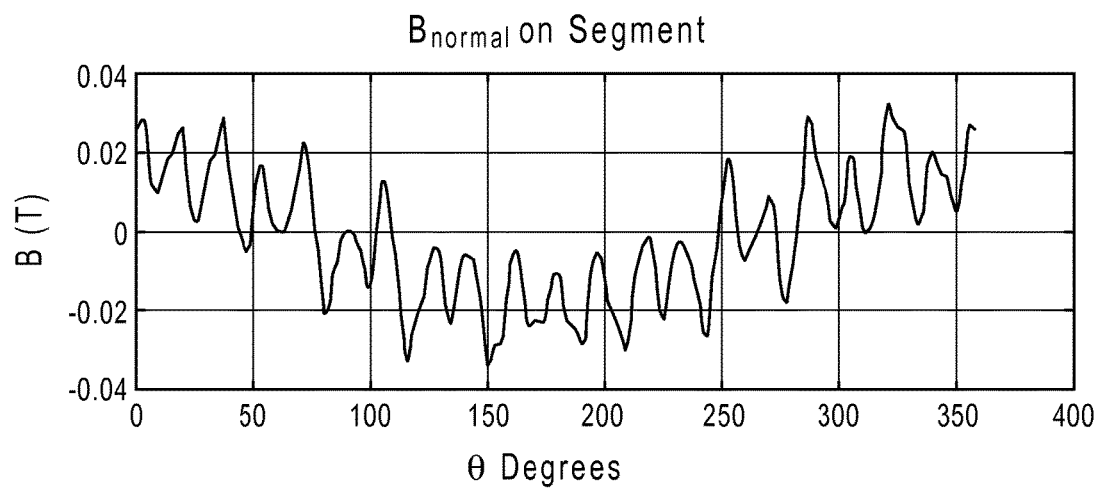
FIGS. 16A and 16B are a radial magnetic B field plot and harmonic field content plot, respectively, for the middle gear ring of FIG. 15.
Figure 16B:
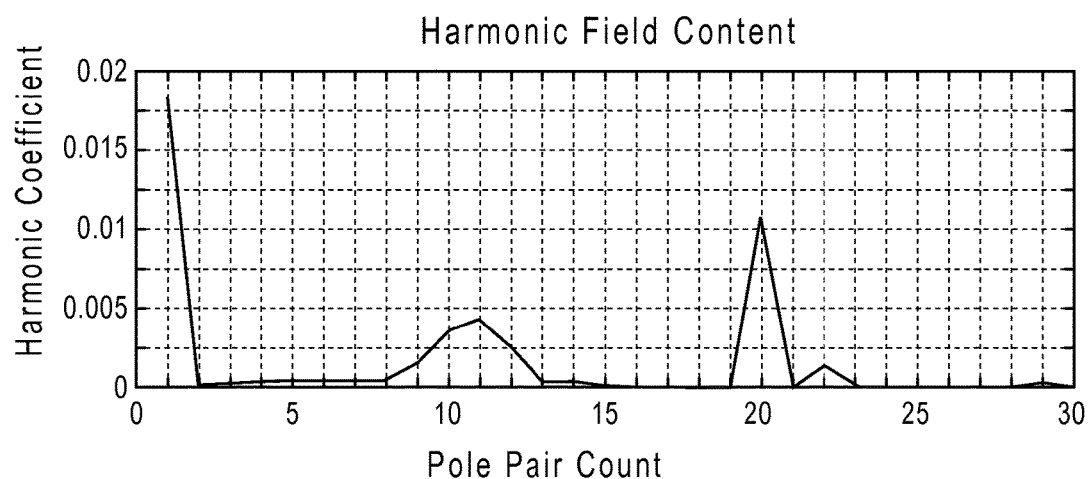

As illustrated in FIG. 16A, the radial magnetic B field along an inner perimeter 1515 of the middle gear ring 1514 may be calculated, for example, with a boundary element code as would be understood by those of ordinary skill in the art. As also illustrated in FIG. 16A, the radial magnetic B field can then be represented as a sum of Fourier components, wherein the coupling coefficients (i.e., harmonic coefficients) are computed using standard Fourier analysis as would also be understood by those of ordinary skill in the art. Thus, the harmonic field content plot illustrated in FIG. 16B demonstrates that an outer gear ring 1504 having 40 poles (20 pole pairs) can be made to couple to an inner gear ring (not shown) with 1 pole pair (the normative coupling coefficient), 10 pole pairs, 11 pole pairs, and 12 pole pairs. In other words, by varying the size and radial spacing of the steel wedges 1510, new coupling options now appear for 10, 11, and 12 pole pairs on an inner ring, which respectively correspond to gear ratios 2:1 (20/10), 1.81:1 (20/11), and 1.667:1 (20/12) for the coupling between the inner gear ring (not shown) and the outer gear ring 1504. Thus, this pairing of interpole elements illustrates that a departure from an even spacing of 360/21 degrees may introduce additional harmonics into the coupling of the outer field source pattern with the inner field source pattern.

Figure 17:
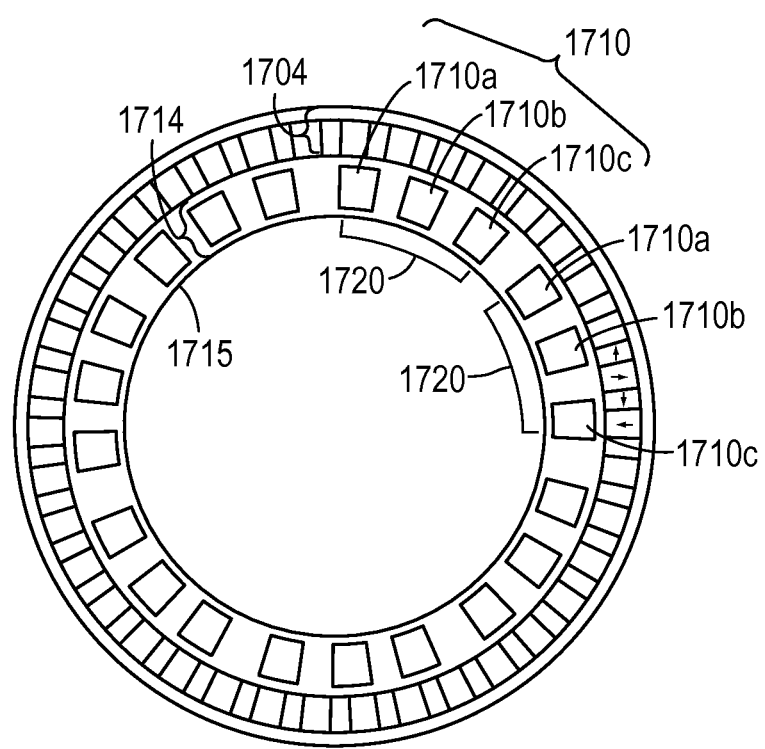
FIG. 17 is a schematic plan view of another exemplary embodiment of a middle gear ring of a magnetic gear in accordance with the present disclosure.

In various additional embodiments, as illustrated in FIG. 17 steel wedges 1710 are clustered into groups 1720 of three wedges 1710a, 1710b, and 1710c of slightly increasing thickness (e.g., of slightly increasing angular span), wedge 1710c being the thickest wedge of the group 1720. Thus, the 21 wedges illustrated in FIG. 17 are grouped into seven groups of three, wherein each group 1720 is spaced approximately 51.4 degrees from its neighboring group 1720. In other words, as would be understood by those of ordinary skill in the art, the azimuthal wedge span of the wedges in a group is alternated between 360/23/2 degrees, 360/22/2 degrees, and 360/21/2 degrees.

Figure 18A:
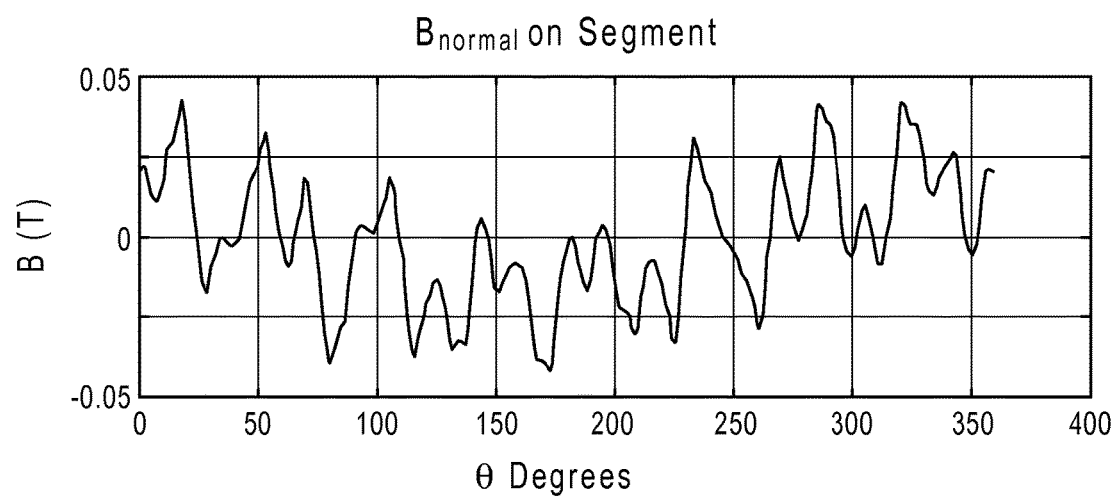
FIGS. 18A and 18B are a radial magnetic B field plot and harmonic field content plot, respectively, for the middle gear ring of FIG. 17.
Figure 18B:
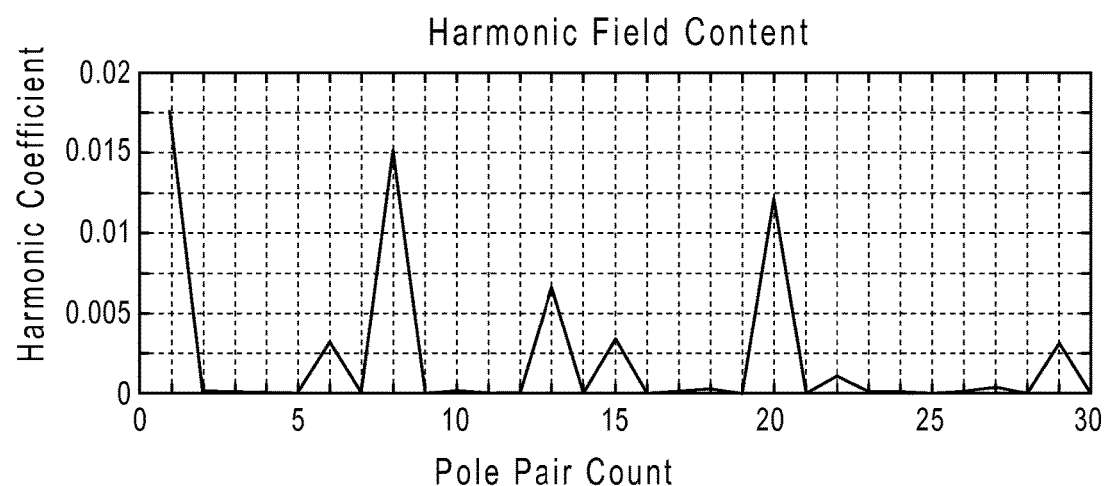

As above, the radial magnetic B field along an inner perimeter 1715 of the middle gear ring 1714 may be calculated and represented as a sum of Fourier components to compute the coupling coefficients (i.e., harmonic coefficients), as illustrated in FIG. 18A. Thus, the harmonic field content plot illustrated in FIG. 18B demonstrates that an outer gear ring 1704 having 40 poles (20 pole pairs) can be made to couple to an inner gear ring (not shown) with 1 pole pair (the normative coupling coefficient), 6 pole pairs, 8 pole pairs, 13 pole pairs, and 15 pole pairs. In other words, by varying the size and radial spacing of the steel wedges 1710, new coupling options can now be obtained for 6, 8, 13, and 15 pole pairs on an inner ring, which respectively correspond to gear ratios 3.33:1 (20/6), 2.5:1 (20/8), 1.54:1 (20:13), and 1.33:1 (20:15) for the coupling between the inner gear ring (not shown) and the outer gear ring 1704. In particular, two additional strong coupling options are now available for 8 and 13 pole pairs on the inner ring, as illustrated by the two large peaks on the harmonic field content plot of FIG. 18B. Thus, two particularly strong couplings are now available for 2 pole pairs (providing a 20:2 gear ratio) and 8 pole pairs (providing a 20:8 gear ratio), as also illustrated by the two largest (i.e., strongest) peaks on the harmonic field content plot of FIG. 18B. Consequently, clustering the wedges more closely, for example, in groups of three instead of two (which is an integer divisible into 21) will give a cleaner generation of new gear coupling options.

Figure 19:
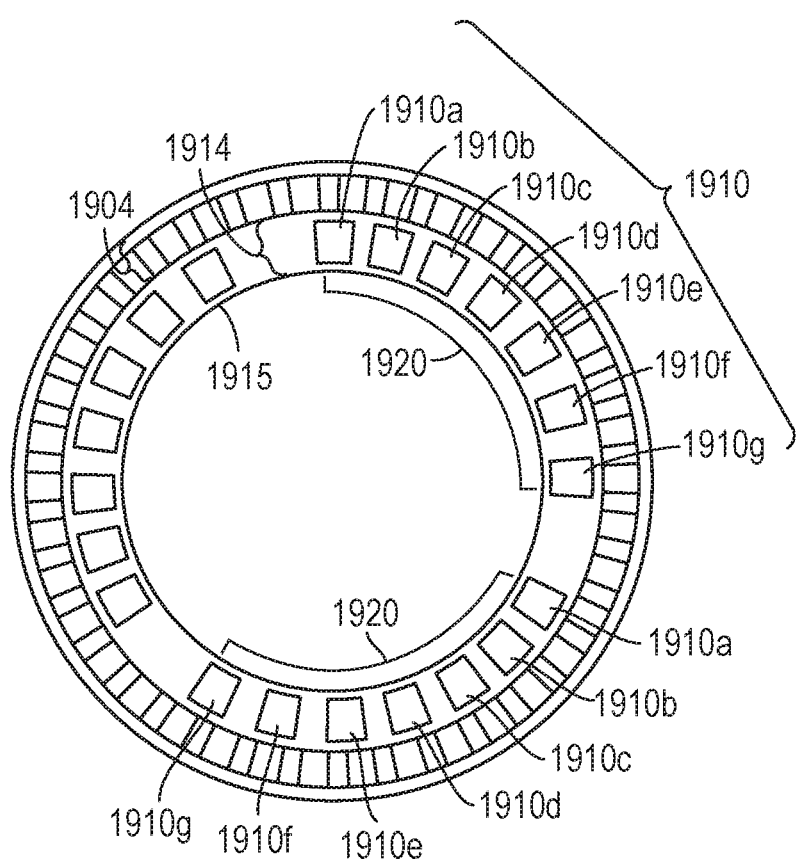
FIG. 19 is a schematic plan view of yet another exemplary embodiment of a middle gear ring of a magnetic gear in accordance with the present disclosure.

In various further embodiments, as illustrated in FIGS. 19 and 20, not only can additional coupling options be added to the normative coupling coefficient, but the coupling coefficient can be transformed to another value completely. As illustrated in FIG. 19, for example, steel wedges 1910 may be clustered into groups 1920 of seven wedges 1910a, 1910b, 1910c, 1910d, 1910e, 1910f, and 1910g of slightly increasing thickness (e.g., of slightly increasing angular span), with wedge 1910g being the thickest wedge in the groups 1920. Thus, the 21 wedges illustrated in FIG. 19 are grouped into three groups of seven, wherein each group 1920 is spaced approximately 120 degrees from its neighboring group 1920. In other words, the azimuthal wedge span of the wedges is alternated between 360/27 degrees, 360/26 degrees, 360/25 degrees, 360/24 degrees, 360/23 degrees, 360/22; and 360/21 degrees.

Figure 20A:
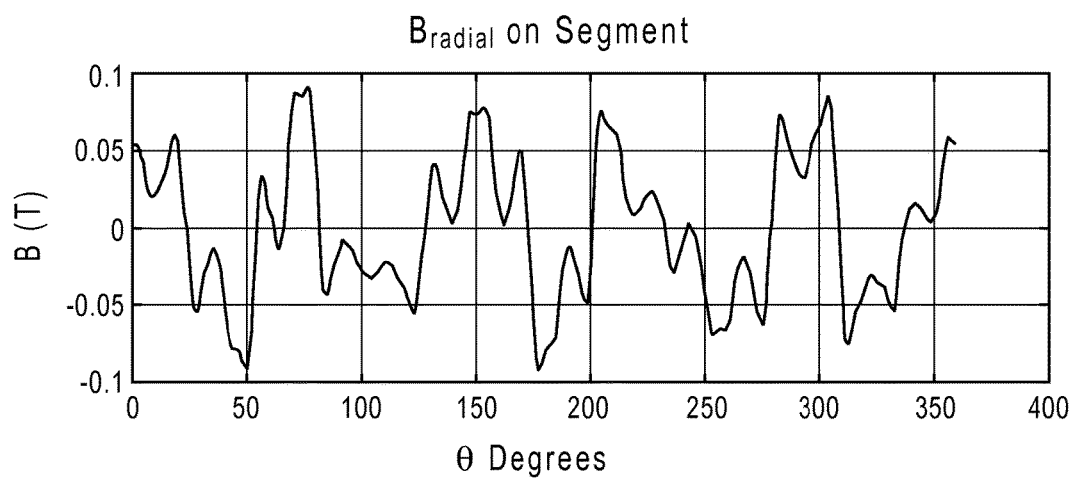
FIGS. 20A and 20B are a radial magnetic B field plot and harmonic field content plot, respectively, for the middle gear ring of FIG. 19.
Figure 20B:
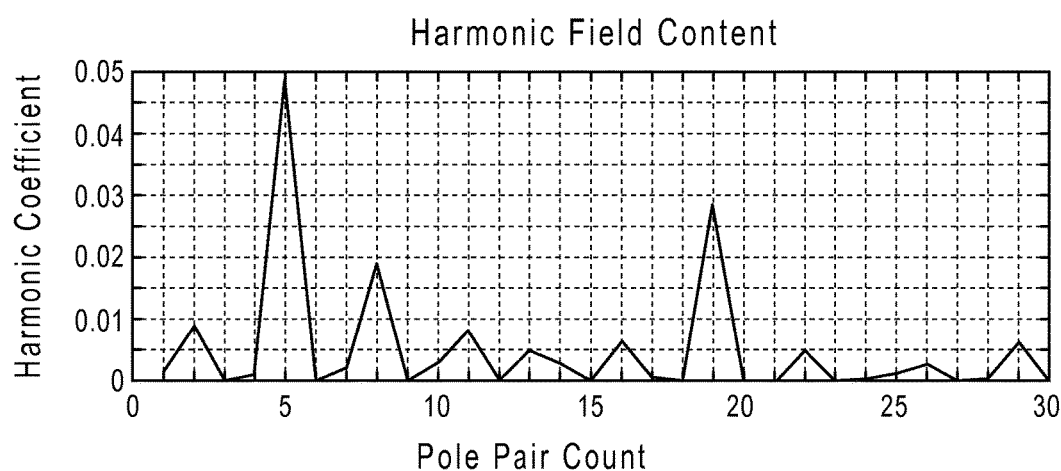

As above, the radial magnetic B field along an inner perimeter 1915 of the middle gear ring 1914 may be calculated and represented as a sum of Fourier components to compute the coupling coefficients (i.e., harmonic coefficients) as illustrated in FIG. 20A. Thus, the harmonic field content plot illustrated in FIG. 20B demonstrates that an outer gear ring 1904 having 38 poles (19 pole pairs) can be made to couple to an inner gear ring (not shown) with 2 pole pairs, 5 pole pairs, 8 pole pairs, 11 pole pairs, 13 pole pairs, and 16 pole pairs. Particularly, however, the primary coupling (i.e., the strongest coupling) is now to an inner gear ring with 5 pole pairs instead of an inner gear ring with 2 pole pairs, as illustrated by the large peak at a 5 pole pair count on the harmonic field content plot of FIG. 20B.

Figure 21:
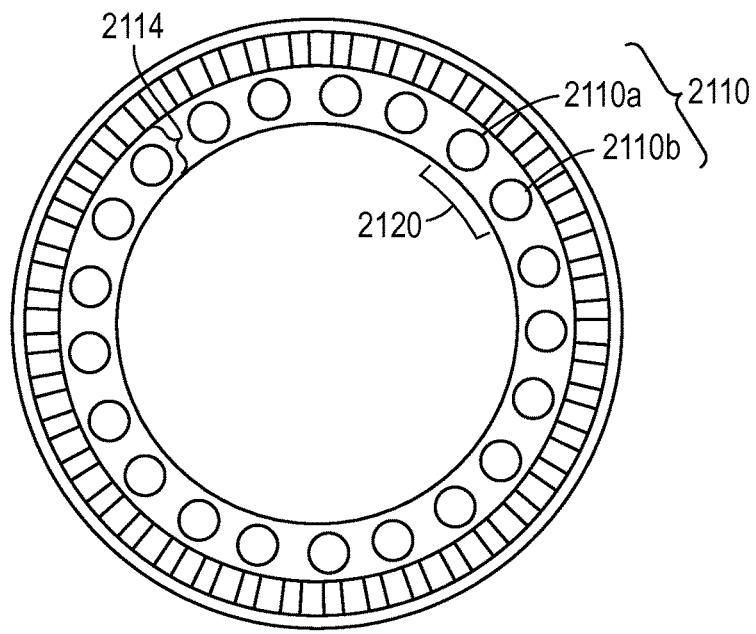
FIG. 21 is a schematic plan view of an another exemplary embodiment of a middle gear ring of a magnetic gear in accordance with the present disclosure.
Figure 22:
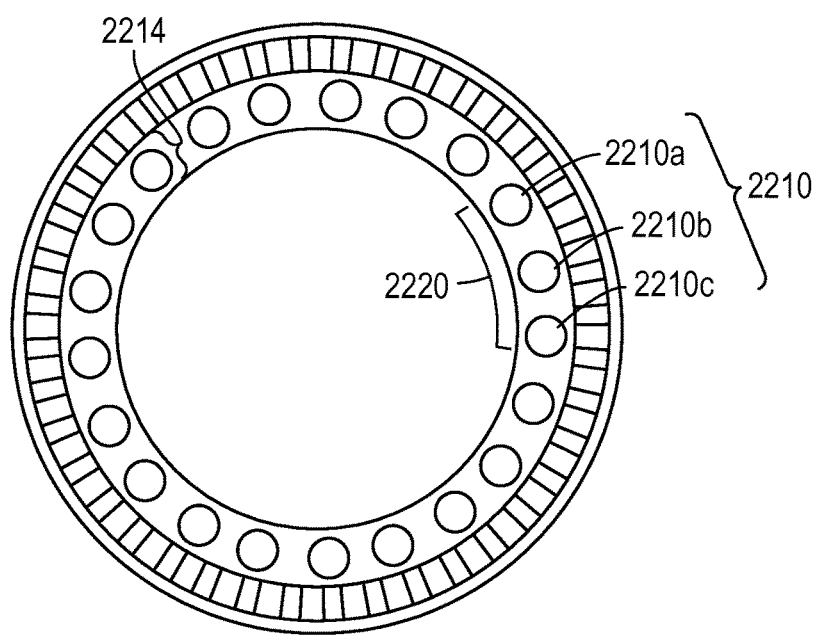
FIG. 22 is a schematic plan view of another exemplary embodiment of a middle gear ring of a magnetic gear in accordance with the present disclosure.

Those of ordinary skill in the art would understand, however, that the embodiments illustrated in FIGS. 15-20 are exemplary only and that the interpole elements (e.g., steel wedges 1510, 1710, and 1910) can have various sizes, numbers, positions, groupings, shapes, and/or other configurations to achieve a desired coupling coefficient change and thus a desired gear ratio change. As illustrated in FIGS. 21 and 22, for example, various additional embodiments of the present disclosure contemplate varying the size and angular position of free-spinning magnetized elements (e.g., free-spinning magnetized cylinders 2110 and 2210) in the middle gear ring 2114 and 2214. As shown in FIG. 21, in various embodiments, the cylinders 2110 may be clustered into groups 2120 of two cylinders 2110*a* and 2110*b*, wherein each cylinder 2110*a* is slightly smaller in diameter than each cylinder 2110*b*. Similarly, in various additional embodiments, as illustrated in FIG. 22, cylinders 2210 may be clustered into groups 2220 of three cylinders 2210*a*, 2210*b*, and 2210*c* of slightly increasing diameter, with cylinder 210*c* having the largest diameter. Furthermore, various exemplary embodiments of the present disclosure contemplate altering only the grouping or clustering of the interpole elements instead of altering both the size and grouping (clustering) of the interpole elements. In various embodiments, for example, when using free-spinning magnetized elements, such as, for example, free-spinning magnetized cylinders 2110 and 2210, only the grouping (clustering) of the magnetized elements may be altered (instead of altering both the size and grouping of the magnetize elements). Such clustering without altering the size can, for example, permit a uniform air gap size to be maintained. Increasing the air gap size, e.g., due to altering a size of the free-spinning magnetized elements, may weaken the MMF source. Accordingly, various small clusters of two or three interpole elements may yield a clean harmonic coupling coefficient with 2-3 primary pair coefficients. Based on the teachings of the present disclosure, it is therefore within the ability of one skilled in the art to determine an interpole element arrangement to achieve a desired coupling and gear ratio change, and the present disclosure is not intended to be limited to the exemplary embodiments shown and described herein.

An exemplary method for varying a magnetic gear ratio in accordance with an exemplary embodiment of the present disclosure is set forth in the following description with reference to the embodiment of FIG. 10. A first gear ring 1004 having a first magnetic pole count may be harmonically coupled to a second gear ring 1002 having a second magnetic pole count, wherein the first gear ring 1004 comprises a plurality of permanent magnets 1008 and the second gear ring 1002 comprises a plurality of magnetized cylinders 1006. A relative rotation angle of each magnetized cylinder 1006 on the second gear ring 1002 may then be adjusted to change the second magnetic pole count and thereby change the gear ratio.

In various embodiments, for example, the first gear ring 1004 may be coupled to the second gear ring 1002 by positioning a plurality of interpole elements between the first and second gear rings 1004 and 1002. For example, in various embodiments, a plurality of free-spinning magnetized cylinders 1010 can be positioned between the first and second gear rings 1004 and 1002. In various additional embodiments, a plurality of magnetizable wedges, such as, for example, laminated steel blocks or wedges (see FIGS. 1, 15, 17, and 19) can be positioned between the first and second gear rings. In various exemplary embodiments, the plurality of interpole elements may be selectively positioned and sized such that the first gear ring 1004 may harmonically couple to the second gear ring 1002 at more than one magnetic pole pair combination (i.e., at more than one gear ratio). In various embodiments, for example, the interpole elements may be arranged into at least two groups of interpole elements.

As would be understood by those of ordinary skill in the art, methods in accordance with the present disclosure contemplate varying the magnetic gear ratio of various types, configurations, and/or arrangements of magnetic gears. As illustrated in the embodiments depicted in FIGS. 1-22, for example, the gear ratio of a rotary magnetic gear (sometimes referred to as a planetary magnetic gear) may be changed. However, the present disclosure is not limited to such a gear arrangement, and in various additional embodiments, for example, the gear ratio of a linear magnetic gear 2300, such as, for example, illustrated in FIG. 23, may be changed in the same manner. Those of ordinary skill in the art would understand how to arrive at various additional gear arrangements and applications based on the exemplary methods of the present disclosure.

Figure 24:
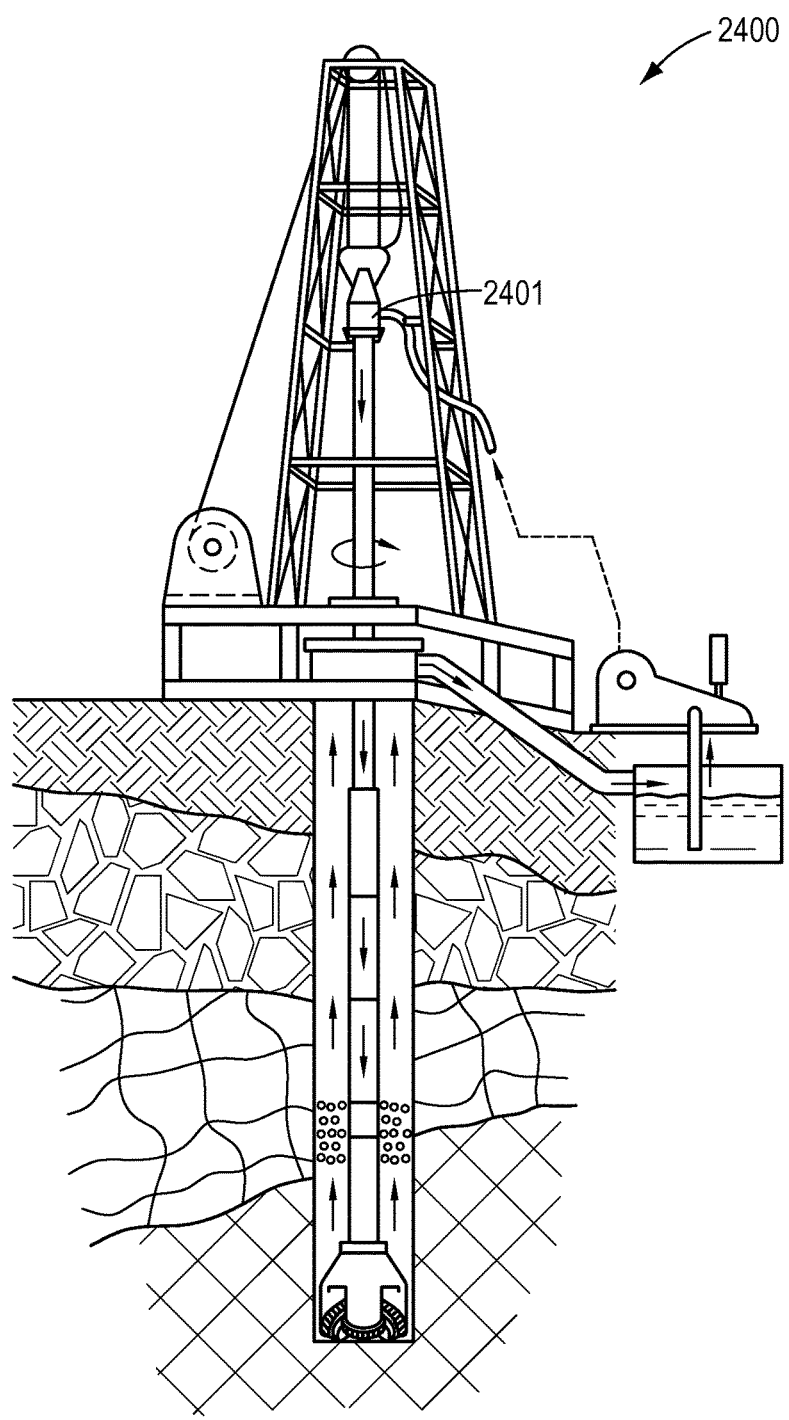
FIG. 24 is a perspective view of an exemplary embodiment of a top drive system used in an oil drilling rig in accordance with the present disclosure.

Variable ratio magnetic gear arrangements may find use in drive mechanisms for a variety of industrial applications, including, for example in top drive mechanisms in oil rigs. FIG. 24 illustrates an exemplary embodiment of an oil rig 2400 that includes a top drive 2401 that may incorporate the variable ratio magnetic gear embodiments described herein. Further details regarding the use of the magnetic gear systems in accordance with exemplary embodiments of the present disclosure in a variety of rotary equipment for oil drilling equipment are explained below.

Integrated Magnetic Motor-Gear Drives

Conventional "pseudo-direct" or "pseudo" drives have been developed that include an outer stator having permanent magnets and three-phase windings, an inner rotor having permanent magnets, and a middle rotor having interpole elements. The magnetic field generated by the stator windings drives the inner permanent magnet rotor, and the interpole elements of the middle rotor act as a gear between the inner and outer rotors, with the inner rotor being a relatively high speed, low torque rotor and the middle rotor being a relatively low speed, high torque output rotor. Although the gear ratio boosts the effective output torque, the stator field winding has to drive its flux through two air gaps and two sets of magnets to accomplish this objective.

In accordance with one exemplary embodiment, to mitigate issues relating to the double air gap of the conventional magnetic gear-drive described above, the high speed rotor, which can be either the inner or middle rotor, can be driven by windings (e.g., a three-phase stator winding) coupled directly to high speed rotor. As shown in in the schematic plan view of the exemplary embodiment of FIG. 25 and the cross-sectional view of FIG. 26, an integrated magnetic gear-motor drive 2500 can include a multi-phase (e.g., three-phase) stator winding 2501 (with the three magnet poles labeled A, B, C depicted) supported by a fixed inner shaft 2505. The stator windings can be used to couple directly to drive a freely-rotating inner high speed rotor 2502, which in the exemplary embodiment is a two-pole (N-S) permanent magnet rotor although other pole pairs are envisioned as those having ordinary skill in the art would recognize. In general, the high speed rotor has a relatively low number of pole pairs. The coils of the windings are excited as a conventional permanent magnet drive motor would be so as to rotate the inner rotor 2502 at a relatively high speed and low torque. Bearings 2509 rotatably support the inner rotor 2502 about the shaft 2505. An outer stator 2504 can include permanent magnets 2508 and an outer steel shell 2505. A middle rotor 2514 of magnetized spinning cylinders 2510 is provided that rotates at relatively low speed and high torque around the shaft 2505 via bearings 2511. The middle rotor 2514 can be used as the output drive mechanism. The exemplary embodiment of FIGS. 25 and 26 thus eliminates the double air gap through which the stator windings have to deliver the flux to drive the inner high speed rotor; instead a single air gap 2503 is present between the inner stator 2501 and inner permanent magnet rotor 2502.

In an exemplary embodiment, the stator 2501 and shaft 2505 are made of steel.

Figure 25:
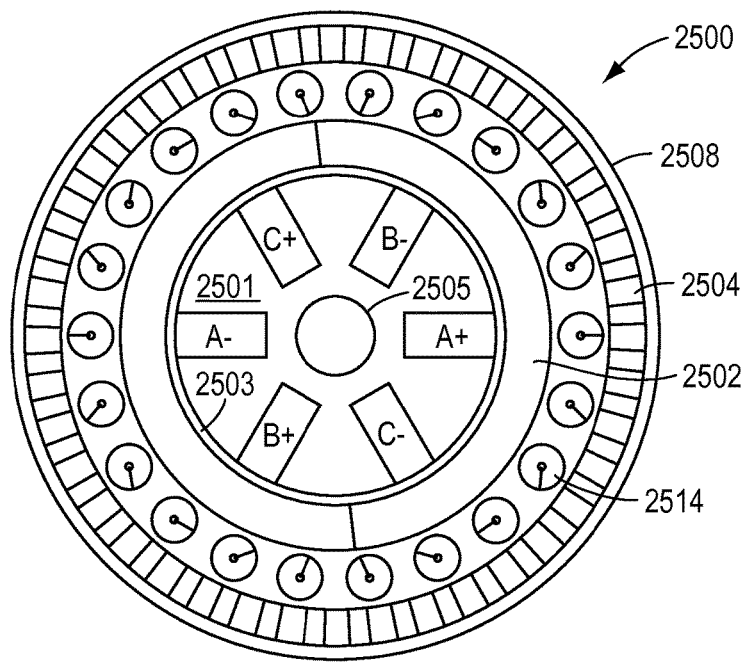
FIG. 25 is a schematic plan view of an exemplary embodiment of an integrated magnetic motor-gear drive in accordance with the present disclosure.
Figure 26:
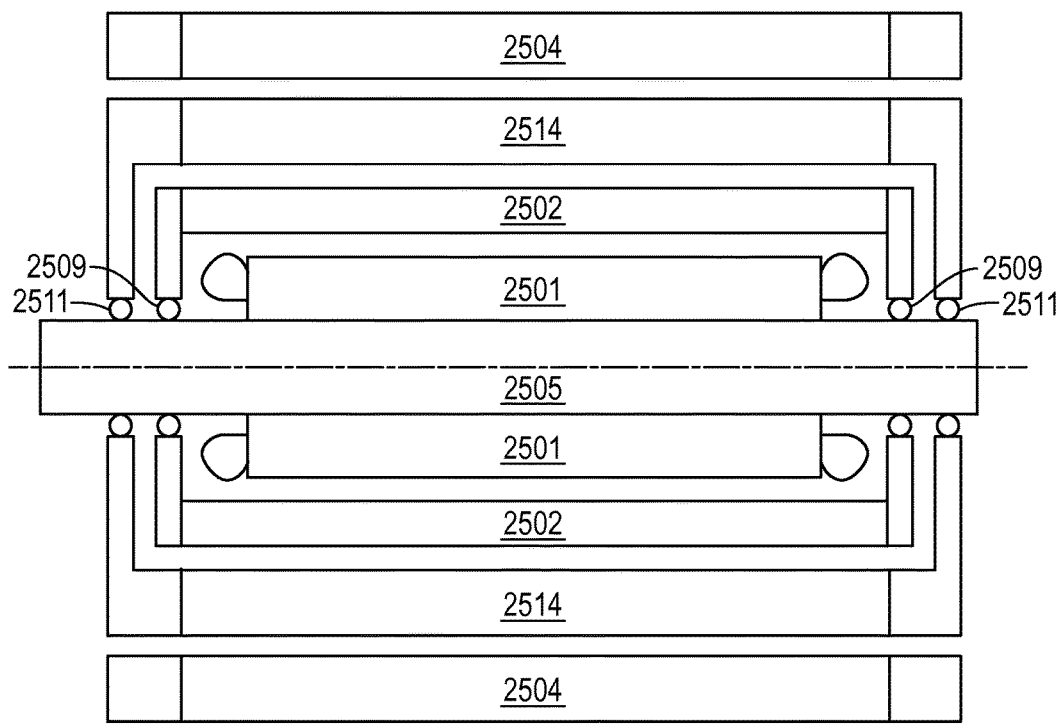
FIG. 26 is a schematic cross-sectional view of the integrated magnetic motor-gear drive of FIG. 25.
Figure 27:
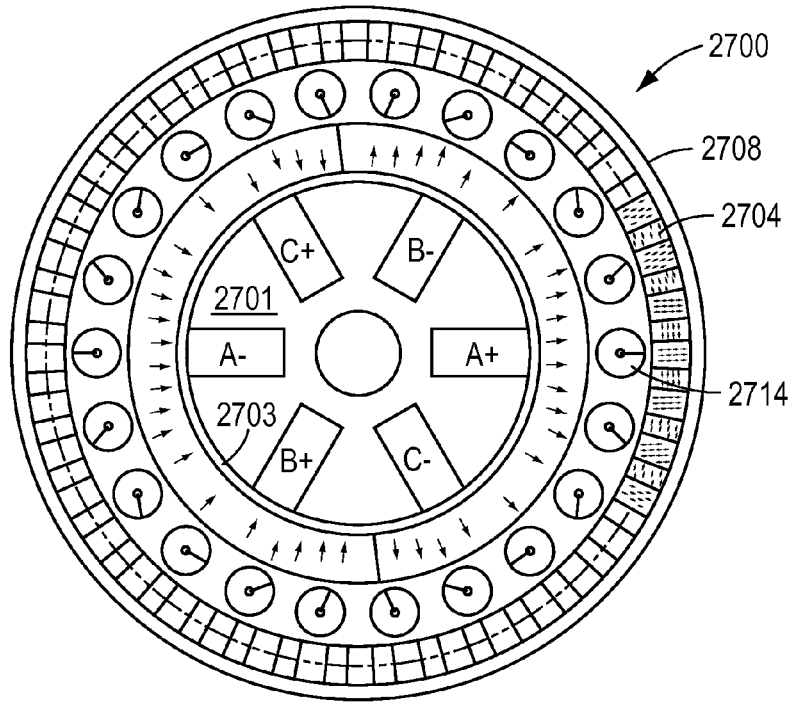
FIG. 27 is a schematic plan view depicting instantaneous magnetic fields for the various components of the integrated magnetic motor-gear drive of FIG. 25.

FIG. 27 schematically depicts a snapshot of the magnetization of the various components of FIGS. 25 and 26, with the various field lines depicted by arrows.

Figure 28:
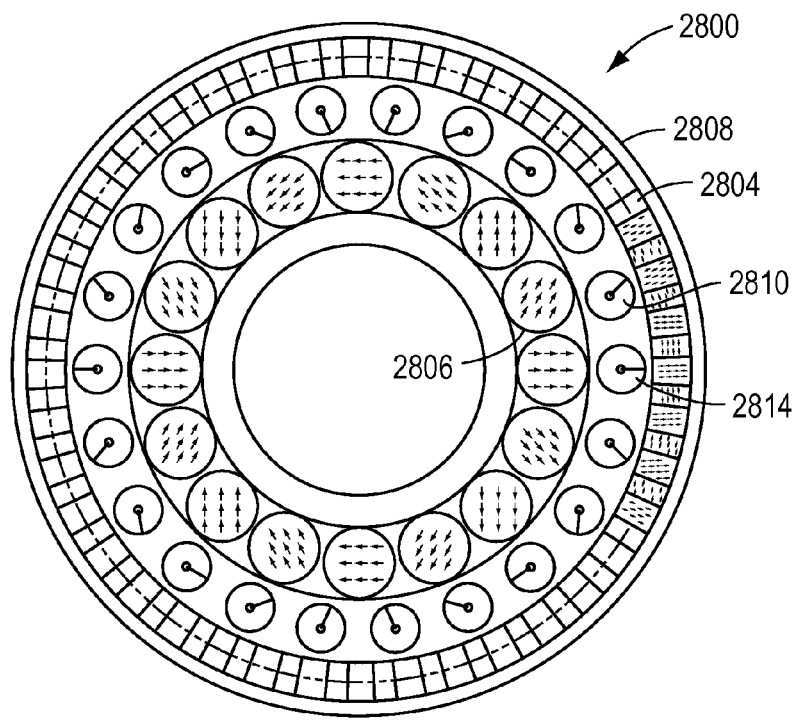
FIG. 28 is a schematic plan view of another exemplary embodiment of an integrated magnetic motor-gear drive in accordance with the present disclosure.

FIG. 28 is a schematic plan view of another exemplary embodiment of an integrated magnetic gear-motor drive 2800 in accordance with the present disclosure. In this exemplary embodiment, instead of the permanent magnets of rotor 2502, the inner member 2802 includes a plurality of individually spinning magnets (e.g., cylinders) 2806 and the inner member 2802 does not rotate itself around the axis of the gear 2800. Instead the individual magnetized cylinders on the inner ring can be rotated in a controlled fashion to provide the rotating magnetic field. In an exemplary configuration and arrangement of the spinning magnets 2806, the magnetic field may approximate the rotation of a Halbach array. As described above with reference to the exemplary embodiment of FIGS. 10-14, the timing of rotation and relative angular positions of the magnetized cylinders 2806 can be preserved via various mechanisms, including, but not limited to, for example, utilization of an inner drive ring in contact tangentially with the cylinders 2806, a timing chain or belt driven by one or more motors through linkages, and/or one or more individual controllable motors directly driving the cylinders In the exemplary embodiment of FIG. 28, there are 16 inner magnetized cylinders 2806, 22 middle interpole magnetic cylinders 2810, and 20 pole pairs on the outer stator ring 2804. The gear ratio from the central magnet output ring to the inner high speed shaft is expected to be 11:1. Because there are two pole pairs on the inner rotor, the air gap field from the inner rotor will reverse twice every rotation for a Halbach array. Thus, it may be desirable to rotate the individual cylinders 2806 at twice the rotation speed as the rotor in, for example, the embodiments of FIG. 27. However, the drive motors for the individual cylinders 2806 can be reduced in size and torque by a substantial factor over the size of that delivered on the output rotor that includes the magnetic cylinders 2810. In various exemplary embodiments, it is anticipated that the size of the individual cylinder motors rotating each of the inner cylinders in FIG. 28 can be several $\frac{1}{100}$ths the size required in a comparable direct drive system, i.e. a system of the same total power.

In various exemplary embodiments wherein the spinning cylinders 2806 are driven by motors that are relatively small, if one spinning cylinder 2806 should fail, the overall integrated magnetic gear-motor 2800 will not fail. The faulty motor may be easily swapped in and out since the motor itself (and the inner ring) is stationary. Once the motor/cylinder is in, it can be re-synchronized with its original rotation/orientation. Thus, in various exemplary embodiments, it is contemplated that the torque of a few high speed motors to drive the inner cylinders 2806 can be combined to realize the equivalent performance of a single low speed, high torque motor, and it is relatively easy to provide small motors with predetermined speed/torque characteristics. Moreover, with many small motors/cylinders, redundancy may easily be built-in the integrated magnetic gear-motor drive. In case that the cylinders are driven by an inner driver (e.g., a rotor in tangential contact with the cylinders and/or a timing belt), rather than individual controllable motors, the inner driver may still have a torque requirement that is substantially less than the size of the anticipated output torque of the middle rotor of cylinders 2810.

In various exemplary embodiments of the magnetic gears and integrated magnetic gear-motor drives, the description has been with regard to outputting of a low speed, high torque performance. Those having ordinary skill in the art would appreciate however, that the devices described can operate in the reverse, that is, for converting a relatively low speed, high torque input to a high speed, low torque output. For magnetic gears with three gear rings (i.e. inner, middle and outer), any one of them may be chosen to be stationary and the other two be chosen as rotary. Either one of the two rotary rings may be assigned as an input ring and the other an output ring. The assignment of which ring is assigned the low pole pair count (the high speed ring) can be selected as desired since the device will work just as well regardless of which ring it is assigned.

For example, in various exemplary embodiments of magnetic gears described above, the inner ring is an input gear ring, the middle ring is an output gear ring, and the outer gear ring is fixed in place. The gears can thus convert high speed, low torque rotation from the inner ring to low speed, high torque at the middle (output) ring. Such gears can be reconfigured with modifications that would be readily apparent to those having ordinary skill in the art to make the middle ring as input and inner ring as output. In this configuration, the high torque, low speed input rotation can be converted to high speed, low torque rotation. This conversion is very useful in some applications, such as for example, in power generation industrial applications. For example, in a windmill, the prime mover is the wind turning a shaft at low rotation speed. Using a magnetic gear described here, the low speed rotation on the center ring can be driven by a prime mover and converted to high speed rotation on the inner ring to drive an electric generator.

The integrated motor-magnetic gear drives described above also can be reconfigured to operate in reverse, e.g., as an integrated magnetic gear-generator. For example, with reference to FIG. 28, the outer ring 2804 with magnets remains fixed, the middle ring of magnetic spinning cylinders 2810 can be configured as an input ring and may be driven at low speed, for example, by a windmill, a hydraulic turbine, or other driver (not shown). The magnetic cylinders 2806 in the inner ring may be the output, which can drive small electric generators. The electricity generated from small generators may be reconditioned and combined for power use. For more details about a windmill installation with which various exemplary embodiments herein may find application, reference is made to U.S. Pat. App. Pub. No. US 2011/0058925, published on Mar. 10, 2011, which is incorporated by reference herein.

EXEMPLARY INDUSTRIAL APPLICATIONS

Magnetic gears and integrated motor-gear drives in accordance with the present disclosure may be used in various industrial applications as would be understood by those of ordinary skill in the art. Such applications may include, but are not limited to, hydraulic pumps, drills, and rotating drive shafts, such as, for example, in the hydro-electric industry between the turbine and the generator and in various rotary drive mechanisms used in the oil and gas industry. Regarding the latter, for example, magnetic drivers, such as magnetic gears and/or integrated magnetic motor-gear drives, can be used in rotary equipment, such as top drives, drawworks, or mud pumps, of an oil rig.

Various such components are described in detail below and it should be understood that those having ordinary skill in the art could use any of the magnetic gears and integrated magnetic motor-gear drives described herein with appropriate modification as a substitute for traditional motor and mechanical gearboxes.

Figure 29:
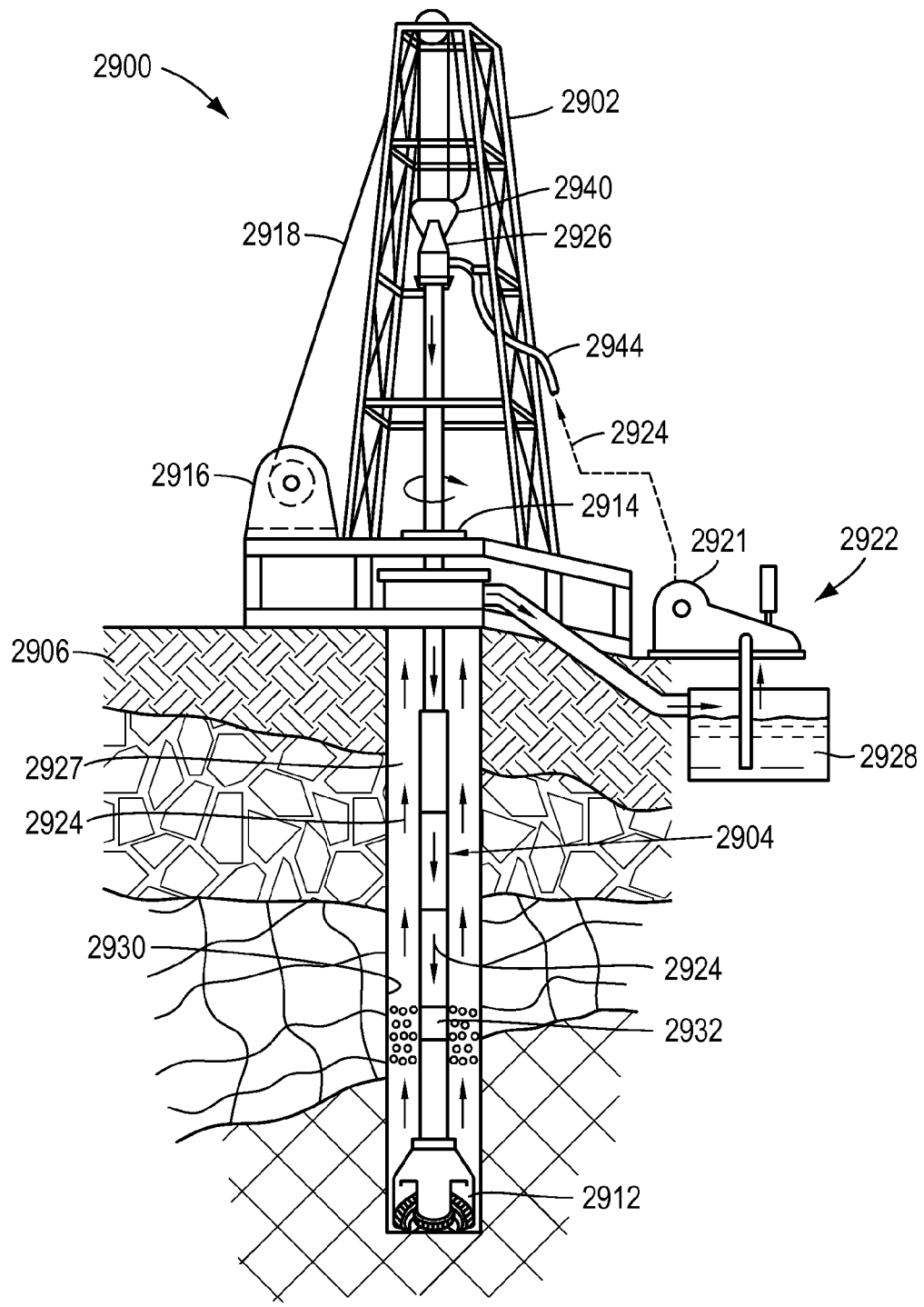
FIG. 29 shows an diagrammatic view of an exemplary embodiment of an oil rig with a top drive, drawworks and mud pump.

FIG. 29 illustrates a schematic diagram depicting an oil rig 2900. The rig 2900 includes a derrick 2902 from which extends a drillstring 2904 into the earth 2906. The drillstring 2904 can include drill pipes and drill collars. A drill bit 2912 is at the end of the drillstring 2904. A rotary system 2914, top drive 2926, and/or a downhole drive 2932 (e.g., a "fluid motor", "mud motor", electric, hydraulic, mud, fluid, or other type based on available utilities or other operational considerations) may be used to rotate the drillstring 2904 and the drill bit 2912. The top drive 2926 is supported under a travelling block 2940, which can travel up and down in the derrick 2902. A drawworks 2916 has a cable or rope apparatus 2918 for supporting items in the derrick 2902 including the top drive 2926. A system 2922 with one, two, or more mud pump systems 2921 supplies drilling fluid 2924 using hose 2944 to the drillstring 2904, which passes through the center of the top drive 2926. Drilling forms a wellbore 2930 extending down into the earth 2906.

During drilling, the drilling fluid 2924 is pumped by mud pump(s) 2921 of the system 2922 into the drillstring 2904 passing through the top drive 2926 (thereby operating a downhole drive 2932 if such is used). Drilling fluid 2924 flows to the drill bit 2912, and then flows into the wellbore 2930 through passages in the drill bit 2912. Circulation of the drilling fluid 2924 transports earth and/or rock cuttings, debris, etc. from the bottom of the wellbore 2930 to the surface through an annulus 2927 between a well wall of the wellbore 2930 and the drillstring 2904. The cuttings are removed from the drilling fluid 2924 so that the fluid may be re-circulated from a mud pit or container 2928 by the pump(s) of the system 2922 back to the drillstring 2906. In operation, the rotary equipment, such as top drive 2926, drawworks 2916, mud pumps 2921, may be driven by motors, which can provide large torque at low speed.

Figure 30:
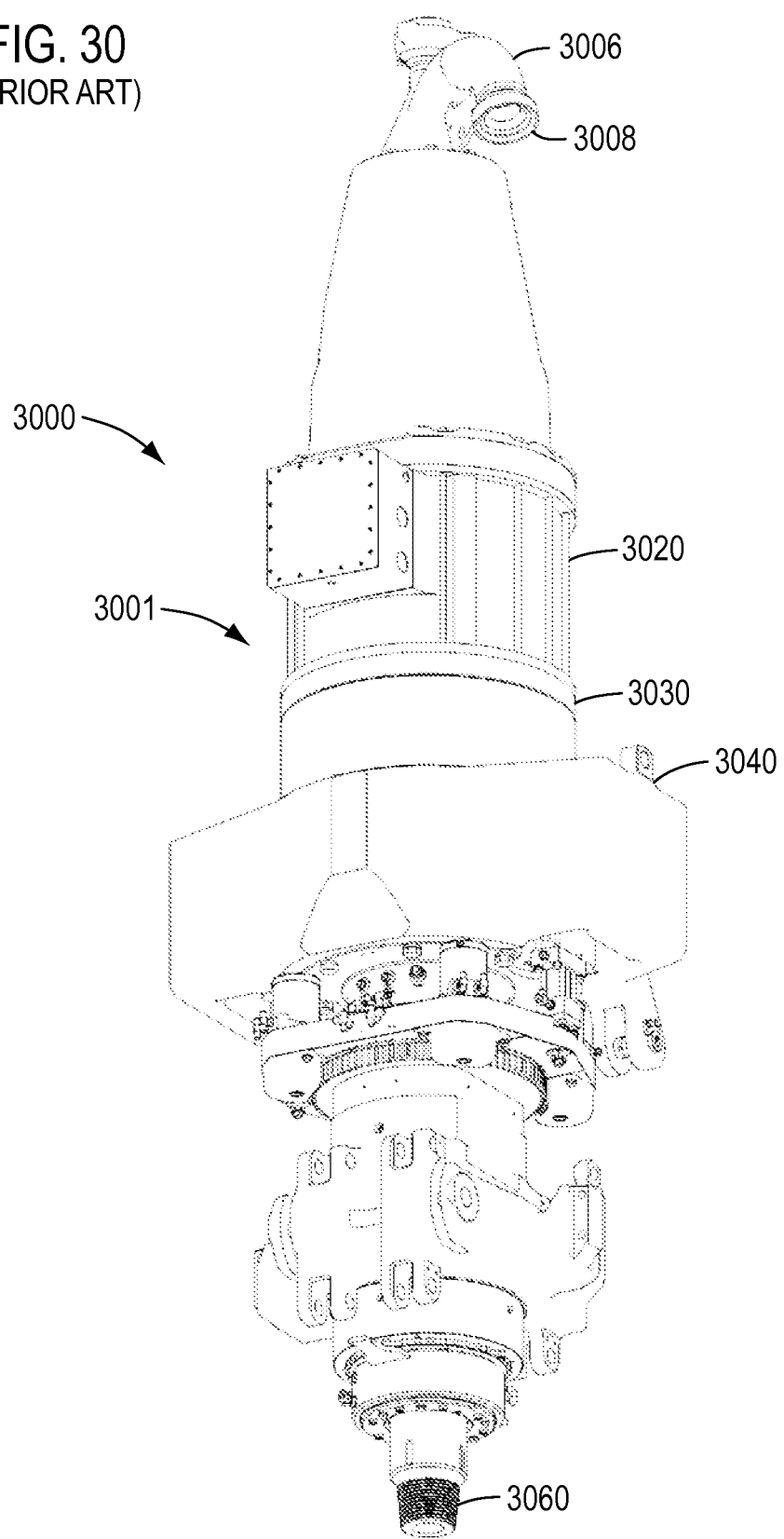
FIG. 30 illustrates a perspective view of a top drive including a mechanical driver.

FIGS. 30, 31A, 31B, 32A, and 32B illustrate some examples of prior art rotary equipment (or systems) usable, for example in the oil rig 2900 of FIG. 29. FIG. 30 illustrates a top drive 3000 with a mechanical driver 3001 including a motor 3020 and a gearbox 3030 with mechanical gears (not shown) supported on a main swivel housing 3040. The motor 3020 rotates a main shaft 3060 via the gearbox 3030. This rotation may be used to rotate the drillstring 2906 as shown in FIG. 29. A washpipe 3008 passes through the center of the system via gooseneck 3006 to supply drilling fluid. The drilling fluid may be circulated by a mud pump 2921 as shown in the system 2900 of FIG. 29.

Figure 31A:
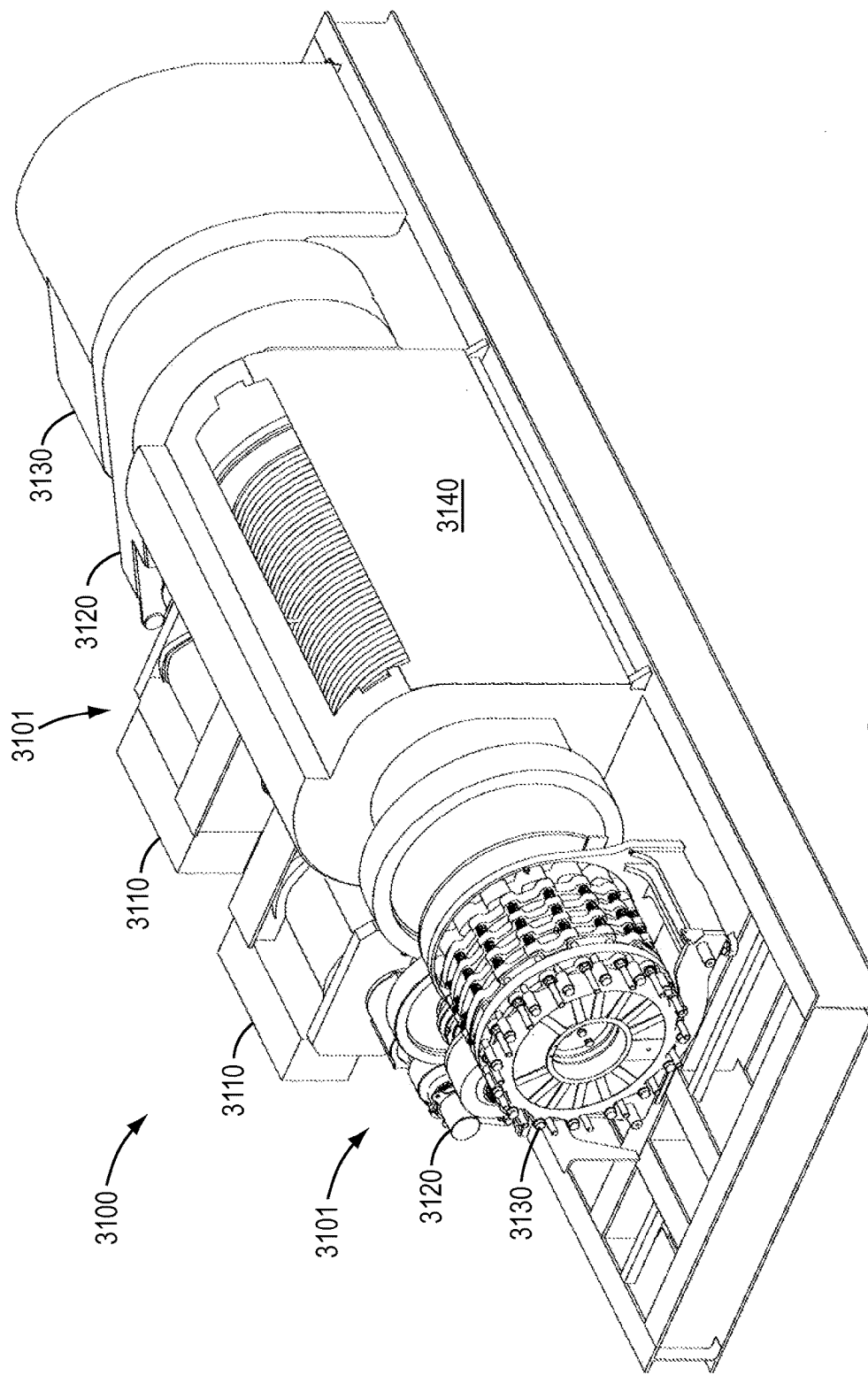
FIGS. 31A and 31B illustrate perspective and top, plan views, respectively, of a drawworks including a mechanical driver.
Figure 31B:
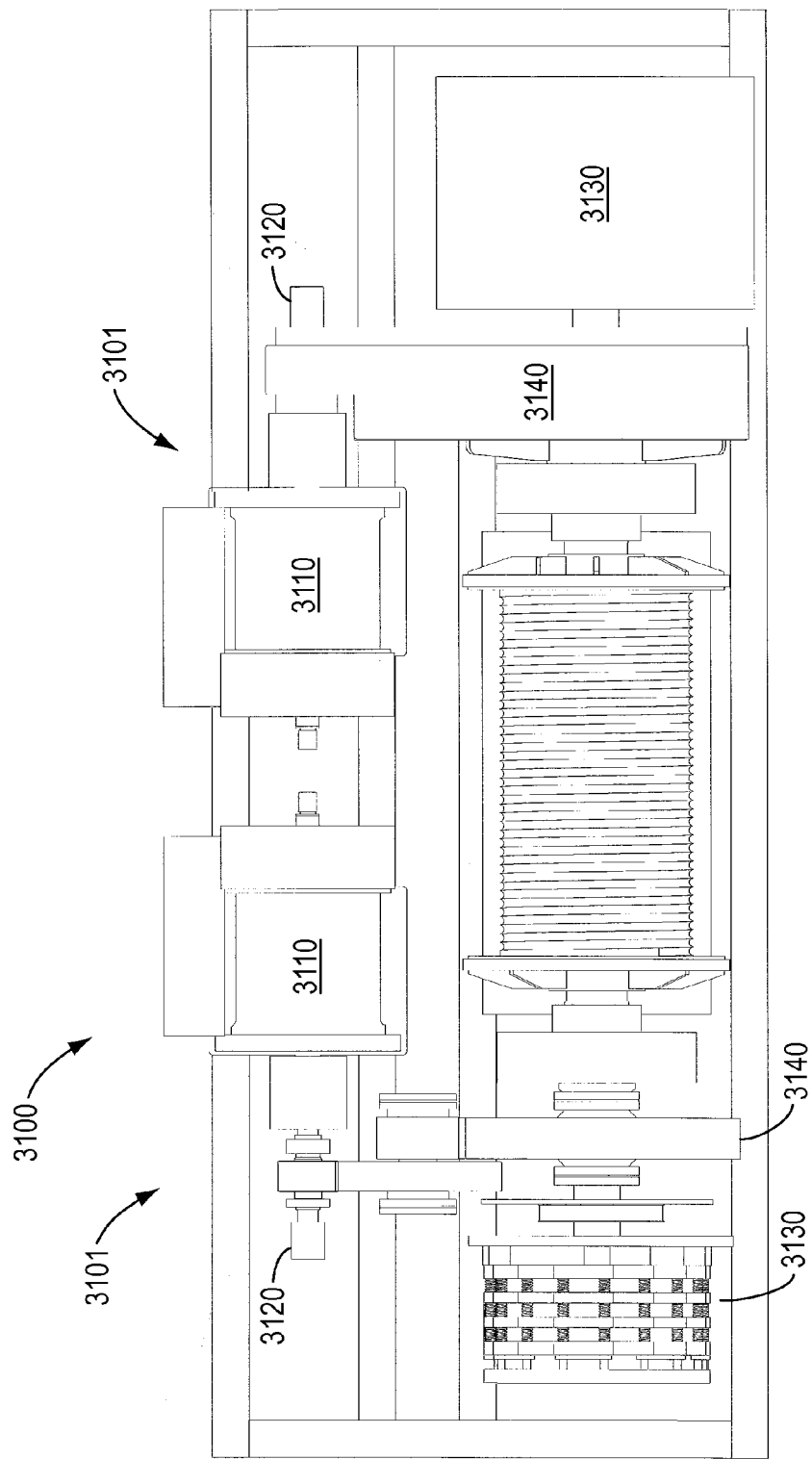

FIGS. 31A and 31B illustrate a perspective view and a top view, respectively, of a drawworks 3100 which may be used as the drawworks 2916 of FIG. 29. The drawworks 3100 includes two mechanical drivers 3101, two brakes 3130, and a drum 3140. The mechanical drivers 3101 each include a motor 3110 and a gearbox 3120. As shown in FIG. 29, the drawworks 3100 may be rotationally activated to selectively reel in or reel out cable (see 2918 in FIG. 29) for use at the oil rig.

Figure 32A:
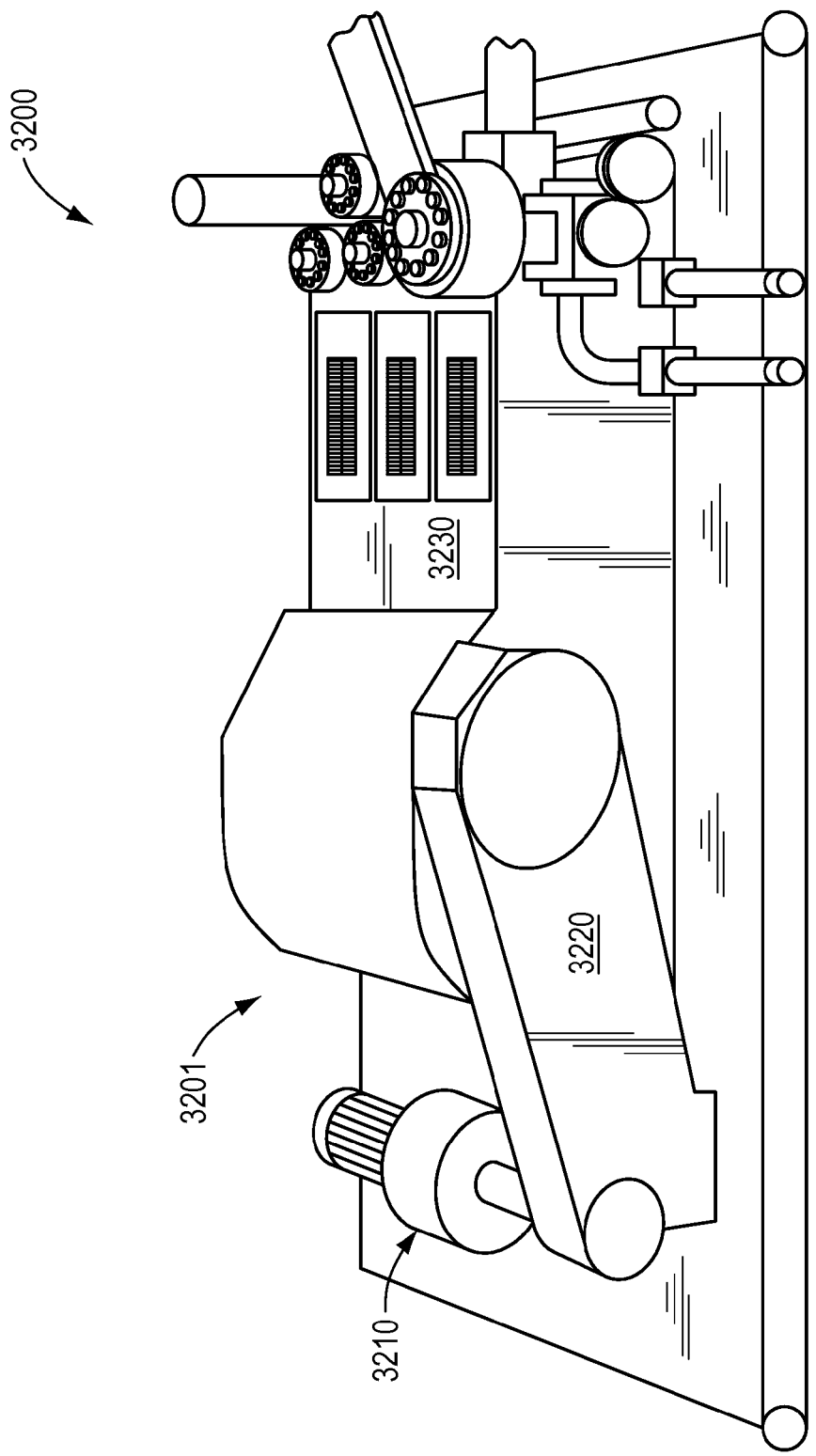
FIGS. 32A and 32B illustrate perspective and top, plan views, respectively, of a mud pump including a mechanical driver.
Figure 32B:
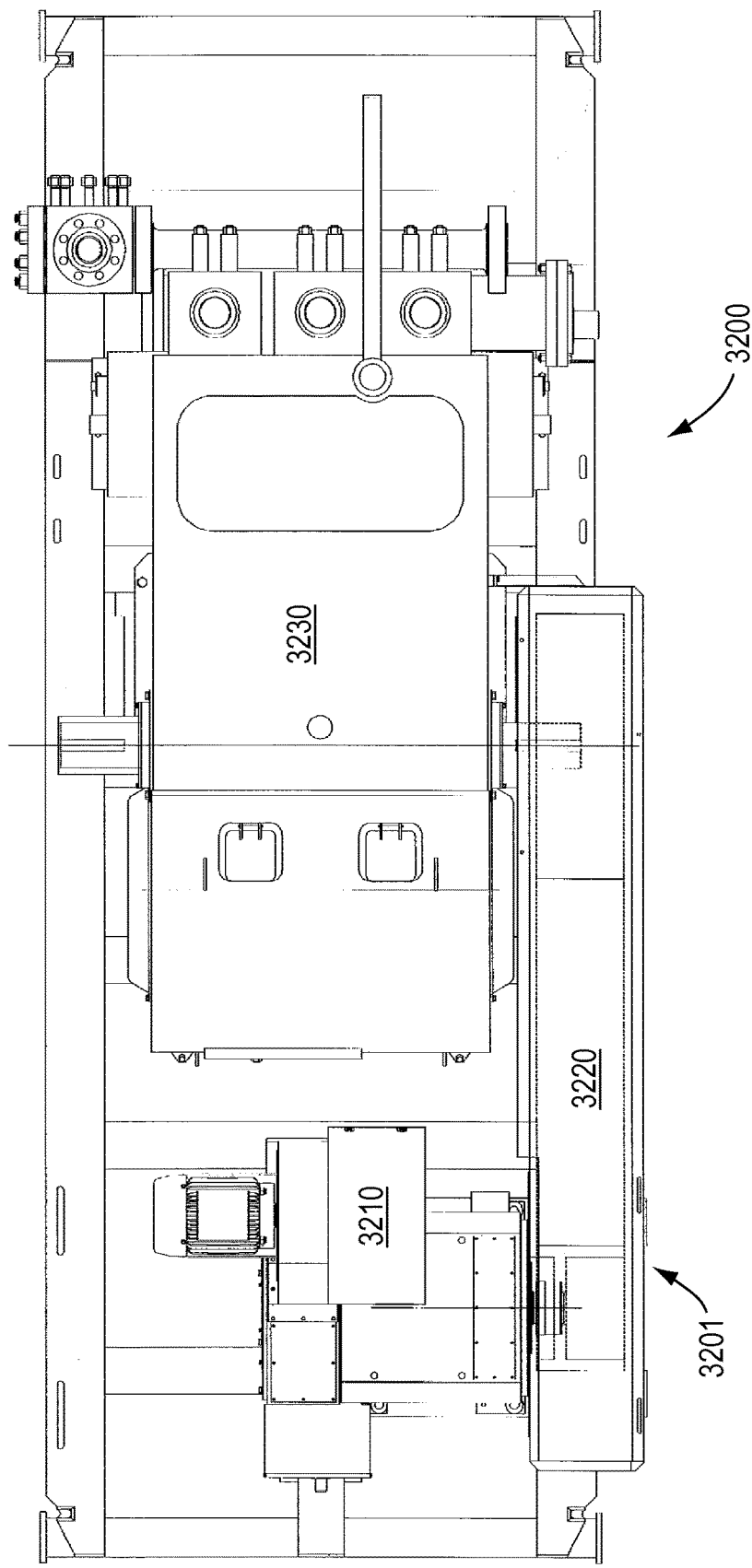

FIGS. 32A and 32B illustrate a perspective view and a top view, respectively, of a mud pump 3200 usable, for example, in the system 2922 of FIG. 29. The mud pump 3200 includes a mechanical driver 3201 and a pump 3230. The mechanical driver 3201 includes a motor 3210 and a gear box 3220. As shown in FIG. 29, the mud pump 3200 may be used to pump fluid through the drillstring 2906 and back to the surface.

Figures 33A, 33B:
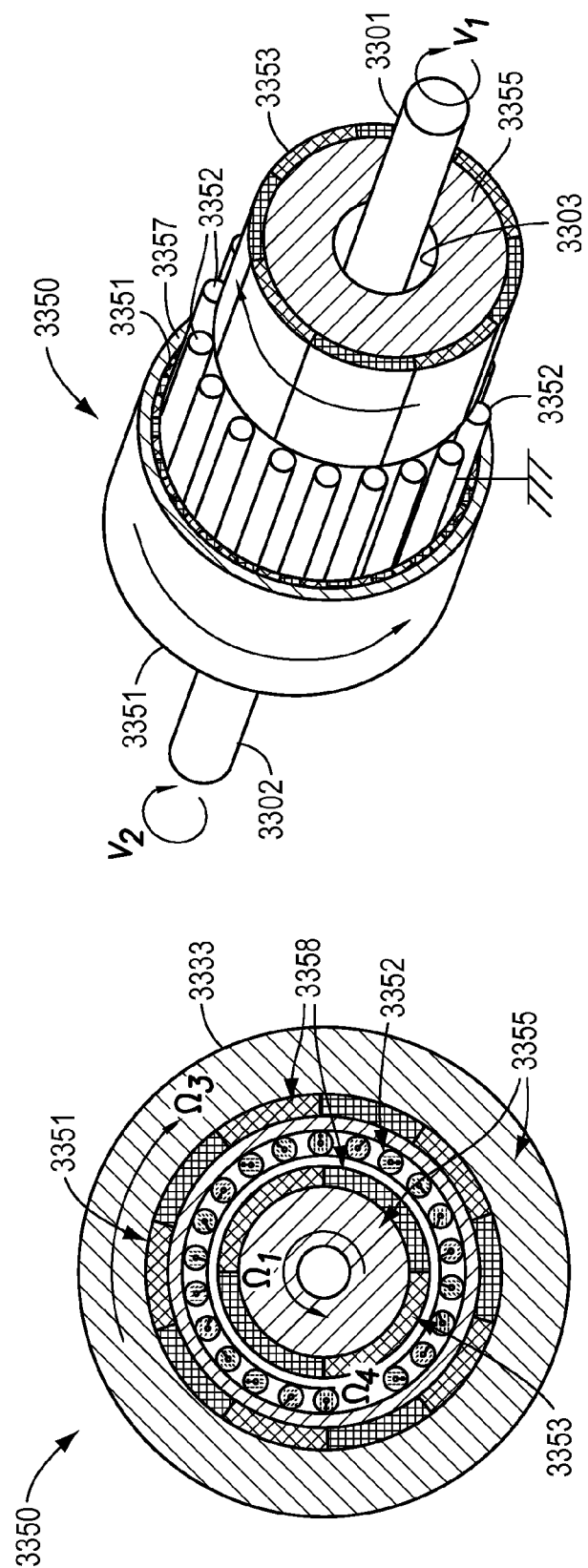
FIGS. 33A and 33B illustrate plan and perspective schematic views, respectively, of a magnetic gear in accordance with an exemplary embodiment.

FIGS. 33A and 33B are schematic plan and perspective partial exploded views, respectively, of a magnetic gear in accordance with various exemplary embodiments described herein that can be used for driving rotary equipment of an oil rig, such as the top drive 2926 and/or downhole drive 2932 of the oil rig of FIG. 29. It should be understood, however, the configuration shown in FIGS. 33A and 33B is exemplary and nonlimiting and any of the exemplary embodiments of magnetic gears described herein can be used to drive rotary equipment of an oil rig as described in further detail below. The magnetic gear 3350 has three gear rings: an inner gear ring 3353, a middle gear ring 3352, and an outer gear ring 3351. Inner gear ring 3353 and outer gear ring 3351 each has a back iron 3355, 3357 and a different number of permanent magnet poles. For example, the inner gear ring 3353 may have four pairs of magnetic poles and the outer gear ring may have twenty pairs of magnetic poles, although these configurations are nonlimiting and exemplary only. The middle gear ring 3352 can include 22 interpole elements 3357. The gear rings are coupled together via magnetic fields as has been described herein. The gear rings may be separated by small air gaps with no mechanical contact therebetween, as has been described herein. As illustrated in FIG. 33B, the magnetic gear 3350 can be provided with a passage 3503 for material flow therethrough. This passage 3303 may be used, for example, where the magnetic gear is used in a top drive having drilling mud passing therethrough.

Thus, as above, the gear rings 3351, 3352, and 3353 of the magnetic gear 3350 are configured as a planetary gear. The different number of magnetic poles in the three gear rings is a factor in determining the gear ratio between the gear rings. In an exemplary embodiment, the inner gear ring 3353 has the least number of magnets (pole pairs), the outer gear ring 3351 has the most number of magnets (pole pairs), and the middle gear ring 3352 has a number of magnets (pole pairs) in between the inner and outer gear rings. As shown in FIG. 33B, the inner gear ring 3353 can be coupled to an input shaft 3501 with high speed $V_1$, and the outer gear ring 3352 can be coupled to an output shaft 3502 with low speed $V_2$ to achieve a speed reduction as has been described herein such that $V1 >> V_2$; likewise, a corresponding torque increase can be achieved.

In the exemplary embodiment of FIGS. 33A and 33B, the middle gear ring 3352 is stationary and the gear rings 3351 and 3353 are rotating, however, those having ordinary skill in the art would appreciate that any one of the three gear rings may be selected to be stationary and the other two as rotating, so the gear ratio may be varied as desired. The input and/or output shafts 3501, 3502 may be coupled to respective gear rings to achieve the desired rotation. Moreover, as discussed above, the magnetic gear of FIGS. 33A-33B is exemplary only, and any of the various magnetic gear embodiments in accordance with the present disclosure can be used in the applications set forth below with modifications as needed and as would be readily understood by those having ordinary skill in the art.

FIGS. 34A-34F illustrate examples of top drives 3400, 3401 with magnetic drivers including a motor (or motors) 3420 and a magnetic gear 3430 (instead of the mechanical gears 3030 of FIG. 30). The magnetic gear 3430 of the top drive 3400 is a planetary gear having gear rings with magnets instead of with gear teeth. The magnetic gear 3430 may be the same as the magnetic gear 3350 of FIGS. 33A and 33B, or as discussed above, any of the various magnetic gears in accordance with various exemplary embodiments of the present disclosure. As a simple replacement for a mechanical planetary gearbox with teeth, magnetic gear 3430 may have the same torque/speed transformation properties of a mechanical gearbox (albeit differing torque ratio may be had between the two), and other attributes of a magnetic gear. The magnetic gear 3430 may be used to replace, for example, mechanical gear boxes in existing top drives or other rotary equipment of the oil rig (e.g., top drive 2926 and/or downhole drive 2932). Other parts, e.g. the main swivel house 3440 and the main shaft 3460, may remain the same as the swivel house 3040 and main shaft 3060 of FIG. 30.

Figure 34C:
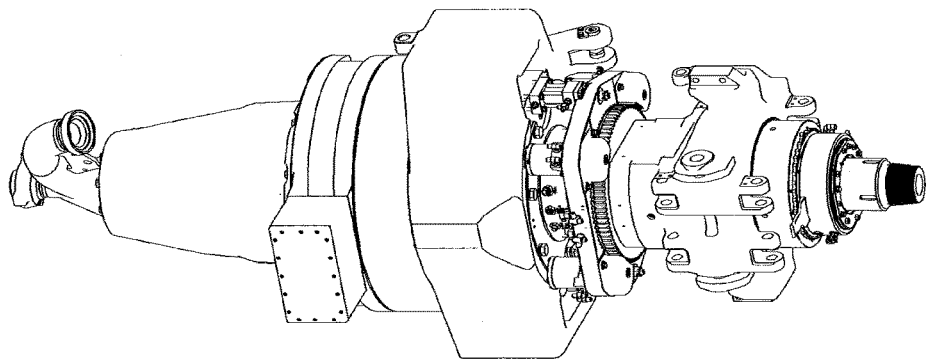
FIGS. 34A-34F illustrate perspective views of top drives with a magnetic driver in accordance with various exemplary embodiments.
Figure 34B:
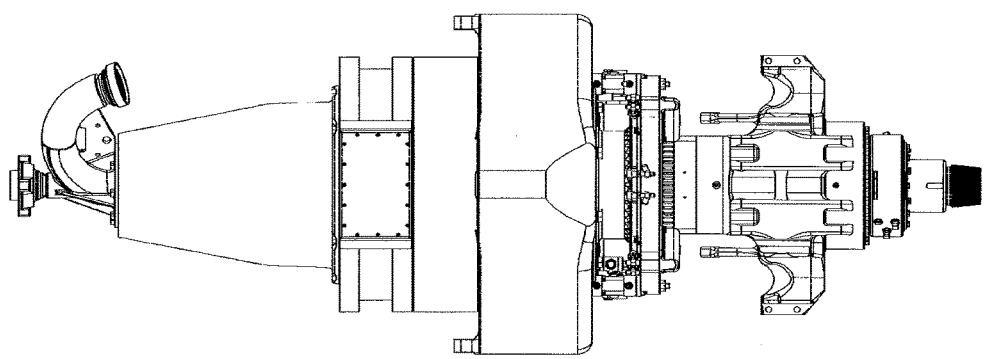
Figure 34A:
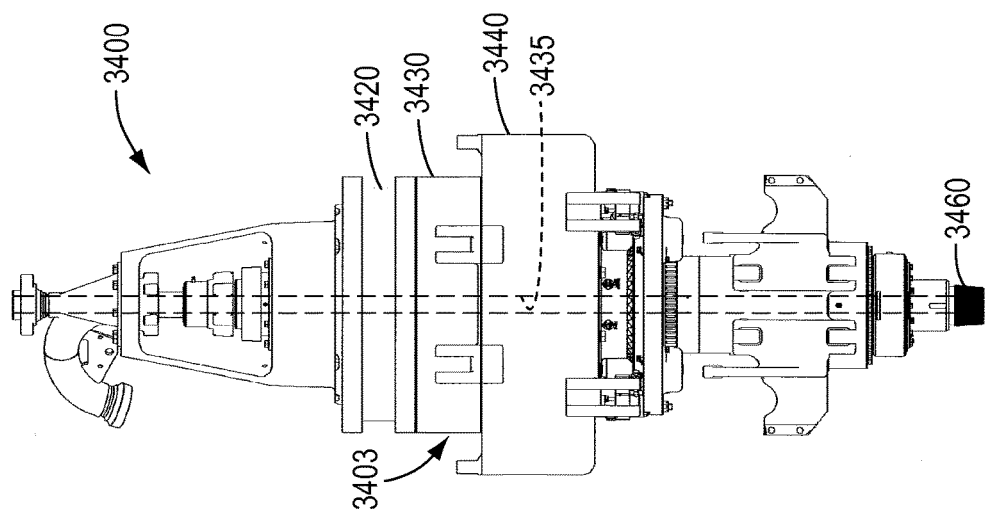

FIG. 34A-34C illustrate front, side, and perspective views, respectively, of a top drive 3400 with a magnetic rotational driver 3403. The magnetic driver 3403 includes motor 3420 together with a magnetic gear 3430, which may be used in place of the mechanical driver 3001 (including motor 3020 and mechanical gearbox 3030) of the top drive 3026 as shown in FIG. 30. The combined motor 3420 and magnetic gear 3430 may be lighter and smaller than the motor 3020 and mechanical gearbox 3030. The motor 3420 and the magnetic gear 3430 may have a hollow passage 3435 to allow material to pass therethrough. In this example, the passage 3435 is concentric through the top drive 3400.

Figure 34F:
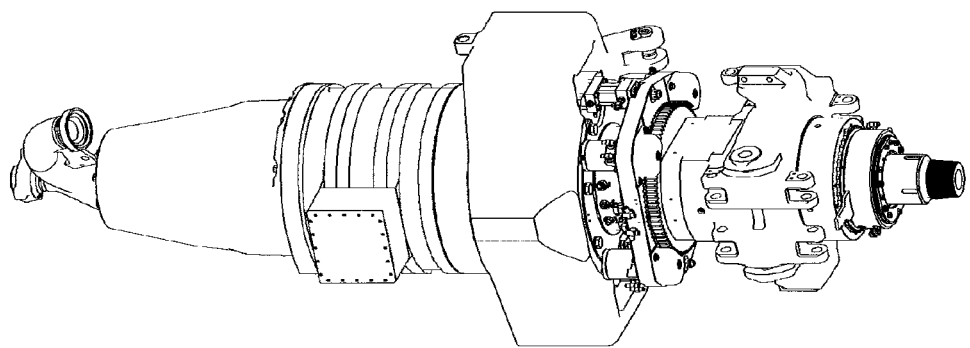
Figure 34E:
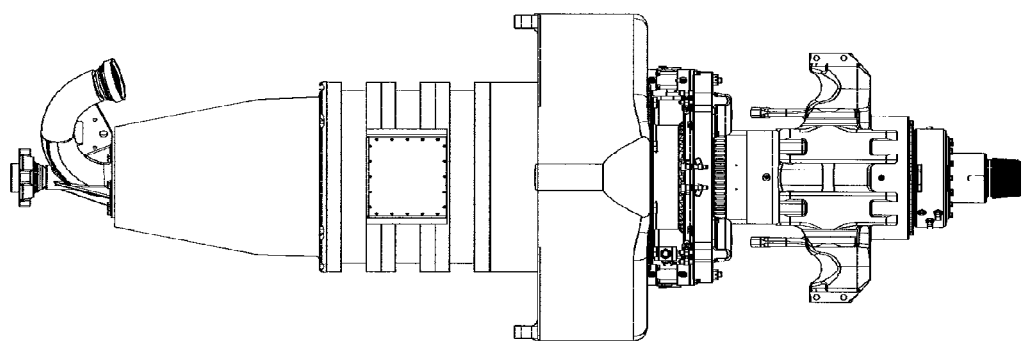
Figure 34D:
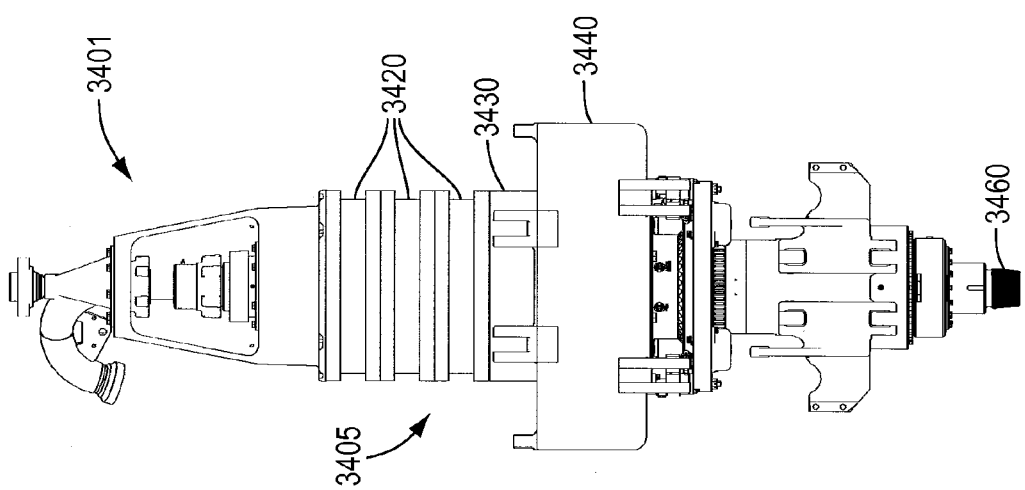

FIGS. 34D-34F illustrate front, side and perspective views, respectively, of an alternate top drive 3401. In this implementation, the alternate top driver 3401 includes a magnetic rotational driver 3405 including a plurality (e.g., three) motors 3420 stacked to provide a desired amount of torque and/or power, and a magnetic gear 3430. The stacked motors 3420 share a common output shaft where the total output torque/power is the sum of the outputs from the individual motors 3420. These stackable motors 3420 are coupled to magnetic gear 3430 which can be scaled up or down depending on the rig operation (i.e. one or more individual motors 3420 may be added or removed).

In various exemplary embodiments, it also is contemplated that an integrated magnetic motor-gear drive, such as those described above with respect to FIGS. 25-28, can be used in replace of the motors and mechanical gearboxes in the rotary equipment of FIGS. 30-32.

As described above, the integrated magnetic motor-gear drivers in accordance with exemplary embodiments integrate both motor and magnetic gear functions into a single, integral assembly to generate output that may be similar to that of a high-speed motor that is separate from yet coupled to drive a magnetic planetary gear. The output may optionally be of a low speed and high-torque, or high torque output at low speed, as described above. The output may thus replace that of the mechanical driver of FIG. 30, with a size that may be more compact than a separate motor plus a magnetic gear. The integrated magnetic motor-gear drive may be provided with a passage therethrough (e.g., through a central shaft, such as shaft 2505 in FIG. 26), which may be suitable for material passage, e.g. in a top drive as shown in FIG. 29.

Regardless of which type of integrated magnetic motor-gear drive is used, those having ordinary skill in the art will appreciate that a gear ratio may be selected as desired by selecting one of the three gear rings (inner, middle, outer) to be the stator and the others to be the rotors, with one being the output rotor. The gear ratio may be changed via varied number of magnets or magnetic poles. The output speed/torque may also be varied by other methods and configurations, some of which have been described above with respect to variable ratio magnetic gears and others of which are discussed below.

The current/voltage to the stator windings (e.g., windings of 2501) may be controlled, thus changing the electromotive force to an integrated magnetic motor-gear drive. The control on the windings can control the speed and torque on the inner gear rotor (e.g., 2502 in FIG. 25), which in turn can change the speed and torque output of the output rotor (e.g., output rotor 2514 of FIG. 25). An integrated magnetic motor-gear drive can provide continuously variable or even infinitely variable output speed. The integrated magnetic motor-gear drives can be provided with a compact configuration for generating increased output, which may be obtained from the selected magnetic gear designs. The integrated magnetic motor-gear drives may vary their torque/speed output, as if through gearboxes. While optionally provided, additional gears (mechanical or otherwise, or associated variable speed transmissions) are not required for operation with the magnetic drivers herein.

Figure 35C:
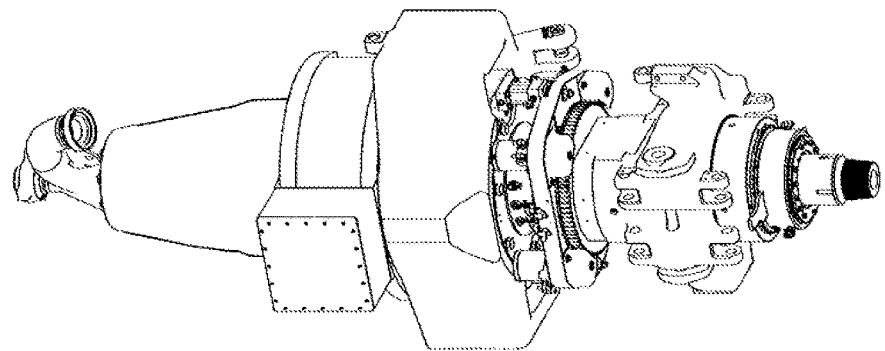
FIGS. 35A-35F illustrate perspective views of top drives with integrated magnetic motor-gear drives in accordance with various exemplary embodiments.
Figure 35B:
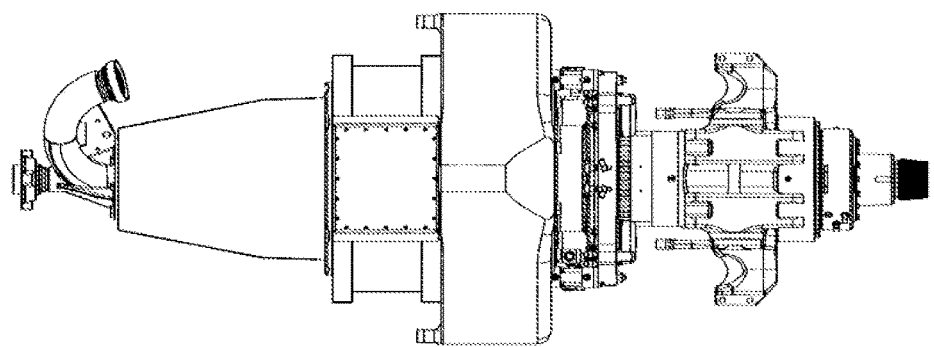
Figure 35A:
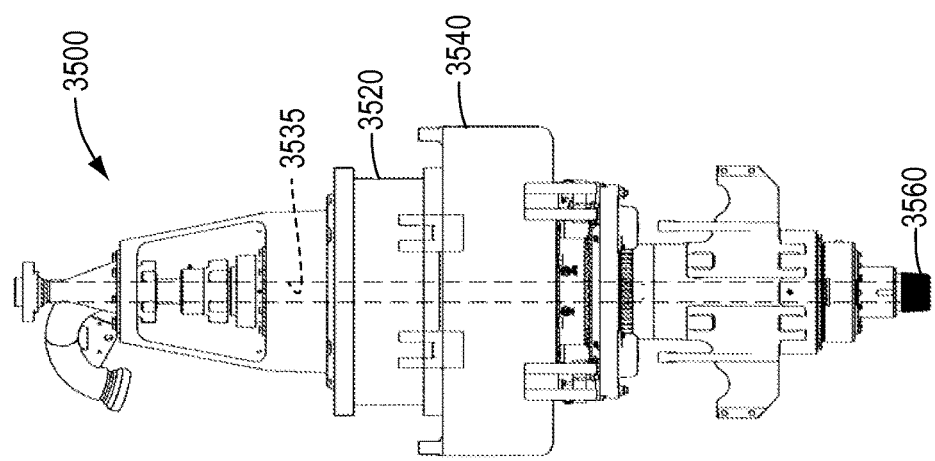

FIGS. 35A-35F illustrate examples of a top drive 3500 with an integrated magnetic motor-gear drive 3520, which may be any of the various integrated magnetic motor-gear drives described herein (see, e.g., FIGS. 25-28). FIGS. 35A-35C illustrate front, side and perspective views, respectively, of a top drive 3500 with one integrated magnetic motor-gear drive 3520. In this configuration, no separate motor and "gear box" are provided. Rather, the motor and magnetic gear is inside and integrated into one unit 3520 as shown.

In an example implementation, an integrated magnetic motor-gear drive 3520 may have a diameter ranging from about 2 feet to about 3 feet, a length ranging from about 17 in. to about 37 in., and a torque ranging from about 12,000 ft-lbs to about 36,000 ft-lbs, for example at 150 RPM. In an exemplary embodiment, the output desired for the magnetic motor-gear drive may be about 350 HP (262 kW). Other parts of the top drive (e.g. swivel house 3540, main shaft 3560) may remain similar to the swivel house 3040 and main shaft 3060 of FIG. 30 (and other features, such as the washpipe). The magnetic integrated motor-gear drive 3520 may have a passage 3535 therethrough. The output of the drive 3520 may be of high torque and slow speed in an industrial scale, or varied torque/speed characteristics. As discussed herein, with magnetic gears, the output speed and torque may be varied according to the ratio between the number of magnetic poles among the three rings (outer rotor, inner rotor, middle ring). Therefore, this drive 3520 can have outputs of different speeds. With the control of the stator windings, the output speed may also be continuously variable.

Figure 35F:
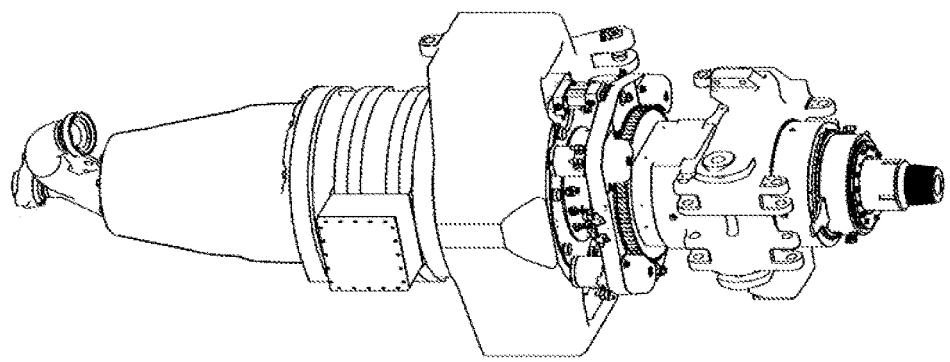
Figure 35E:
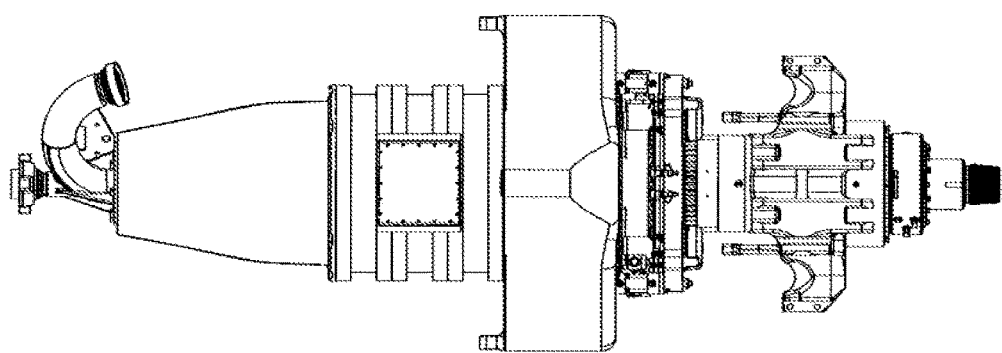
Figure 35D:
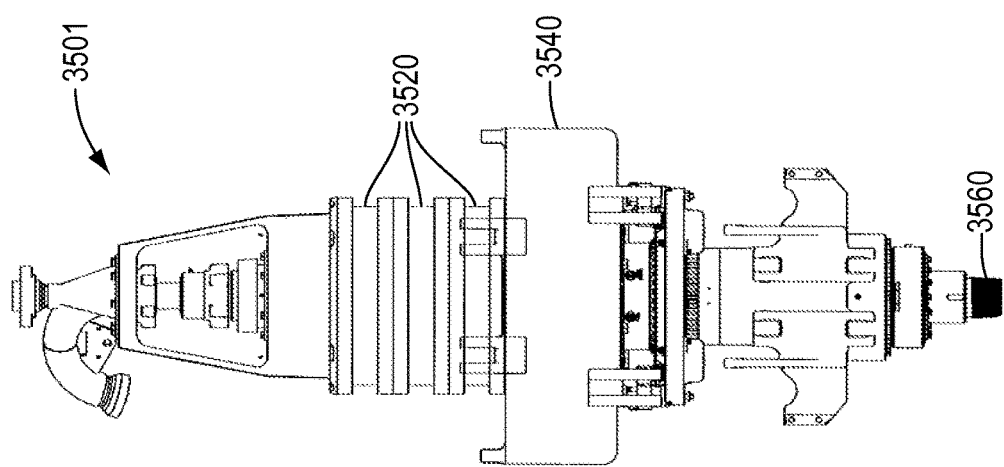

FIGS. 35D-35F illustrate front, side and perspective views, respectively, of another top drive 3501 with multiple integrated magnetic motor-gear drives 3520. This configuration may be the same as the top drive 3500, except that integrated magnetic motor-gear drives 3520 are coupled in series with a common axis. This top drive 3501 has three integrated magnetic motor-gear drives 3520 stacked in series to provide more power and torque.

In this configuration, with three integrated magnetic motor-gear drives 3520, the output desired may be up to about 1050 HP (787 kW) and 36,000 ft-lbs (49 k-Nm) torque may be available in various exemplary embodiments. Each integrated magnetic motor-gear drive 3520 may be the same and may drive the same shaft 3560 at the same speed. When several integrated magnetic driver are installed in series, the total torque on the shaft is proportional to the number of drivers. The integrated magnetic motor-gear drive can also provide variable speed or torque depending on the operational need. Each integrated magnetic motor-gear drive 3520 may be identical to make it easier to maintain or repair any one of them and make it easier to scale up or scale down during different phases of an oil rig operation.

While FIGS. 30-35F depict applications involving top drives, the drivers (whether separate motor and magnetic gear systems or integrated magnetic motor-gear drives) provided herein may be used for other applications at the oil rig, such as drawworks or mud pumps. FIGS. 36A-36D illustrate examples of drawworks with magnetic drivers. In these cases, the motors are arranged horizontally, rather than vertically as with top drives of FIGS. 34A-34F. The drawworks may be on a different axle with respect to gearboxes, brakes and drums as shown in FIG. 30. Optionally, as shown in FIGS. 36A-36D, the magnetic drivers, brakes and drum in this case may be co-axial, co-linear and/or concentric. The various magnetic drivers may be selected to provide variable speeds or torques (e.g. continuously variable speed) for the drawworks, which can match the needs at various phases of the rig operation.

Figure 36A:
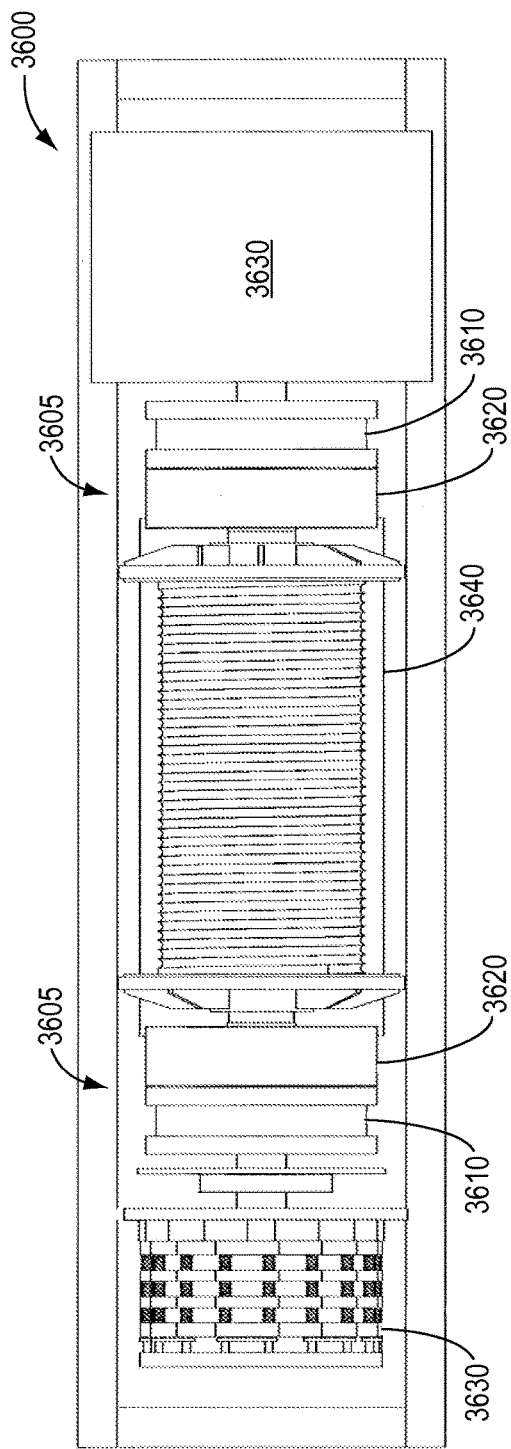

FIG. 36A shows a drawworks 3600 with a magnetic driver 3605 including one motor 3610 and a magnetic gearbox 3620 on each side of a drum 3640. The drawworks 3600 also has two brakes 3630, one on each side of the drum 3640. This configuration is similar to the one shown in FIG. 31, except that a magnetic gear box 3620 replaces a mechanical gear box 3120.

Figure 36B:
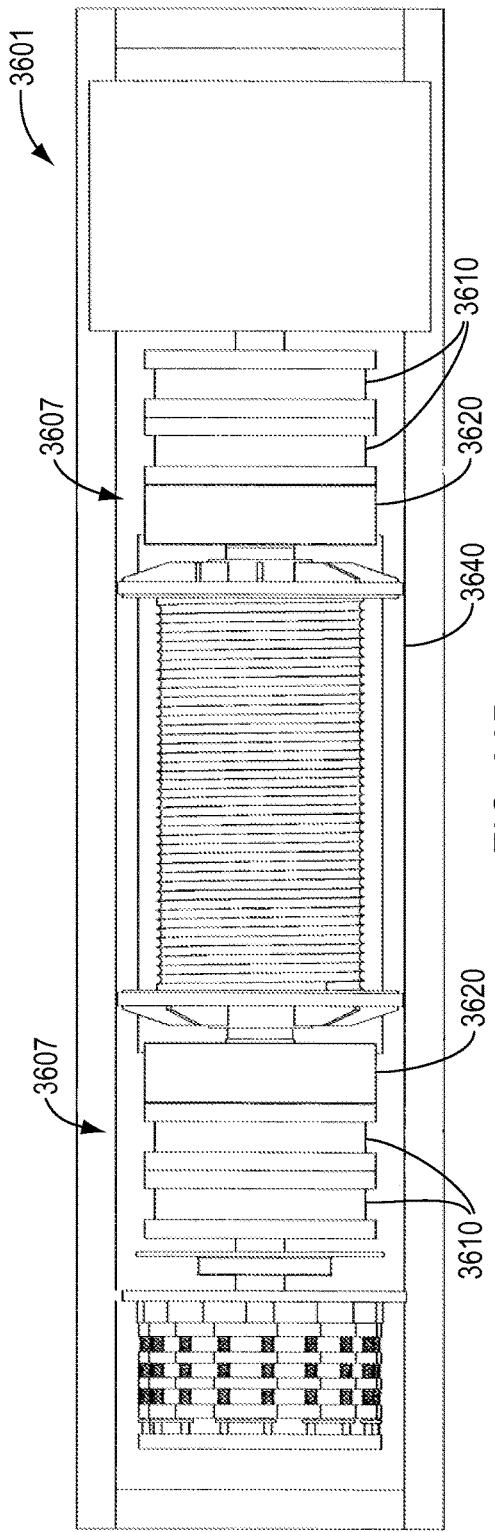

FIG. 36B shows a drawworks 3601 with an alternate magnetic driver 3607 which is the same as the drawworks 3600 of FIG. 36A, except that the drawworks 3601 is provided with magnetic drivers 3607 including two motors 3610 and one magnetic gearbox 3620 on each side of the drum 3640. Depending on the operation, one or more motors 3610 may be activated to provide a wide range of power and torque. In the configuration shown in FIG. 36B, four motors 3610 may be installed to provide a desired power output ranging from about 350 HP (262 kW) to about 1400 HP (1050 kW) and a torque range of from about 12,000 ft-lbs (16 k-Nm) to about 48,000 ft-lbs (64 k-Nm).

FIGS. 36C and 36D depict drawworks in use with integrated magnetic motor-gear drives. FIG. 36C shows a drawworks 3602 with an integrated magnetic driver 3612 on each side of the drum 3640. Drawworks 3602 of FIG. 36C may be the same as the drawworks of FIGS. 36A-36B, except that the magnetic driver 3612 is an integrated magnetic motor-gear drive (e.g., as described above with reference to FIGS. 25-28). FIG. 36D shows a drawworks 3603 which is the same as the drawworks 3602, except that a plurality of integrated magnetic motor-gear drives 3613 are provided.

Figure 37A:
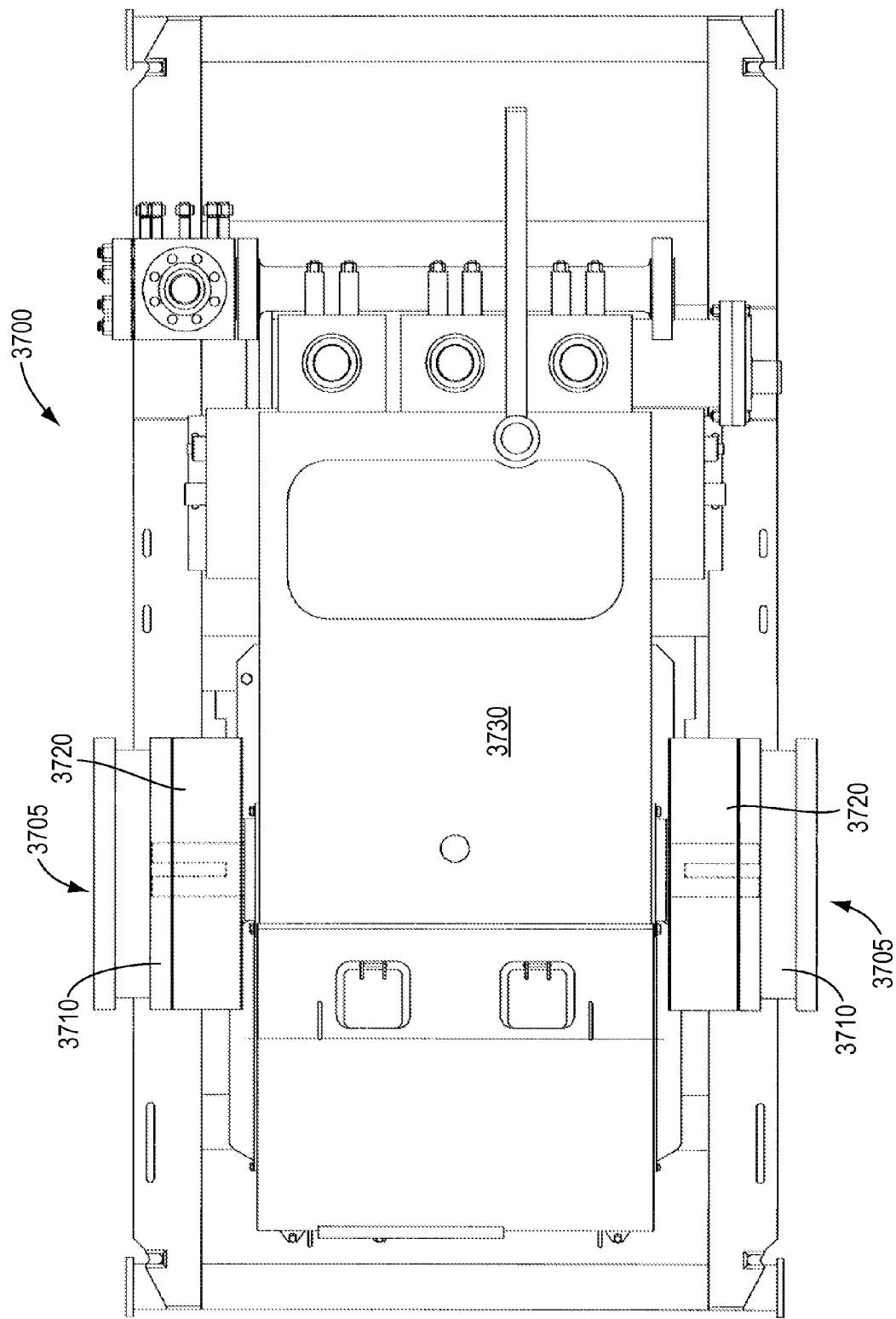
FIGS. 37A-37D illustrate plan views of mudpumps with magnetic drivers in accordance with various exemplary embodiments.

FIGS. 37A-37D illustrate examples of mud pumps with magnetic drives. Similar to the magnetic drivers implemented in drawworks as described herein, magnetic drivers may be implemented with mud pumps to provide a wide range of power, speed and torque. FIG. 37A shows a mud pump 3700 with a magnetic driver 3705 including two motors 3710 operationally coupled to two magnetic gears 3720 positioned about a pump 3730. The magnetic drivers 3720 may be the same as the magnetic drivers 3403 of FIGS. 34A-34F, and the magnetic gears may be the same as the magnetic gears 3430 of FIGS. 34A-34F.

Figure 37B:
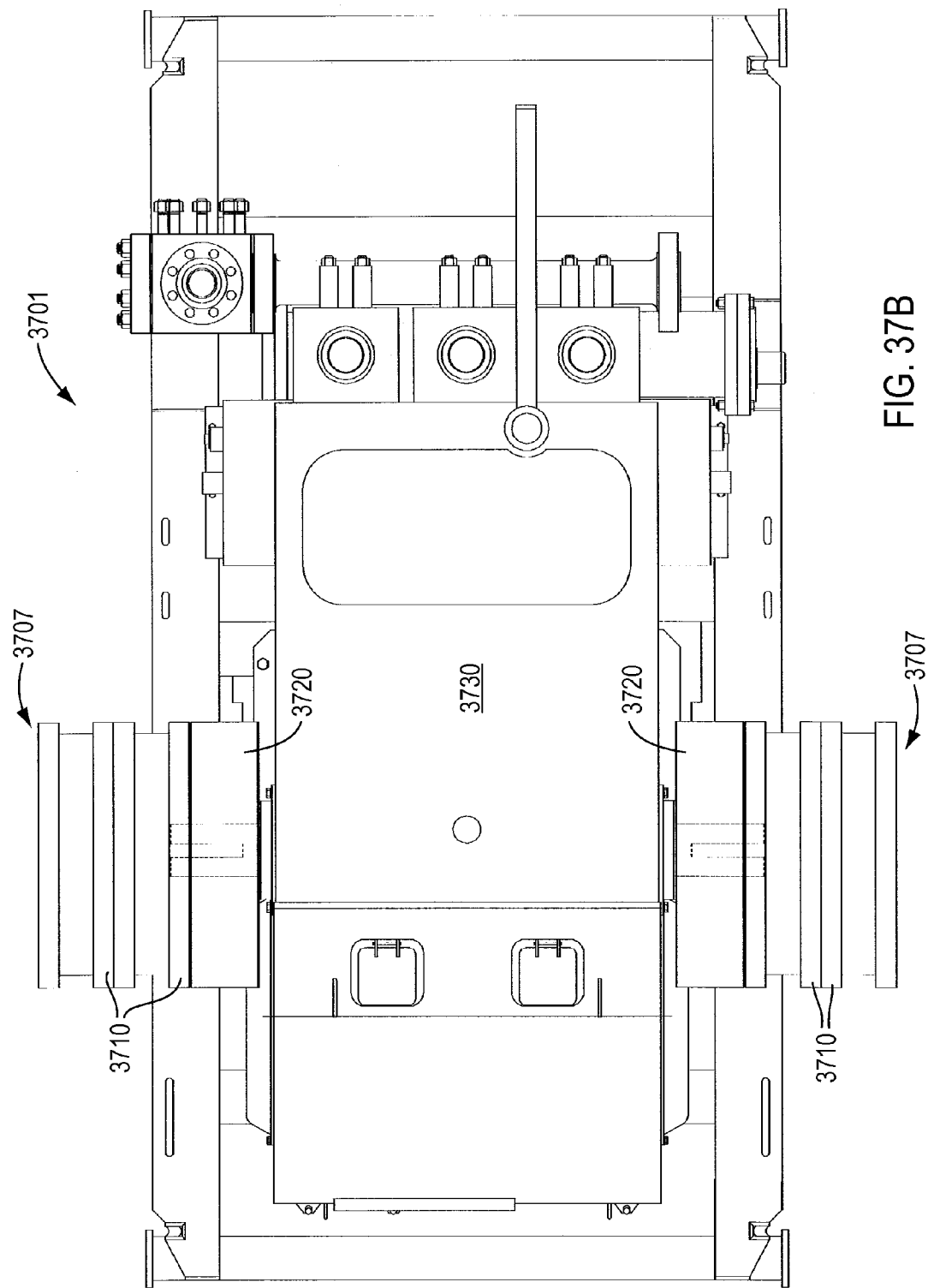
Figure 37C:
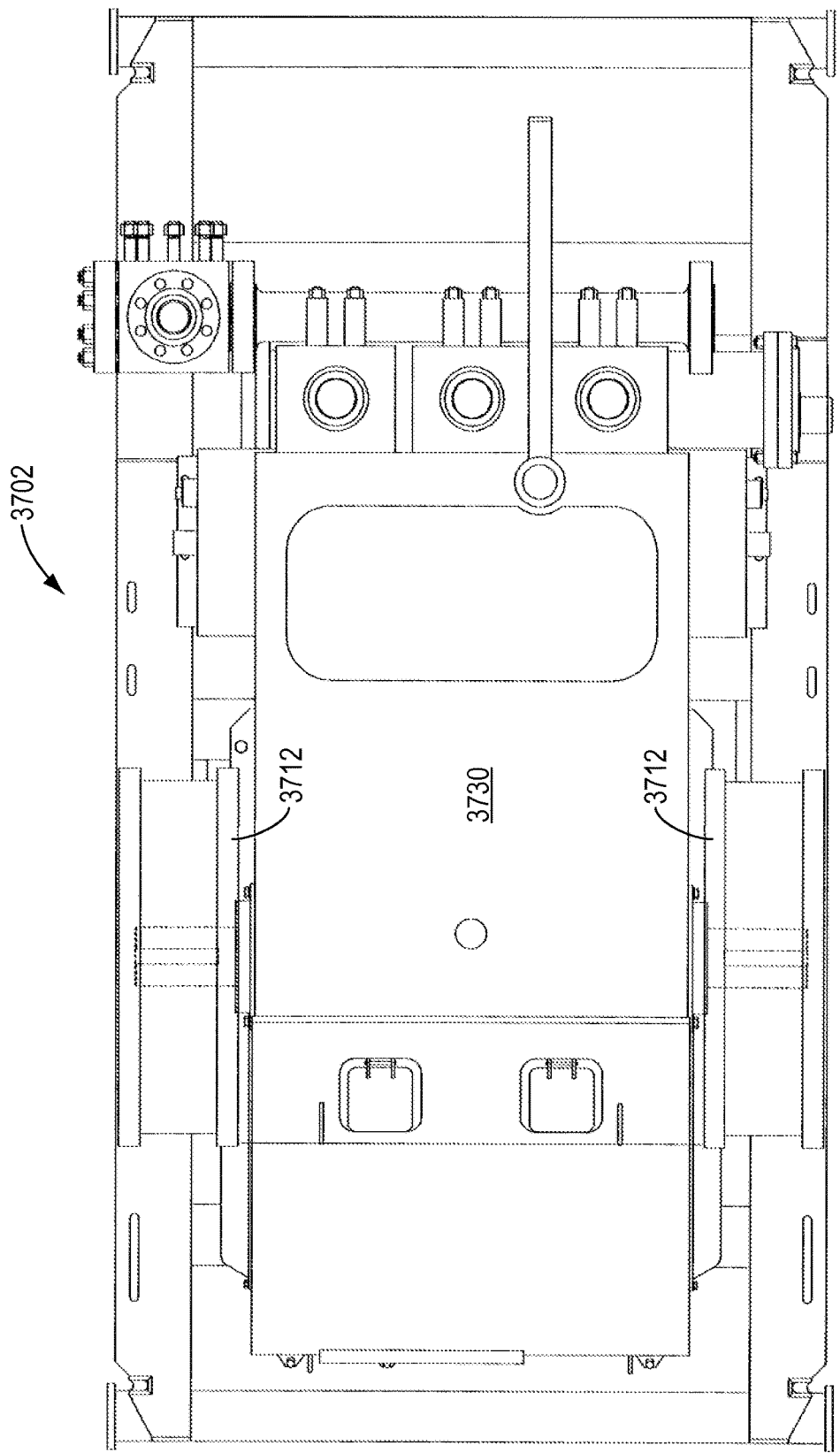
Figure 37D:
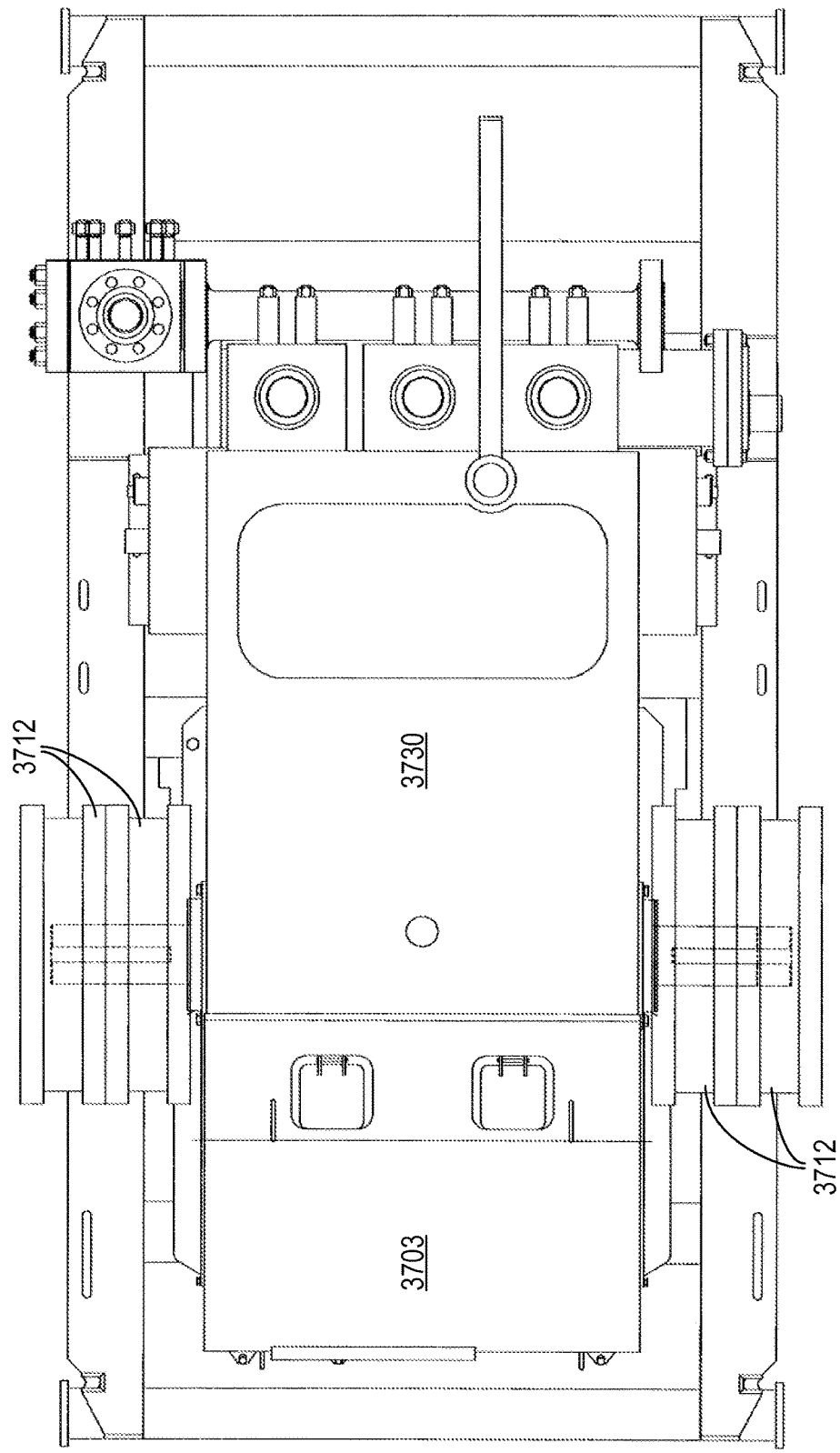

FIG. 37B shows a different configuration of a mud pump 3701, with one pump 3730 and two magnetic drivers 3707. The two magnetic drivers 3707 are the same as the magnetic driver 3705, except that this magnetic drivers 3707 include four motors 3710 operationally coupled two magnetic gears 3720. FIG. 37C shows a mud pump 3702 with two integrated magnetic motor-gear drives 3712. The integrated magnetic motor-gear drives 3712 may be similar to the integrated magnetic motor-gear drives described as being capable for use with the top drive or drawworks above. FIG. 37D shows a mud pump 3703 with a plurality of integrated magnetic motor-gear drives 3712. The mud pump 3703 may be the same as the mud pump 3702 of FIG. 37C, except that multiple integrated magnetic motor-gear drives 3712 are used.

As depicted in the various configurations shown herein, various combinations of one or more drivers and/or motors may be used with various rotary equipment at the oil field to generate desired output. The rotary equipment having the magnetic drivers described above may be used in a new oil rig or be retrofitted to an existing oil rig.

One exemplary method of driving rotary equipment of an oil field (the rotary equipment having an input shaft and an output shaft) involves operatively connecting at least one magnetic gear to the rotary equipment of a component of an oilrig. The magnetic gear may be any of the magnetic gears described herein. The method can further include rotating the rotary equipment at a desired rotational speed by selectively translating torque from an input (e.g., shaft coupled to an inner rotor) shaft to an output (e.g., shaft associated with an outer rotor or outer relative to the inner) shaft with the magnetic gear(s).

The coupling may involve replacing a mechanical gear of a rotary driver of an oilfield with the magnetic gear(s). The method may optionally include coupling at least one motor to the magnetic gear(s), either integrally via a permanent magnet stator winding or separately coupling any of a variety of motors to the input shaft. The method may be performed in any order and repeated as desired.

While features of contact type mechanical gears, such as wear components, lubricants, noise reducers, vibration reducers, overload protection, pulsation reducers, misalignment compensators and other features may optionally be provided, the non-contact configuration of a magnetic gear arrangements described herein may eliminate the requirement of such features. For example, when there is an overload, the gear rings may slip relatively as needed and the non-contact configuration may eliminate the need for a wear component and tolerate certain misalignments.

Although only a few exemplary embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

It is to be understood that the various embodiments shown and described herein are to be taken as exemplary. Elements and materials, and arrangements of those elements and materials, may be substituted for those illustrated and described herein, and portions may be reversed, all as would be apparent to one skilled in the art after having the benefit of the description herein. Changes may be made in the elements described herein without departing from the spirit and scope of the present disclosure and following claims, including their equivalents.

Those having ordinary skill in the art will recognize that various modifications may be made to the configuration and methodology of the exemplary embodiments disclosed herein without departing from the scope of the present teachings. By way of example only, the cross-sectional shapes and relative sizes of the gear rings may be modified and a variety of cross-sectional configurations may be utilized, including, for example, circular or oval cross-sectional shapes.

Those having ordinary skill in the art also will appreciate that various features disclosed with respect to one exemplary embodiment herein may be used in combination with other exemplary embodiments with appropriate modifications, even if such combinations are not explicitly disclosed herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the magnetic gears and methods of the present disclosure without departing from the scope the present disclosure and appended claims. Other embodiments of the disclosure will be apparent to those skilled in the art from consideration of the specification and practice of the disclosure disclosed herein. It is intended that the specification and examples be considered as exemplary only.

What is claimed is:

1. A magnetic gear comprising:
   a first gear member comprising a plurality of permanent magnets arranged to have a first number of magnetic pole pairs;
   a second gear member positioned relative to the first gear member, the second gear member comprising a plurality of individually rotatable magnetized elements each driven and synchronized with one another to selectively generate a second number of magnetic pole pairs that differs from the first number of magnetic pole pairs; and
   a plurality of interpole elements positioned between the first and second gear members, the plurality of interpole elements disposed to harmonically couple the magnetic pole pairs of the first gear member with the magnetic pole pairs of the second gear member for each selectively generated second number of magnetic pole pairs.

2. The device of claim 1, wherein the first number of magnetic pole pairs is greater than the second number of magnetic pole pairs.

3. The device of claim 1, wherein the plurality of individually rotatable magnetized elements comprise a plurality of individually rotatable permanent magnets.

4. The device of claim 1, wherein the plurality of individually rotatable magnetized elements comprise a plurality of individually rotatable magnetized cylinders.

5. The device of claim 1, wherein the plurality of interpole elements comprise a plurality of free-spinning magnetized elements.

6. The device of claim 5, wherein the plurality of free-spinning magnetized elements are arranged into at least two groups of free-spinning magnetized elements.

7. The device of claim 1, wherein the plurality of interpole elements comprise a plurality of free-spinning magnetized cylinders.

8. The device of claim 1, wherein the plurality of interpole elements comprise a plurality of magnetizable wedges.

9. The device of claim 8, wherein the plurality of magnetizable wedges are arranged into at least two groups of magnetizable wedges.

10. The device of claim 1, wherein the individually rotatable magnetized elements are driven by a motor that is controlled by a controller to synchronize the speed and position of each magnetized element.

11. The device of claim 10, wherein the controller is configured to adjust relative angular positions of each individually rotatable magnetized element relative to neighboring individually rotatable magnetized elements.

12. The device of claim 11, wherein the second number of magnetic pole pairs is based on the relative angular positions.

13. The device of claim 1, wherein the first gear member comprises an outer gear ring and the second gear member comprises an inner gear ring.

14. A method of varying a magnetic gear ratio of a magnetic gear, the method comprising:
   selectively adjusting a relative rotation angle of a plurality of individually rotatable magnetized elements to generate a number of magnetic pole pairs of a first gear member; and
   harmonically coupling the magnetic pole pairs of the first gear member with magnetic pole pairs of a second gear member for at least two numbers of magnetic pole pairs of the first gear member from the selectively adjusting.

15. The method of claim 14, wherein the harmonically coupling the first gear member with the second gear member comprises harmonically coupling using a plurality of interpole elements between the first and second gear members.

16. The method of claim 15, wherein the interpole elements are chosen from free-spinning magnetized cylinders and magnetizable wedges.

17. The method of claim 15, wherein the harmonically coupling the first gear member with the second gear member comprises harmonically coupling using a plurality of interpole elements arranged into at least two groups.

18. A system comprising:
   the magnetic gear of claim 1;
   a high speed, low torque input shaft operatively coupled to a high speed gear ring of the magnetic gear;
   a low speed, high torque output shaft operatively coupled to a low speed gear ring of the magnetic gear
   rotary equipment associated with an oil drilling rig operatively coupled to be driven by the output shaft.

19. The system of claim 18, wherein the rotary equipment is chosen from a top drive, a mud pump, and a drawworks.

* * * * *